United States Patent Office 3,293,247
Patented Dec. 20, 1966

3,293,247
HYDROXYPHENYL-1,3,5-TRIAZINES
Max Duennenberger, Frenkendorf, Hans Rudolf Biland, Basel, Christian Luethi, Muenchenstein, and Max Schellenbaum, Riehen, Switzerland, assignors to Ciba Limited, Basel, Switzerland, a company of Switzerland
No Drawing. Filed Mar. 15, 1965, Ser. No. 439,964
Claims priority, application Switzerland, Mar. 18, 1964, 3,458/64
16 Claims. (Cl. 260—248)

The present invention provides valuable new hydroxyphenyl-1,3,5-triazines which, like for instance the compound of the formula (1)
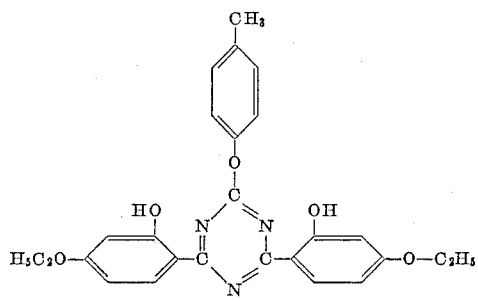

correspond to the general formula (2)
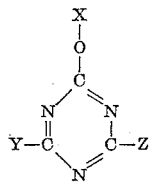

in which X represents a hydrogen atom or an organic residue linked through a carbon atom with the oxygen atom; Y represents a benzene residue which is linked directly with the triazine ring through a cyclic carbon atom and contains in orthoposition to the said bond a hydroxyl group and in paraposition a possibly etherified hydroxyl group or the group of the formula (3)
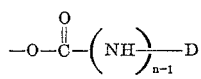

(where $n=1$ or 2 and D stands for an organic residue), and Z represents a halogen atom, especially chlorine, or a benzene residue.

In actual practice the residue X in the above Formula 2 is a hydrogen atom or an organic residue that contains at most 25 carbon atoms; similarly, the substituents suitable for D contain in general only up to 18 carbon atoms.

The residue X in the Formula 2 may be, for example, a hydrogen atom, an alkenyl group such as allyl or crotyl, a cycloalkyl group such as cyclohexyl, or a possibly substituted alkyl, phenyl or naphthyl group.

Preferred residues X are, for example, alkyl groups containing at most 18 carbon atoms, such as methyl, octyl or octadecyl; phenylalkyl or alkoxyalkyl groups containing up to 12 carbon atoms, such as benzyl, parachlorobenzyl, phenylpropyl, $CH_3\text{—}O\text{—}CH_2\text{—}CH_2\text{—}$ or $CH_3\text{—}CH_2\text{—}CH_2\text{—}CH_2\text{—}O\text{—}CH_2\text{—}CH_2\text{—}$, or benzene residues of the formula (4)
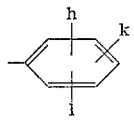

where $h$ and $k$ are identical or different and each represents a hydrogen atom, a halogen atom, a carboxyl group or an alkyl group containing up to 12 carbon atoms and $l$ is a hydrogen atom, a halogen atom, an alkyl or phenylalkyl group containing up to 12 carbon atoms, a hydroxyl, carboxyl, carbamyl, nitro, amino, phenyl or cyclohexyl group or an alkylamino, carbalkoxy, alkoxy or alkenyl group containing up to 8 carbon atoms. As examples of such benzene residues there may be mentioned: Phenyl, 4-hydroxy-3,5-di-tertiary butylphenyl, 2-methylphenyl, 4-nonylphenyl, 2-methyl-5-isopropylphenyl, 2,4-di-tertiary butylphenyl, 2-methoxyphenyl, 2-tertiary butyl-4-methoxyphenyl, 2-methoxy-4-propenylphenyl, 2,4,6-tricarboxyphenyl, 4-carbethoxyphenyl, 3-diethylaminophenyl, 2-carbaminophenyl, 2,4,5 - trichlorophenyl, 2,4,6 - tribromophenyl, 4-chloro-3,5-dimethylphenyl, 3-nitrophenyl, 3-aminophenyl, 4-cyclohexylphenyl, 4-phenyl-phenyl or cumyl.

Of special value are those compounds of the Formula 2 in which X is a hydrogen atom, an alkyl group containing up to 12 carbon atoms or a benzene residue of the formula (5)
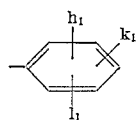

in which $h_1$ and $k_1$ are identical or different and each represents a hydrogen, chlorine or bromine atom or an alkyl group containing up to 9 carbon atoms, and $l_1$ represents a hydrogen, chlorine or bromine atom, a hydroxyl, carbamyl, phenyl or cyclohexyl group or an alkoxy or alkenyl group containing up to 4 carbon atoms.

The residue Y in the Formula 2 may, for example, correspond to the formula (6)
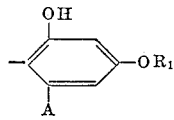

in which $R_1$ represents a hydrogen atom, an alkenyl group, a possibly substituted alkyl group or a residue of the formula (7)
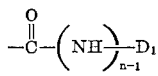

where $n=1$ or 2; $D_1$ represents an alkyl or cycloalkyl group or a benzene residue, and A stands for a hydrogen atom or a residue $-OR_1$. Alternatively, Y may also represent a residue of the formula (8)
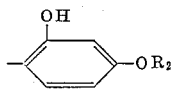

in which $R_2$ stands for a hydrogen atom, an alkyl group containing up to 18 carbon atoms, which may be substituted by a chlorine atom, or by a hydroxyl, cyano, carboxyl, carbalkoxy or carbamyl group, such as ethyl, dodecyl, octadecyl, $-CH_2-CH_2-CH_2-Cl$,
$-CH_2-CH_2-OH$, $-CH_2-CH_2-CH_2-CH_2-OH$
$-CH_2-CH_2-CH_2-CN$, $-CH_2-COOH$
$-CH_2-(CH_2)_9-COOH$, $-CH_2-COOCH_3$
$-CH_2-CH_2-CH_2-COOC_2H_5$, $-CH_2-CONH_2$
or $-CH_2-(CH_2)_9-CONH_2$ or an aralkyl, acylalkyl or alkenyl group containing up to 9 carbon atoms, such as benzyl, para-chlorobenzyl, para-methylbenzyl, para-methoxybenzyl, phenylpropyl, $-CH_2-CO-C_6-H_5$, allyl or crotyl, or a residue of the formula (9)
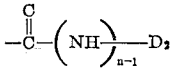

where $n=1$ or 2 and $D_2$ stands for an alkyl group containing up to 18 carbon atoms, such as ethyl, octyl or octadecyl, or a phenyl group which may be substituted by a chlorine atom, or by a phenyl, hydroxyl, or an alkyl or alkoxy group containing up to 8 carbon atoms, such as phenyl, para-chlorophenyl, para-phenyl-phenyl, ortho-hydroxyphenyl, para-methylphenyl, para-octylphenyl, para-tertiary butoxyphenyl or para-methoxyphenyl.

A preferred residue Y corresponds to the formula

(10) 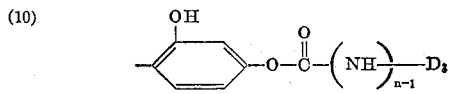

where $n=1$ or 2 and $D_3$ stands for an alkyl group containing up to 12 carbon atoms or a phenyl group which may be substituted by a chlorine atom or by a hydroxyl group.

Of special value is a residue Y of the formula

(11) 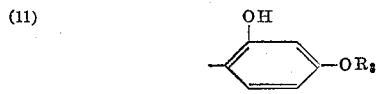

in which $R_3$ repersents a hydrogen atom, an alkyl group containing up to 12 carbon atoms, a hydroxyalkyl, cyanoalkyl, carboxyalkyl, carbalkoxyalkyl, or an alkenyl group containing up to 4 carbon atoms, or a benzyl group which may be substituted by a chlorine atom.

The symbol Z in the general Formula 2 may represent, for example, the residue of the formula

(12) 

In which U and V are identical or different and each represents a hydrogen atom, a halogen atom, an alkyl group or the group $—OR_1$, and W stands for a hydrogen atom, a halogen atom, and akyl or phenyl group, or the group $—OR_1$, where $R_1$ has the same meaning as defined above in connection with Formula 6.

Thus, suitable residues Z are, for example, those of the formula

(13) 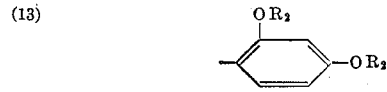

in which the residues $R_2$ may be identical or different and have the same meanings as in the Formula 8.

Alternatively, the residue Z may correspond to the formula

(14) 

where $U_1$ stands for a hydrogen atom, a halogen atom such as chlorine, a hydroxyl group, an alkyl or alkoxy group containing up to 8 carbon atoms such as methyl, tertiary butyl, octyl or methoxy, or a phenyl group, and $V_1$ represents a hydrogen atom, a halogen atom such as chlorine or an alkyl group containing up to 8 carbon atoms such as methyl, tertiary butyl or octyl.

There may specially be mentioned those residues Z which corresponds to the formula

(15) 

where the symbols $R_4$ are identical or different and each represents a hydrogen atom or a residue of the formula

(16) 

in which $n$ and $D_3$ have the same meanings as defined for the Formula 10.

Preferred use is made of residues Z of the formula

(17) 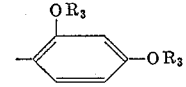

where the symbols $R_3$ are identical or different and have the same meanings as in the Formula 11.

Of very special importance are residues Z of the formula

(18) 

where $U_2$ is a hydrogen atom, a chlorine atom, an alkyl or alkoxy group containing up to 4 carbon atoms, or a phenyl group.

From among the new hydroxyphenyl-1,3,5-triazines there may be mentioned, for example those of the formula

(19) 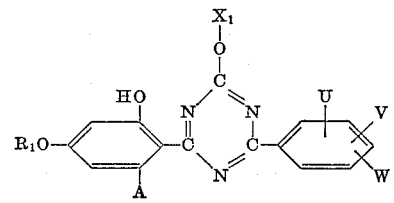

in which $X_1$ represents a hydrogen atom, an alkenyl or or cycloalkyl group or a possibly substituted alkyl, phenyl or naphthyl group; $R_1$ is a hydrogen atom, an alkenyl group, a possibly substituted alkyl group or a residue of the formula (7) 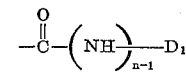

(where $n=1$ or 2 and $D_1$ represents an alkyl or cycloalkyl group or a benzene residue); A represents a hydrogen atom or a residue $—OR_1$; U and V are identical or different and each stands for a hydrogen atom, a halogen atom, an alkyl group or the group $—OR_1$, and W represents a hydrogen atom, a halogen atom, an alkyl or phenyl group or the group $—OR_1$.

Another group of examples of the hydroxyphenyl-1,3,5-triazines of the invention are those of the formula

(20) 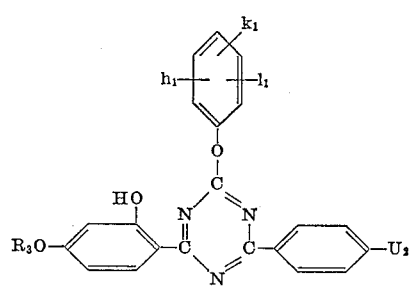

in which $h_1$ and $k_1$ are identical or different and each represents a hydrogen atom, a chlorine or bromine atom, or an alkyl group containing up to 9 carbon atoms; $l_1$ is a hydrogen, chlorine or bromine atom, a hydroxyl, carbamyl, phenyl or cyclohexyl group or an alkoxy or alkenyl group containing at most 4 carbon atoms; $R_3$ represents a hydrogen atom, an alkyl group containing up to 12 carbon atoms, a hydroxyalkyl, cyanoalkyl, carboxyalkyl, carbalkoxyalkyl or an alkenyl group containing up to 4 carbon atoms or a benzyl group which may be substituted by a chlorine atom; and $U_2$ represents a hydrogen or chlorine atom, an alkyl or alkoxy group containing up to 4 carbon atoms or a phenyl group.

A selected type of compounds of the present invention corresponds to the formula

(21)
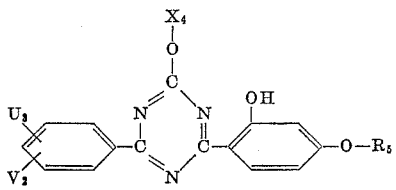

in which

U$_3$ and V$_2$ each is a hydrogen atom, a halogen atom, an alkoxy group or an alkyl group containing 1 to 4 carbon atoms;

X$_4$ represents a cyclic system containing one or two 6-membered carbon rings, which may contain one or several substituents from the following group: alkyl, alkoxy, hydroxyl, carbalkoxy groups, halogen atoms, nitro, benzoyl and carbonamido groups;

R$_5$ represents hydrogen or an alkyl group which may be substituted by hydroxyl, nitrile, alkoxy, carboxylic acid ester, carboxylic acid amide, benzoyl groups or halogen atoms; or an alkenyl group, an aliphatic acyl group, a benzoyl, benzyl or carbonamido group, and these groups may be substituted above all by hydroxyl, alkyl or phenyl groups or by halogen atoms.

Preferred compounds belonging to those of the group corresponding to the formula 21 are those which correspond to the formula

(22)
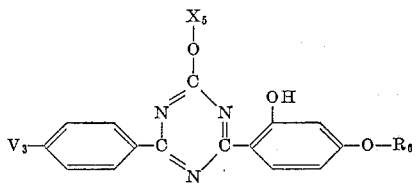

in which

V$_3$ represents a hydrogen or chlorine atom;
X$_5$ represents (a) A phenyl group which contains 1 to 3 substituents of the following types: alkyl groups containing 1 to 12 carbon atoms; phenylalkyl groups containing 1 to 4 carbon atoms in the alkyl group; alkoxy groups containing 1 to 8 carbon atoms in the alkyl group; cyclohexyl, phenyl, hydroxyl groups, carbalkoxy groups containing 1 to 8 carbon atoms in the alkoxy group, and carbonamido groups containing 1 to 18 carbon atoms;

(b) A phenyl group containing 1 to 5 halogen atoms, or (c) A naphthyl group;

R$_6$ represents a hydrogen atom or an alkyl group containing up to 18 carbon atoms; an alkyl group containing up to 8 carbon atoms which may be substituted by a hydroxyl or cyano group, by a halogen atom, —CO—NH$_2$ or —CO—C$_6$H$_5$; an alkenyl group containing up to 8 carbon atoms; a carbalkoxyalkyl group of the formula —(CH$_2$)$_n$—COO(CH$_2$)$_m$—CH$_3$ where $n=1$ to 4 and $m=1$ to 7; an aliphatic acyl group containing up to 18 carbon atoms; a benzoyl group, a benzyl or a carbonamido group in which one amide hydrogen atom may be substituted by a phenyl residue or an alkyl group containing up to 18 carbon atoms.

Another practically important variant of compounds of the invention includes those of the general formula

(23)
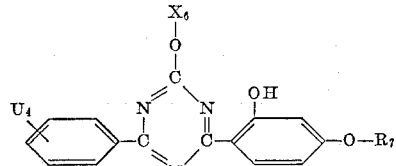

in which

U$_4$ represents a hydrogen or halogen atom or an alkyl group containing up to 8 carbon atoms;

X$_6$ is a hydrogen atom, an alkyl, alkenyl or hydroxyalkyl group, an alkyl group containing one or several ether oxygen bridges; a hydroxyalkyl group containing a thioether bridge, or a benzyl group;

R$_7$ represents a hydrogen atom, an alkyl group; an alkyl group substituted by hydroxyl, nitrile or halogen; an alkenyl group, an aliphatic acyl group, a carbalkoxyalkyl, carbonamido or alkylcarbonamido group, a benzoyl or a benzoyl group.

Preferred compounds of the general Formula 23 are those which correspond to the formula

(24)
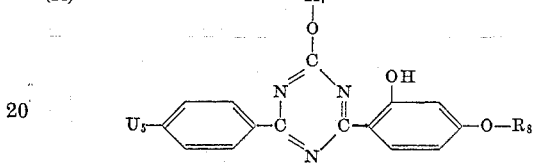

in which

U$_5$ represents a hydrogen or chlorine atom;

X$_7$ an alkyl group containing up to 18 carbon atoms; an allyl group; a hydroxyalkyl group containing 1 to 4 carbon atoms; an alkoxyalkyl group containing up to 10 carbon atoms, or a benzyl group;

R$_8$ is a hydrogen atom, an alkyl group containing up to 18 carbon atoms, an allyl group; an alkyl group which contains up to 10 carbon atoms and is substituted by a hydroxyl or nitrile group; an aliphatic acyl group containing up to 18 carbon atoms; a possibly alkyl- or aryl-substituted carbonamido group with up to 18 carbon atoms, or an alkylcarbonamido group containing up to 4 carbon atoms; a carbalkoxyalkyl group containing up to 10 carbon atoms or a benzyl group.

A third group of valuable compounds according to this invention corresponds to the general formula

(25)
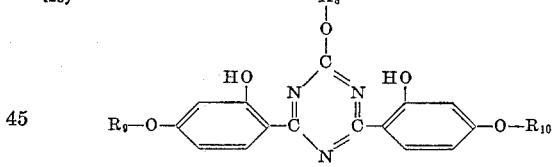

in which

X$_8$ represents a cyclic system which contains one or two 6-membered carbon rings and one or several of the following substituents: alkyl, alkoxy or hydroxyl groups, halogen atoms, halogenoalkyl, carbalkoxy, nitro, possibly substituted amino groups, or carbonamide groups;

R$_9$ and R$_{10}$ each represent a hydrogen atom, an alkyl, alkenyl, aralkyl or carbalkoxyalkyl group.

Preferred types of compounds of the Formula 25 may be represented by the formula

(26)
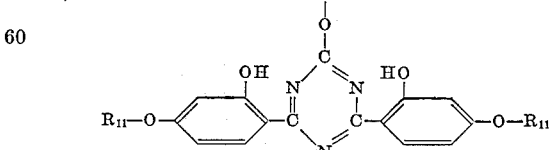

in which

X$_9$ represents (a) A phenyl group which contains 1 to 3 substituents from the following group: alkyl groups containing 1 to 12 carbon atoms; phenylalkyl groups containing 1 to 4 carbon atoms in the alkyl group; alkoxy groups containing 1 to 8 carbon atoms in the alkyl group; cyclohexyl, phenyl, hydroxyl groups; carbalkoxy groups containing 1 to 8 carbon atoms in the alkoxy group; a carbonamido group, an alkylated amino group and a nitrile group;

(b) A phenyl group containing 1 to 5 halogen atoms, or (c) A naphthyl group which may be partially hydrogenated;

$R_{11}$ represents hydrogen, an alkyl group containing up to 18 carbon atoms; an alkenyl group containing up to 4 carbon atoms; a benzyl group, or a carbalkoxyalkyl group containing up to 6 carbon atoms.

Another group of compounds of which some specific representatives are specially valuable is characterized by the formula

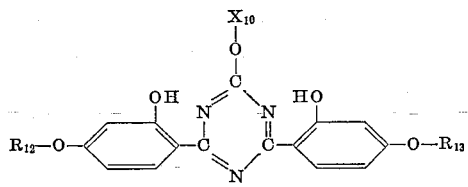

in which $X_{10}$ represents an alkyl group containing up to 6 carbon atoms and optionally also oxygen bridges;

$R_{12}$ and $R_{13}$ each represents hydrogen or an alkyl, alkenyl, carboxyalkyl, aralkyl, aliphatic acyl, hydroxyalkyl or a possibly substituted carbonamido group.

Among the compounds of Formula 27 those triazine derivatives are specially valuable which correspond to the formula (28)

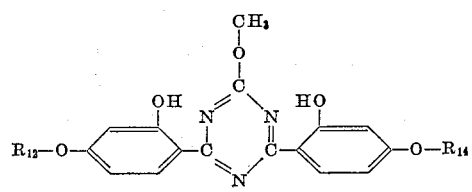

in which $R_{14}$ represents a substituent containing up to 8 carbon atoms, especially an alkyl or allyl group, a carbalkoxyalkyl group containing up to 6 carbon atoms, a benzyl, acetyl, hydroxyalkyl or a possibly substituted carbonamido group.

The new hydroxyphenyl-1,3,5-triazines of the Formula 2 are obtained by known methods, for example by reacting a dihalogeno-1,3,5-triazine of the formula (29)

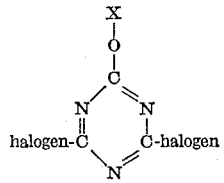

(where X has the above meaning) in an anhydrous medium in the presence of a Friedel-Crafts catalyst, especially aluminum chloride, and in the presence of an organic solvent that is inert towards the reactants, especially nitrobenzene, with 1x to 2x the molecular proportion of a compound of the benzene series that contains two hydroxyl groups in meta-position relatively to each other; or by reacting a monohalogeno-1,3,5-triazine of the formula (30)

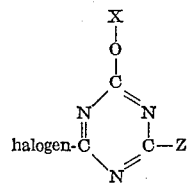

(where X and Z have the above meanings) with a molar proportion of a compound of the benzene series that contains two hydroxyl groups in meta-position relatively to each other, whereupon, if desired, hydroxyl groups in the residues Y and Z of the Formula 2, which are in para-position to the bond with the triazine ring, are etherified, esterified or converted into urethane groups to form compounds of the above Formula 2.

The dihalogenotriazines and monohalogenotriazines to be used in the above-mentioned processes are either known or can be prepared by known methods. Thus, the dihalogenotriazines of the Formula 21 are obtained, for example, by mixing in an inert organic solvent, e.g. acetone, an equi-molecular solution of cyanuric chloride and a phenol or alcohol of the fromula

(31)  X—OH (where X has the above meaning) at a temperature of about 0° C. with an equivalent proportion of a basic reagent, e.g. sodium hydroxide, in such a manner that the pH value always remains acid or weakly alkaline.

The monohalogenotriazines of the Formula 22 are obtained in a similar manner, replacing in the above reaction the cyanuric chloride by an aryldichlorotriazine of the formula (32)

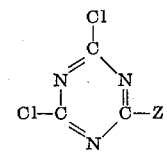

(where Z has the above meaning) and conducting the reaction at a temperature ranging from 10° C. to 70° C. As examples of aryldichlorotriazines of the Formula 24 there may be mentioned 2,4-dichloro-6-phenyltriazine,
2,4-dichloro-6-diphenyltriazine,
2,4-dichloro-6-(para-methoxyphenyl)-triazine,
2,4-dichloro-6-(para-methylphenyl)-triazine,
2,4-dichloro-6-(ortho, para-dimethylphenyl)-triazine, and
2,4-dichloro-6-(para-chlorophenyl)-triazine.

As alcohols or phenols of the Formula 23 there may be used, for example:

Methanol,
octanol,
octadecyl alcohol,
$CH_3—O—CH_2—CH_2—OH$
$CH_3—(CH_2)_3—O—CH_2—CH_2—OH$
allyl alcohol,
crotyl alcohol,
cyclohexanol,
benzyl alcohol,
phenol,
β-naphthol,
α-tetrahydronaphthol,
4-hydroxy-3,5-di-tertiary butylphenol,
ortho-cresol,
4-nonylphenol,
2-methyl-5-isopropylphenol (carvacrol),
2,4-di-tertiary butylphenol,
pentamethylphenol,
2-methoxyphenol (guaiacol)
2-tertiary butyl-4-methoxyphenol,
2-methoxy-4-propenylphenol (isoeugenol),
2,4,6-tricarboxyphenol (gallic acid),
4-carbethoxyphenol,
3-diethylaminophenol,
3,5-di-tertiary butyl-4-hydroxybenzyl alcohol,
2-carbaminophenol,
2-carbanilinophenol,
2,4,5-trichlorophenol,
2,4,6-tribromophenol,
4-chloro-3,5-dimethylphenol,
3-nitrophenol,
4-cyclohexylphenol,
4-phenylphenol,
cumylphenol and
1,4-dihydroxy-2,6-di-tertiary butylbenzene.

From among the compounds of the benzene series that contain two hydroxyl groups in meta-position relatively to each other there may be mentioned, for example, 2,6-dihydroxytoluene, 1,3,5-trihydroxybenzene or especially 1,3-dihydroxybenzene.

Thus, for example, there are obtained hydroxyphenyl-1,3,5-triazines of the formula (21)

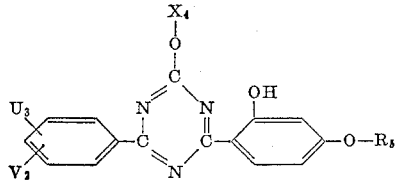

in which $U_3$ and $V_2$ each represents a hydrogen atom, a halogen atom, an alkoxy group or an alkyl group containing 1 to 4 carbon atoms;

$X_4$ represents a cyclic system containing one or two 6-membered carbon rings, which may contain one or several substitutents from the group: Alkyl groups, phenylalkyl groups, alkoxy, hydroxyl or carbalkoxy groups, halogen atoms, nitro, benzoyl or carbonamido groups;

$R_5$ represents hydrogen or an alkyl group which may be substituted by hydroxyl, nitrile, alkoxy, carboxylic acid ester, carbonamido or benzoyl groups or by halogen atoms; or an alkenyl group, an aliphatic acyl group, a benzoyl, benzyl or carbonamido group, which groups may be substituted, especially by hydroxyl, alkyl, phenyl groups or halogen atoms by reacting a monohalogenotriazine of the formula (33)

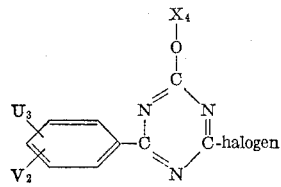

(where $X_4$, $U_3$ and $V_2$ have the above meanings) in an anhydrous medium in the presence of 0.3 to 3 mols of a Friedel-Crafts catalyst in an inert organic solvent with a molar proportion of a 1,3-dihydroxybenzene between 0° C. and 150° C., whereupon, if desired, the hydroxyl group of the dihydroxybenzene residue which is in para-position to the bond to the triazine ring is etherified, esterified or converted into an urethane group.

Hydroxyphenyl-1,3,5-triazines of the formula (23)

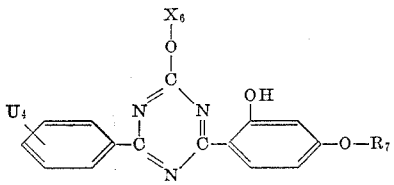

in which $U_4$ represents a hydrogen or halogen atom or an alkyl group containing up to 8 carbon atoms;

$X_6$ represents a hydrogen atom or an alkyl, alkenyl or hydroxyalkyl group; an alkyl group containing one or several ether oxygen bridges; a hydroxyalkyl group containing a thioether bridge, or a benzyl group;

$R_7$ represents a hydrogen atom, an alkyl group; an alkyl group substituted by hydroxyl, nitrile or halogen; an alkenyl group, an aliphatic acyl group, a carbalkoxyalkyl, carbonamido or alkylcarbonamido group, a benzyl or benzoyl group, can be manufactured, for example, by reacting a monohalogenotriazine of the formula (34)

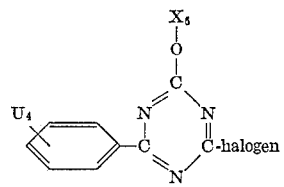

(where $X_6$ and $U_4$ have the above meanings) in an anhydrous medium in the presence of 0.3 to 3 mols of a Friedel-Crafts catalyst in an inert organic solvent with a molar proportion of 1,3-dihydroxybenzene between 0° C. and 150° C., whereupon, if desired, the hydroxyl group of the dihydroxybenzene residue in para-position to the bond to the triazine ring is etherified, esterified or converted into an urethane group, to form compounds of the above formula.

Compounds of the Formula 34 are also obtained when a suitable compound that contains instead of the group —$X_6$, for example, the group $X_4$ which represents a cyclic system containing one or two 6-membered carbon rings and may contain as substituents one or several alkyl groups, phenylalkyl, alkoxy, hydroxyl, carbalkoxy groups, halogen atoms, nitro, benzoyl and/or carbonamido groups is converted in the presence of a transesterification catalyst and of an alcohol of the formula $X_6$—OH into a compound of the above formula.

Hydroxyphenyl-1,3,5-triazines of the formula (25)

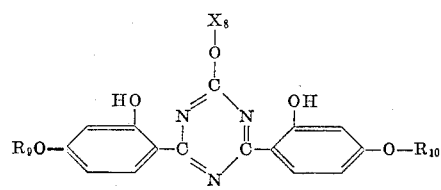

in which $X_8$ represents a cyclic system containing one or two 6-membered carbon rings and possibly as substituents one or several alkyl, alkoxy or hydroxyl groups, halogen atoms, halogenoalkyl, carbalkoxy, nitro, possibly substituted amino groups or carbonamido groups;

$R_9$ and $R_{10}$ each represents hydrogen, an alkyl, alkenyl, aralkyl or carbalkoxyalkyl group are obtained, for example, when a dihalogenotriazine of the formula (35)

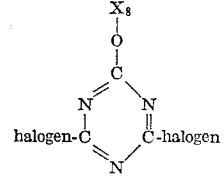

(where $X_8$ has the above meaning) is reacted in an anhydrous medium in the presence of 0.6 to 4.0 mols of a Friedel-Crafts catalyst in an inert organic solvent with 2 mols of 1,3-dihydroxybenzene between 0° C. and 150° C., whereupon, if desired, the hydroxyl group of the dihydroxybenzene residue in para-position to the bond to the triazine ring is etherified, esterified or converted into an urethane group, to form compounds of the above formula.

In a similar manner there are obtained hydroxyphenyl-1,3,5-triazines of the formula (27)

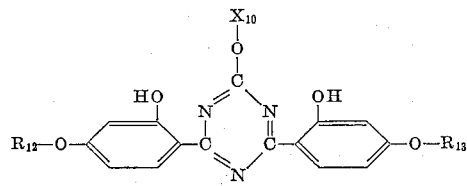

in which $X_{10}$ represents an alkyl group which contains up to 6 carbon atoms and possibly oxygen bridges, $R_{12}$ and $R_{13}$ each is hydrogen or an alkyl, alkenyl, carboxyalkyl, aralkyl group, an aliphatic acyl group, a hydroxyalkyl group or a possibly substituted carbonamido group when a dihalogenotriazine of the formula (36)

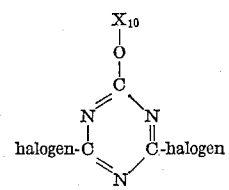

(where $X_{10}$ has the above meaning) is reacted in an anhydrous medium in the presence of 0.6 to 4.0 mols of a Friedel-Crafts catalyst in an inert organic solvent with 2 mols of 1,3-dihydroxybenzene between 0° C. and 150° C. and, if desired, the hydroxyl groups of the dihydroxybenzene residues in para-position to the bond to the triazine ring are etherified, esterified or converted into urethane groups, to form compounds of the above formula.

As examples of Friedel-Crafts catalysts suitable for the reaction of the halogenotriazines with the 1,3-dihydroxybenzenes there may be mentioned sodium-aluminium fluoride, tin tetrachloride, boron trifluoride, ferric chloride and aluminium tribromide, and more especially aluminium trichloride. For every mol of the 1,3-dihydroxy benzene there are used 0.3 to 3.0 mols, preferably 0.8 to 1.5 mols, of catalyst. The 1,3-dihydroxybenzenes are most advantageously used in stoichiometric proportions, if necessary slightly above stoichiometric proportions, but this is not a factor that limits the progress of the reaction.

As suitable inert solvents there may be mentioned methylenechloride, dichloroethane, tetrachloroethane, tetrachloroethylene, dichlorobenzene, carbon disulphide and nitrobenzene. The reaction may be carried out at a temperature ranging from 0° C. to 150° C., preferably from 15° C. to 100° C. When a low-boiling solvent is used, the reaction is preferably performed at its reflux temperature.

The compounds obtained in the manner described above contain one or two 2',4'-dihydroxyphenyl groups. While, as is known, the functional conversion of only one hydroxyl group in a 1,3-dihydroxybenzene proceeds only little selectively and gives a poor yield, it is possible to convert the 4'-hydroxyl groups in the above 2',4'-dihydroxyphenyltriazines by known methods and with a high selectivity and in good yield into ether, ester or urethane groups.

The etherification is advantageously performed, for example, with halides, especially bromides, such as ethylenechlorohydrin, n-allyl bromide, n-bromooctane, n-bromooctadecane, benzylchloride, para-chlorobenzylchloride, crotylbromide, γ-bromobutyronitrile, choloroacetic acid ethyl ester, γ-bromobutyric acid ethyl ester, 1-chloro-3-bromopropane, phenacylbromide, bromoacetic acid methyl ester, bromoacetic acid or with bromopropionic acid amide; or with alkylating agents such as dimethyl-sulfate or diethylsulphate, which are used in an inert solvent system such as acetone, aqueous acetone, methyl-ethylketone, dioxane, dimethylformamide or dimethylsulphoxide, in the presence of a preferably stoichiometric proportion of an acid acceptor, such as potassium carbonate or sodium hydroxide, at a temperature ranging from 20° C. to 100° C.

The isocyanates to be converted into the urethane group corresponds, for example, to the formula

(37)         D—N=C=O where D has the same meaning as in Formula 3. As relevant examples there may be mentioned:

Methyl-isocyanate,           phenyl-isocyanate,
n-butyl-isocyanate,          p-ethoxyphenyl-isocyanate,
dodecyl-isocyanate,          p-chlorophenyl-isocyanate,
octadecyl-isocyanate,        o-tolyl-isocyanate and
cyclohexyl-isocyanate,       p-tolyl-isocyanate.

The reaction is most advantageously carried out in the presence of a tertiary amine, if necessary in an inert organic solvent such as benzene.

For the esterification there are used, for example, acid halides or acid anhydrides, such as those of the formula

(38)     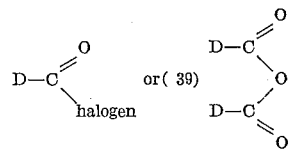     or (39)

where D has the same meaning as in the Formula 3.

As suitable acid halides of the Formula 26 and acid anhydrides of the Formula 27 there may be mentioned, for example, those of the following acids:

Acetic acid,                 salicylic acid,
butyric acid,                para-chlorobenzoic acid, and
stearic acid,                para-tertiary butylbenzoic acid.
benzoic acid, The reaction may be performed in the presence of a tertiary amine such as pyridine, if necessary in the presence of an inert solvent such as acetone, at a temperature ranging from 0° C. to the boiling point of the solvent system, preferably between 15° C. and 100° C. Alternatively, the esterification may be carried out in a higher boiling solvent such as toluene, chlorobenzene or dichlorobenzene in the absence of a tertiary amine with an acid anhydride or acid halide at a temperature from 80° C. to 170° C. whereby, in the case of the acid halides, the hydrogen halide formed is eliminated in gaseous form from the system.

Transesterification catalysts suitable for the preparatively most important transesterification process for the manufacture of compounds of the Formula 23 are, for example: alkali metals such as sodium or potassium; alkali metal hydroxides such as sodium or potassium hydroxides, and alkali metal alcoholates, preferably those of the $X_6$—OH alcohol used in the reaction. It is advantageous to use an excess of the $X_6$—OH alcohol and in many cases it serves as a solvent in the reaction. Alternatively, there may be used inert solvents such as benzene, toluene or chlorobenzene for diluting the reaction mixture.

It will be readily understood that such transesterification reactions give the best results when the residue $R_7$, together with the oxygen atom with which it is bound, forms a hydroxyl, ether or urethane group. If, together with the oxygen atom, it forms an ester group, the transesterification reaction may set in both on the residue —O—$X_4$ and on the residue —O—$R_7$, which causes the formation of undesired mixtures.

Specifically valuable hydroxyphenyl-1,3,5-triazines according to the present invention corresponds, for example, to the formula (22a) 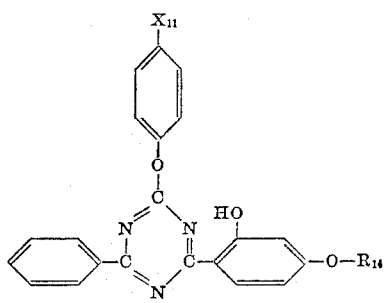

in which $X_{11}$ represents a branched alkyl group containing 1 to 8 carbon atoms and $R_{14}$ an alkyl group containing 1 to 4 carbon atoms; furthermore those of the formula (22b) 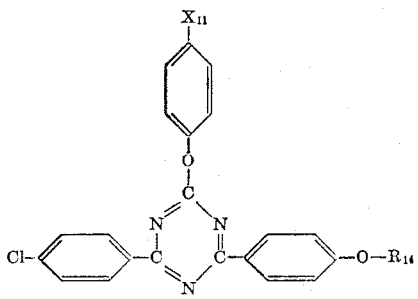

in which $X_{11}$ represents a branched alkyl group containing 1 to 8 carbon atoms and $R_{14}$ an alkyl group containing 1 to 4 carbon atoms; furthermore hydroxyphenyl-1,3,5-triazines of the formula (22c) 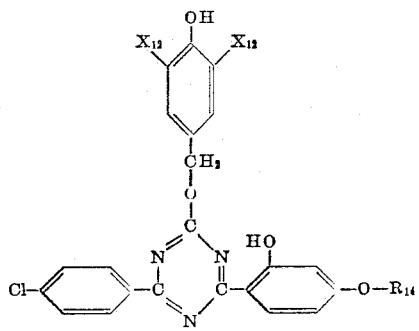

and those of the formula (22d) 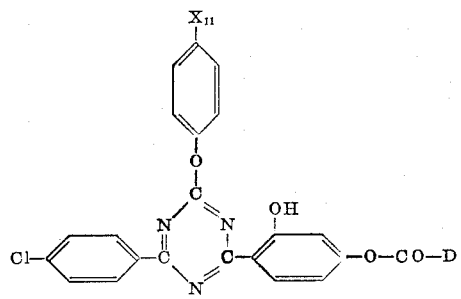

where $X_{11}$ and D each represents an alkyl group containing 1 to 8 carbon atoms; furthermore those of the formula (22e) 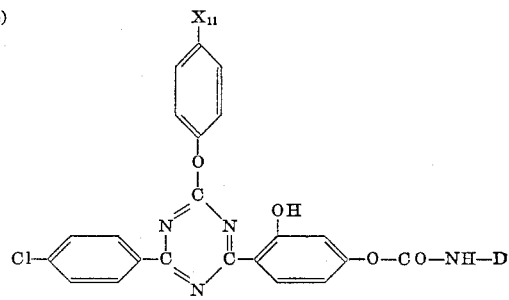

where $X_{11}$ and D each represents an alkyl group containing 1 to 8 carbon atoms; furthermore those of the formula (22f) 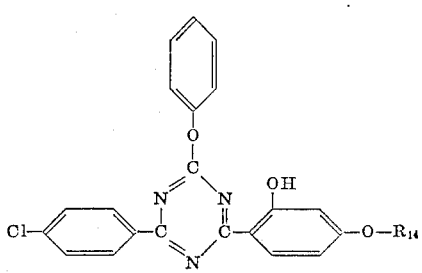

where $R_{14}$ represents an alkyl group containing 1 to 4 carbon atoms; furthermore those of the formula (22g) 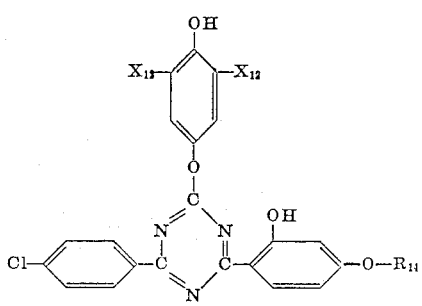

where $X_{12}$ may represent a hydrogen atom, at least one residue $X_{12}$ is a branched alkyl group containing up to 8 carbon atoms, and $R_{14}$ represents an alkyl group containing 1 to 4 carbon atoms.

The new hydroxyphenyl-1,3,5-triazines of the compositions defined above are suitable for use as stabilizers for a wide variety of organic materials, especially as ultraviolet filters.

Accordingly, the present invention further includes a process for protecting organic materials from the harmful action of heat, air and especially ultraviolet irradiation, using a new hydroxyphenyl-1,3,5-triazine of the Formula 2.

Quite generally, there are three different ways of using the new products, either separately or in combinations:

(A) The stabilizer, especially the light filter, is incorporated with a substrate to protect it from the attack by ultraviolet rays, so as to prevent a change in one or more physical properties, for example discoloration, impairment of the tear strength, embrittlement or the like and/or chemical reactions triggered off by ultraviolet rays, for example oxidation. The incorporation may take place before or during the manufacture of the substrate or subsequently by a suitable operation, for example by a fixing operation similar to a dyeing process.

(B) The light filter is incorporated with a substrate in order to protect one or more other substances contained in the substrate, for example dyestuffs, assistants or the like. The protection of the substrate described under (A) above may be achieved at the same time.

(C) The light filter is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and especially ultraviolet rays consists in incorporating a new hydroxyphenyl-1,3,5-triazine of the Formula 2 with, or fixing on, the organic material to be protected itself or a substrate containing the said material or a filter layer placed on top of the material to be protected.

As examples of organic materials that can be protected there may be mentioned:

(a) Textile materials quite generally, which may be in any desired form e.g. in the form of fibres, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials accessible by polymerization or co-polymerization, for example polyacrylonitrile, polyvinyl chloride or polyolefines such as polyethylene and polypropylene, or those which are accessible by polycondensation, such as polyesters and above all polyamides, or polyadducts such, for example, as polyurethane. In the case of semi-synthetic materials it is of advantage to incorporate the protective agent already with a spinning mass, for example a viscose spinning mass, acetylcellulose spinning mass (including cellulose triacetate) and masses destined for the manufacture of fully synthetic fibres, such as polyamide melts or polyacrylonitrile spinning masses, before, during or after the polycondensation or polymerization respectively.

(b) Other fibrous materials not being textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibres, more especially paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from acetylcellulose, cellulose propionate, cellulose butyrate or cellulose mixtures, for example cellulose acetate+butyrate and cellulose acetate+propionate; also nitrocellulose, vinylacetate, polyvinyl chloride, poyvinylidene chloride, copolymers of vinyl chloride and vinylidene chloride, alkyd lacquers, polyethylene, polypropylene, polyamides, polyacrylonitrile, polyesters, polyadducts such as polyurethanes and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine; as well as emulsions of synthetic resins (for example oil-in-water or water-in-oil emulsions). In this case it is of advantage to add the protective agent before or during the polymerization or polycondensation respectively. Furthermore, there may be mentioned synthetic resins reinforced with glass fibres and laminates made therefrom.

(f) Hydrophobic substances containing oil, fat or wax, such as candles, floor polishes, floor stains or other wood stains, furniture polishes, especially those destined for the treatment of light-coloured, possibly bleached, wood surfaces.

(g) Natural rubber-like materials such as rubber, balata, gutta percha or synthetic, vulcanizable materials such as polychloroprene, olefinic polysulphides, polybutadiene or copolymers of butadiene+styrene (for example Buna S) or butadiene+acrylonitrile (for example Buna N) which may also contain fillers, pigments, vulcanization accelerators and the like, and in whose case the addition of the hydroxyphenyl-1,3,5-triazines aims at delaying the aging and thus preventing changes in the plasticity properties and embrittlement.

(h) Cosmetic preparations such as perfumes, dyed or undyed soaps and bath salts, skin and face creams, powders, repellants and especially sunburn oils and creams.

It goes without saying that the hydroxyphenyl-1,3,5-triazines are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Depending on the kind of material to be treated, demands made on the efficiency and durability and other requirements, the amount of the stabilizer, especially light filter, to be incorporated with the material to be treated may be varied within rather wide limits, for example from about 0.01 to 10%, preferably from 0.1 to 2%, of the weight of the material which is to be directly protected from the harmful effects of heat, air and especially ultraviolet rays.

It is worthy of mention that the hydroxyphenyl-1,3,5-triazines of the above Formula 2 possess not only stabilizing properties towards organic materials but also display fungicidal and/or bactericidal actions.

Unless otherwise indicated, parts and percentages in the following examples are by weight. Melting points are uncorrected. In the tables of the following examples the columns invariably contain the following details:

Column I—Formula No.
Column II—Structural formula
Column III—Melting point in ° C.
Column IV—Analytical data for C, H, N, the upper line showing the calculated values and the lower line the values found; underneath the empirical formula.

The melting points marked "X" in Column III signify "with decomposition."

EXAMPLES 1 TO 5 AND TABLE A

The following Examples 1 to 5 and Table A are concerned with compounds of the general Formula 21, the Examples 1 to 5 illustrating variants of their manufacture. The compounds listed in Table A have been manufactured in a similar manner. Concerning etherification with dialkylsulphates see Example 11 which precedes Table C.

*Example 1*

21.6 parts of para-cresol are stirred into a solution of 45.2 parts of 2-phenyl-4,6-dichlorotriazine in 150 parts of dioxane and the whole is heated to 35° C. 93 parts of a 2.15 N-sodium hydroxide solution are then dropped in at 35 to 40° C. so rapidly that the pH does not rise above 7. 400 parts of water are then added, the batch is stirred on for 1 hour at 35° C., then cooled to 10° C. and the colourless product of the formula (40)

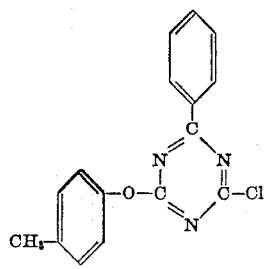

is suctioned off. An analytically pure specimen, obtained by recrystallization from methylenechloride+alcohol, melts at 131 to 132° C.

$C_{16}N_{12}ON_3Cl$—Calculated: C, 64.54; H, 4.06; N, 14.11%. Found: C, 64.44; H, 4.15; N, 13.92%.

9.1 parts of resorcinol and then 11.5 parts of anhydrous aluminium chloride are added at 20° C. to a solution of 24.6 parts of the compound of the Formula 40 in 100 parts of nitrobenzene. The batch is stirred for 16 hours at 40 to 45° C., then poured into water, and the nitrobenzene is expelled with steam. The residue is suctioned off and dried. Yield: about 30 parts. Melting point: 195 to 196° C. The analytically pure product, obtained after three recrystallizations from benzene+hexane, of the formula (41)

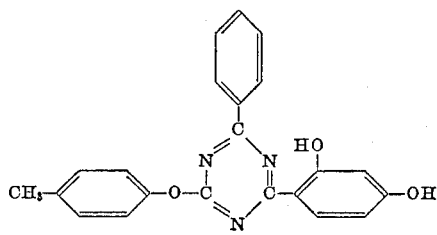

melts at 200 to 200.5° C.

$C_{22}H_{17}O_3N_3$—Calculated: C, 71.15; H, 4.61; N, 11.32%. Found: C, 71.32; H, 4.72; N, 11.56%.

*Example 2.—Etherification with methylethylketone +potassium carbonate*

One variant of the manufacture of compounds of the general Formula 21 is described below:

19.6 parts of the compound of the formula (42)

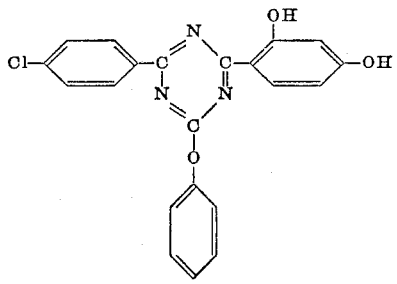

were stirred for 16 hours at 80° C. with 8 parts of potassium carbonate and 9 parts of γ-bromobutyronitrile in 100 parts of methylethylketone. When the reaction mixture had cooled to room temperature, 100 parts of methanol were added, and the precipitated product of the formula (43)

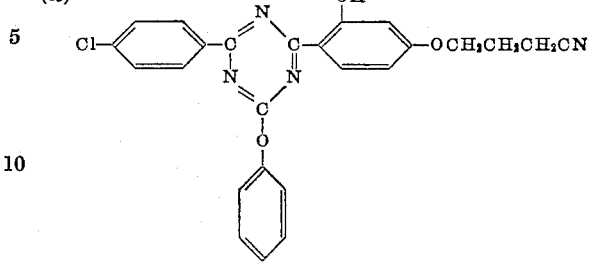

was suctioned off and rinsed with methanol.

To free it from any residual basic substances the crude product was suspended in 100 parts of water, acidified with dilute hydrochloric acid and then again suctioned and washed with water until the washings ran neutral. Yield after drying under vacuum at 90° C.: 16.45 parts.

An analytically pure product, obtained by recrystallization from benzene+methanol, melts at 155 to 156° C.

$C_{25}H_{19}O_3N_4Cl$—Calculated: C, 65.43; H, 4.17; N, 12.21%. Found: C, 65.47; H, 4.22; N, 12.44%.

The method described above can be applied in an identical manner to the systems acetone+potassium carbonate and dimethylsulfoxide+potassium carbonate.

The compound of the formula (44)

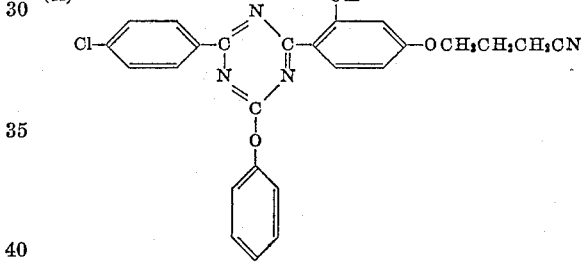

can be obtained in a similar manner.

*Example 3*

11.75 parts of the compound of the formula (42)

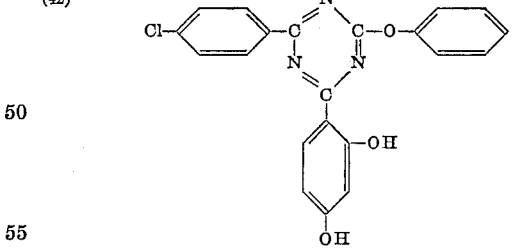

were dissolved in 120 parts of benzene and 12 parts of triethylamine. On addition of 2.4 parts of methylisocyanate to the clear solution crystallization of the final product set in immediately. To complete the reaction the batch was stirred for a further 3 hours at 80° C., then cooled to room temperature and mixed with 120 parts of petroleum ether. The substantially colourless product of the formula (45)

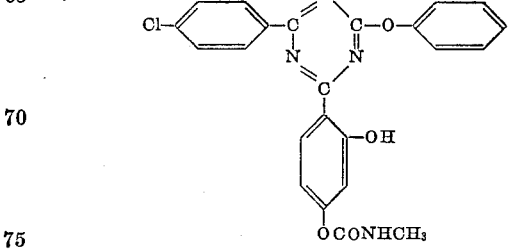

was suctioned off, rinsed with petroleum ether and dried under vacuum. Yield: 9.6 parts (=71.2% of the theoretical). The crude product melts at 202 to 203.5° C. and reveals the following analytical data:

$C_{23}H_{17}O_4N_4Cl$—Calculated: C, 61.54; H, 3.82; N, 12.48%. Found: C, 61.67; H, 3.83; N, 12.37%.

*Example 4.—(Esterification)*

11.2 parts of 2-(4'-chlorophenyl)-4-(2'-methyl-4'-isopropylphenyloxy) - 6 - (2',4' - dihydroxyphenyl) - 1,3,5-triazine are dissolved at 18 to 22° C. in 120 parts of acetone and 30 parts of pyridine. In the course of 30 minutes a solution of 4.7 parts of 4'-chlorobenzoyl chloride in 40 parts of acetone is stirred in and the batch is stirred on for 8 hours each at 18 to 22° C., at 40 to 45° C. and then under reflux. The reaction mixture is then poured into 500 parts of water, suctioned and the filter residue is rinsed with 1000 parts of water, to yield 13.3 parts of the compound of the formula

(46)
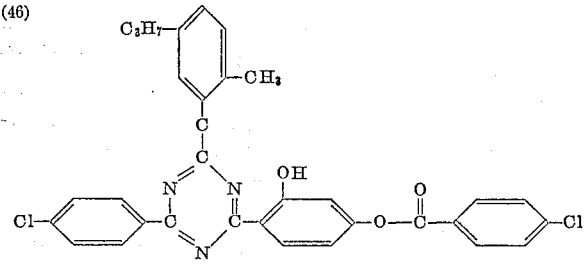

which melts at 168 to 169° C. after one recrystallization from methylenechloride+alcohol.

$C_{32}H_{25}O_4N_3Cl_2$—Calculated: C, 65.54; H, 4.30; N, 7.17%. Found: C, 65.45; H, 4.26; N, 7.29%.

*Example 5*

13.5 parts of 2-(4'-chlorophenyl)-4-(2'-methyl-4'-chlorophenyl) - 6 - (2',4' - dihydroxyphenyl) - 1,3,5-triazine in 100 parts of chlorobenzene are heated to 120° C. and 3.4 parts of acetic anhydride are added. After 3 hours at 120° C. the reaction mixture is mixed at 80° C. with 250 parts of alcohol and then cooled in an ice bath. The crystalline product is suctioned off, washed with 50 parts of alcohol and dried, to yield 13.5 parts, melting at 187 to 189° C.

(176)
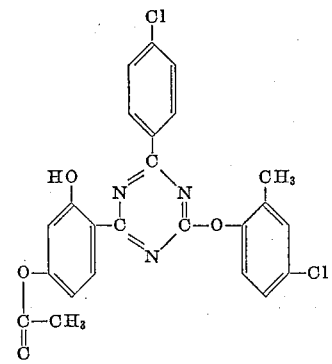

$C_{24}H_{17}O_4N_3Cl_2$—Calculated: C, 59.77; H, 3.55; N, 8.71%. Found: C, 59.81; H, 3.35; N, 8.83%.

The compound of the formula

(47)
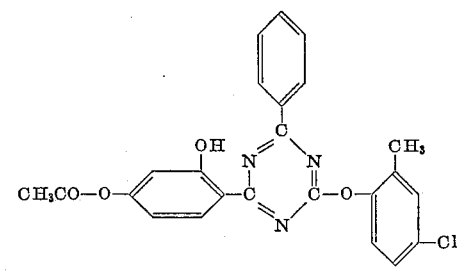

can be manufactured in a similar manner.

A

| I | II | III | IV |
|---|---|---|---|
| 48 | ![structure with HO, triazine, phenyl, Cl, O-H substituents] | 242–243° | 64.38  3.60  10.72<br>64.04  3.61  10.58<br><br>$C_{21}H_{14}O_3N_3Cl$ |
| 49 | ![structure with HO, triazine, phenyl, Cl, O-C₂H₅ substituents] | 182–183° | 65.79  4.32  10.01<br>65.77  4.45  10.03<br><br>$C_{23}H_{18}O_3N_3Cl$ |

| I | II | III | IV |
|---|---|---|---|
| 50 | (structure) | 183–184° | 69.78  4.18  8.72<br>70.07  4.23  8.84<br><br>$C_{29}H_{20}O_3N_3Cl$ |
| 51 | (structure) | 191–192° | 65.11  3.97  10.35<br>64.68  4.03  10.36<br><br>$C_{22}H_{16}O_3N_3Cl$ |
| 52 | (structure) | 167–168° | 72.16  5.30  10.52<br>72.39  5.30  10.61<br><br>$C_{24}H_{21}O_3N_3$ |
| 53 | (structure) | 181–182° | 75.47  5.02  9.11<br>75.20  5.18  8.87<br><br>$C_{29}H_{23}O_3N_3$ |
| 54 | (structure) | 174–175° | 70.58  4.23  11.76<br>70.65  4.35  11.79<br><br>$C_{21}H_{15}O_3N_3$ |

A—Continued

| I | II | III | IV |
|---|---|---|---|
| 55 | [structure: triazine with HO-phenyl-OC₂H₅, phenyl, and O-phenyl substituents] | 191–191.5° | 71.67 4.97 10.90<br>71.46 4.96 10.84<br>C₂₃H₁₉O₃N₃ |
| 56 | [structure: triazine with HO-phenyl-OCH₂-phenyl, phenyl, and O-phenyl substituents] | 161–162° | 75.05 4.92 9.38<br>75.15 4.73 9.39<br>C₂₈H₂₁O₃N₃ |
| 57 | [structure: triazine with HO-phenyl-OCO-phenyl, phenyl, and O-phenyl substituents] | 181–181.5° | 72.87 4.15 9.11<br>72.91 4.44 9.12<br>C₂₈H₁₉O₄N₃ |
| 58 | [structure: triazine with HO-phenyl-OCONHCH₃, phenyl, and O-phenyl substituents] | 189–191° | 66.66 4.38 13.52<br>66.70 4.40 13.70<br>C₂₃H₁₈O₄N₄ |
| 59 | [structure: triazine with HO-phenyl-OCONH-phenyl, phenyl, and O-phenyl substituents] | 187–189° | 70.58 4.23 11.76<br>70.90 4.50 11.70<br>C₂₈H₂₀O₄N₄ |

A—Continued

| I | II | III | IV |
|---|---|---|---|
| 60 | (structure: triazine with phenyl, HO-phenyl-O-CONH(CH$_2$)$_{17}$CH$_3$, and O-phenyl) | 159–161° | 70.29  6.29  10.93<br>70.10  6.20  11.30<br>C$_{40}$H$_{52}$O$_4$N$_4$ |
| 61 | (structure: triazine with phenyl, HO-phenyl-O-CH$_2$COOC$_2$H$_5$, and O-phenyl) | 110–111° | 67.71  4.77  9.48<br>67.95  4.85  9.52<br>C$_{25}$H$_{21}$O$_5$N$_3$ |
| 62 | (structure: triazine with phenyl, HO-phenyl-OCH$_3$, and O-phenyl) | 160.5–161° | 71.15  4.61  11.32<br>71.31  4.76  11.11<br>C$_{22}$H$_{17}$O$_3$N$_3$ |
| 63 | (structure: triazine with phenyl, CH$_3$OCO-phenyl-OCOCH$_3$, and O-phenyl) | 148° | 68.02  4.34  9.52<br>68.23  4.26  9.72<br>C$_{25}$H$_{19}$N$_3$O$_5$ |
| 64 | (structure: triazine with 4-Cl-phenyl, HO-phenyl-OH, and O-phenyl-C$_9$H$_{19}$) | 155–156° | 69.55  6.23  8.11<br>69.27  6.54  8.10<br>C$_{30}$H$_{32}$O$_3$N$_3$Cl |

A—Continued
| I | II | III | IV |
|---|---|---|---|
| 65 | 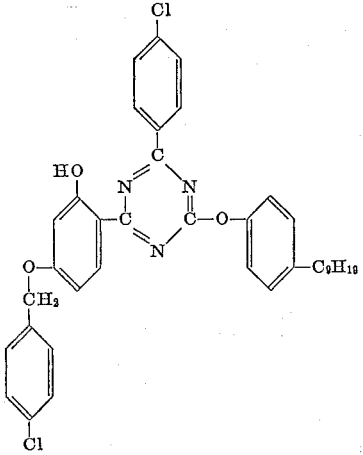 | 139–140° | 68.57 5.91 6.66<br>68.81 5.83 6.32<br><br>$C_{36}H_{37}O_3N_3Cl_2$ |
| 66 | 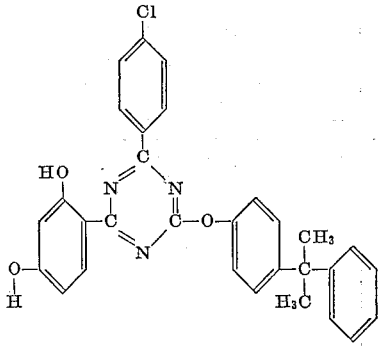 | 115–116° | 70.65 4.74 8.24<br>70.54 5.06 8.40<br><br>$C_{30}H_{24}O_3N_3Cl$ |
| 67 | 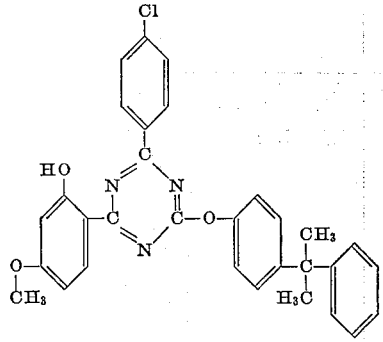 | 139–140° | 71.05 5.00 8.02<br>71.08 5.25 7.73<br><br>$C_{31}H_{26}O_2N_3Cl$ |
| 68 | 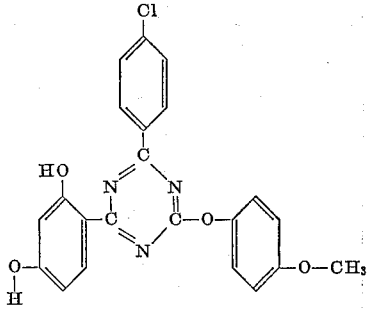 | 209–210° | 62.64 3.82 9.96<br>62.49 3.90 9.76<br><br>$C_{22}H_{16}O_4N_3Cl$ |

| I | II | III | IV |
|---|---|---|---|
| 69 | (structure: triazine with 4-Cl-phenyl, 2-hydroxy-3,4-dimethoxyphenyl, and 4-methoxyphenoxy) | 182–183° | 63.38 4.16 9.64<br>63.49 4.02 9.70<br>$C_{23}H_{18}O_4N_3Cl$ |
| 70 | (structure: triazine with 4-Cl-phenyl, 2-hydroxy-4-butoxyphenyl, and 4-methoxyphenoxy) | 170–171° | 67.60 5.24 9.10<br>67.57 5.32 9.06<br>$C_{26}H_{24}O_3N_3Cl$ |
| 71 | (structure: triazine with 4-Cl-phenyl, 2-hydroxy-4-octyloxyphenyl, and 4-methoxyphenoxy) | 127–128° | 67.47 6.04 7.87<br>67.57 6.05 7.82<br>$C_{30}H_{32}O_4N_2Cl$ |
| 72 | (structure: triazine with 4-Cl-phenyl, 2,4-dihydroxyphenyl, and 2-methyl-4-tert-butylphenoxy) | 112–113° | 67.60 5.24 9.10<br>67.90 5.68 8.94<br>$C_{26}H_{24}O_3N_3Cl$ |
| 73 | (structure: triazine with 4-Cl-phenyl, 2-hydroxy-4-methoxyphenyl, and 2-methyl-4-tert-butylphenoxy) | 126–127° | 68.23 5.51 8.83<br>68.76 5.72 8.77<br>$C_{27}H_{26}O_3N_3Cl$ |

A—Continued

| I | II | III | IV |
|---|---|---|---|
| 74 | (structure) | 232–233° | 65.11  3.97  10.35<br>65.04  4.19  10.18<br>$C_{22}H_{16}O_3N_3Cl$ |
| 75 | (structure) | 211–212° | 65.79  4.32  10.01<br>65.86  4.14  9.91<br>$C_{23}H_{18}O_3N_3Cl$ |
| 76 | (structure) | 170–171° | 67.60  5.24  9.10<br>67.57  5.32  9.06<br>$C_{26}H_{24}O_3N_3Cl$ |
| 77 | (structure) | 134–135° | 69.55  6.23  8.11<br>69.46  6.30  8.03<br>$C_{30}H_{32}O_3N_3Cl$ |
| 78 | (structure) | 182–183° | 70.23  4.47  8.47<br>70.34  4.68  8.63<br>$C_{29}H_{22}O_3N_3Cl$ |

A—Continued

| I | II | III | IV |
|---|---|---|---|
| 79 | (structure) | 133–134° | 71.12 7.02 7.32<br>71.38 7.16 7.41<br><br>$C_{34}H_{40}O_3N_3Cl$ |
| 80 | (structure) | 186–187° | 65.67 3.99 7.92<br>65.77 4.38 7.89<br><br>$C_{29}H_{21}O_3N_3Cl_3$ |
| 81 | (structure) | 123–124° | 72.98 7.96 6.38<br>73.15 8.19 6.55<br><br>$C_{40}H_{52}O_3N_3Cl$ |
| 82 | (structure) | 266–267° | 59.17 3.07 9.86<br>59.24 3.30 10.04<br><br>$C_{21}H_{13}O_3N_3Cl_2$ |
| 83 | (structure) | 198–199° | 60.02 3.43 9.54<br>59.95 3.44 9.68<br><br>$C_{22}H_{15}O_3N_3Cl_2$ |

A—Continued

| I | II | III | IV |
|---|---|---|---|
| 84 | 4-Cl-C6H4 at top; 2-HO, (O-C4H9) phenyl; 4-Cl-phenoxy | 160–161° | 62.25 4.39 8.71<br>62.33 4.48 8.77<br>$C_{25}H_{21}O_3N_3Cl_2$ |
| 85 | 4-Cl-C6H4 at top; 2-HO, (O-C8H17) phenyl; 4-Cl-phenoxy | 129–130° | 64.69 5.43 7.80<br>64.96 5.69 7.97<br>$C_{29}H_{29}O_3N_3Cl_2$ |
| 86 | 4-Cl-C6H4 at top; 2-HO, (O-CH2-CH=CH2) phenyl; 4-Cl-phenoxy | 149–150° | 61.82 3.67 9.01<br>62.05 3.55 9.03<br>$C_{24}H_{17}O_3N_3Cl_2$ |
| 87 | 4-Cl-C6H4 at top; 2-HO, (O-C18H37) phenyl; 4-Cl-phenoxy | 115–116° | 69.01 7.28 6.19<br>69.24 7.56 6.21<br>$C_{39}H_{49}O_3N_3Cl_2$ |
| 88 | 4-Cl-C6H4 at top; 2-HO, (OH) phenyl; 2-biphenyloxy | 229–230° | 69.31 3.88 8.98<br>69.22 3.93 9.04<br>$C_{27}H_{18}O_3N_3Cl$ |

A—Continued
| I | II | III | IV |
|---|---|---|---|
| 89 | 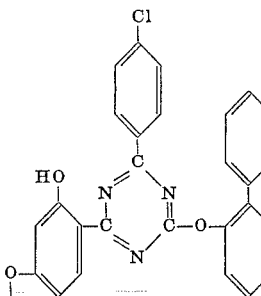 | 191–192° | 69.78  4.18  8.72<br>69.94  4.47  8.60<br><br>$C_{28}H_{20}O_3N_3Cl$ |
| 90 | 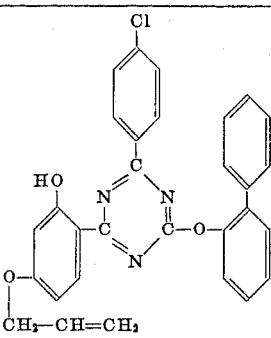 | 119–120° | 72.46  5.91  7.24<br>72.33  5.86  7.26<br><br>$C_{35}H_{34}O_3N_3Cl$ |
| 91 | 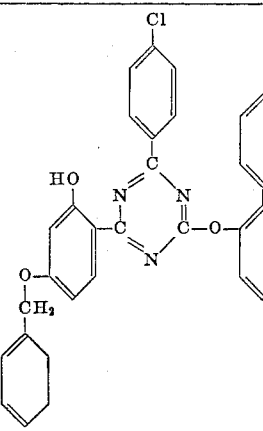 | 167–168° | 73.18  4.34  7.53<br>73.26  4.50  7.24<br><br>$C_{34}H_{24}O_3N_3Cl$ |
| 92 | 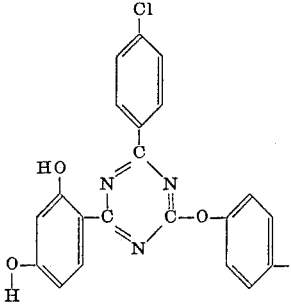 | 202–203° | 62.14  3.91  9.06<br>61.61  4.00  9.04<br><br>$C_{24}H_{18}O_5N_3Cl$ |
| 93 | 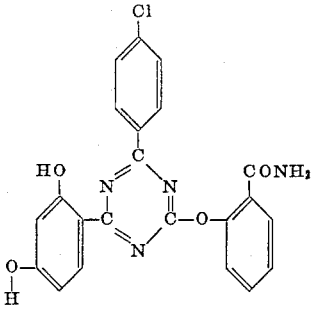 | 166–167° | 60.77  3.48  12.88<br>60.17  3.36  13.30<br><br>$C_{22}H_{15}O_4N_4Cl$ |

A—Continued
| I | II | III | IV |
|---|---|---|---|
| 94 | 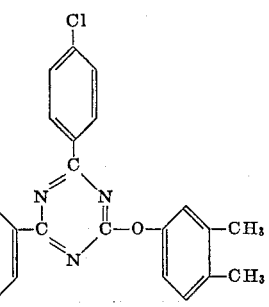 | 230–231° | 65.79 4.32 10.01<br>65.95 4.53 9.93<br><br>$C_{23}H_{18}O_3N_3Cl$ |
| 95 | 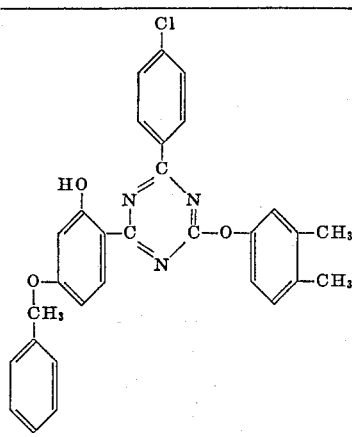 | 152–153° | 70.65 4.74 8.24<br>70.41 4.72 8.26<br><br>$C_{30}H_{24}O_3N_3Cl$ |
| 96 | 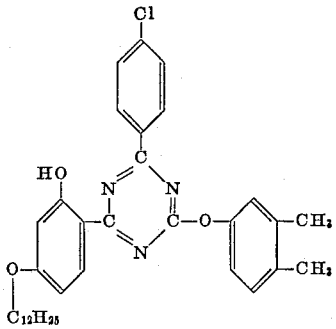 | 106–107° | 71.47 7.20 7.14<br>71.41 7.38 7.29<br><br>$C_{35}H_{42}O_3N_3Cl$ |
| 97 | 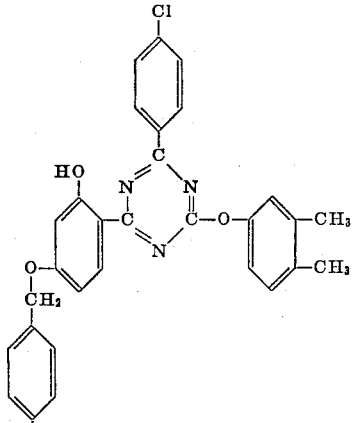 | 180–181° | 66.18 4.26 7.47<br>66.77 4.34 7.47<br><br>$C_{30}H_{23}O_3N_3Cl_2$ |

A—Continued
| I | II | III | IV |
|---|---|---|---|
| 98 | 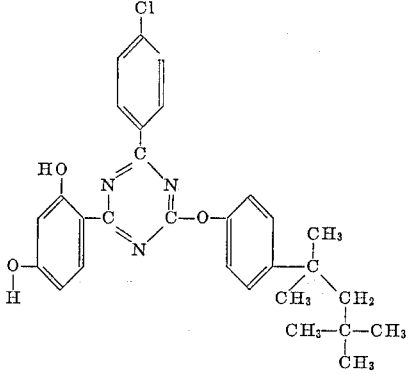 | 208–09° | 69.11  6.00  8.34<br>69.05  6.10  8.46<br><br>$C_{29}H_{30}O_3N_3Cl$ |
| 99 | 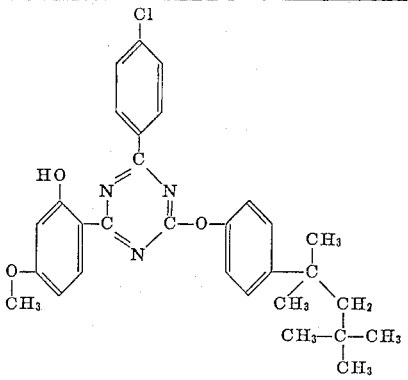 | 179–180° | 69.55  6.23  8.11<br>69.68  5.98  8.16<br><br>$C_{30}H_{32}O_3N_3Cl$ |
| 100 | 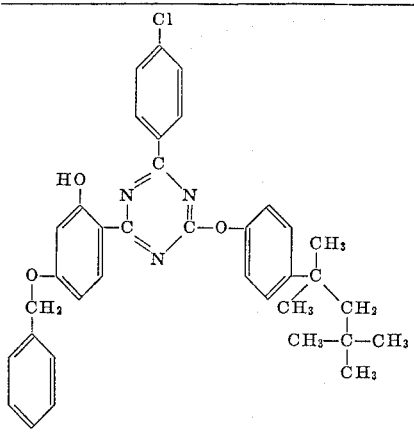 | 170–171° | 72.77  6.11  7.07<br>73.07  6.24  6.96<br><br>$C_{36}H_{36}O_3N_3Cl$ |
| 101 | 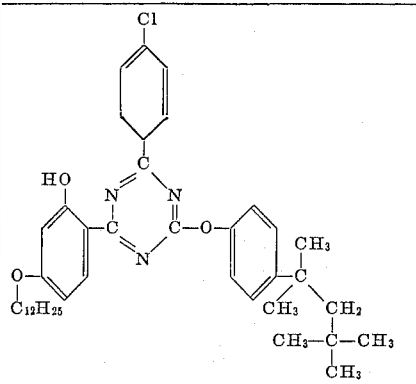 | 71–72° | 73.24  8.10  6.25<br>73.37  8.16  6.14<br><br>$C_{41}H_{54}O_3N_3Cl$ |

A—Continued
| I | II | III | IV |
|---|---|---|---|
| 102 | 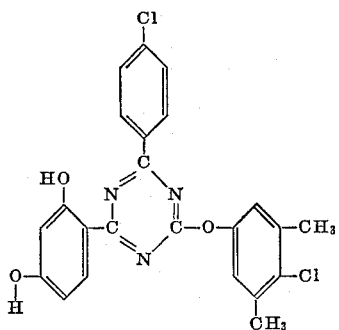 | 262–263° | 61.82 3.67 9.01<br>61.73 3.95 9.28<br>$C_{23}H_{17}O_3N_3Cl_2$ |
| 103 | 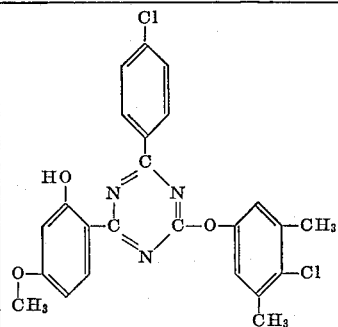 | 221–222° | 61.55 4.09 8.89<br>61.51 4.04 9.87<br>$C_{24}H_{19}O_3N_3Cl_2$ |
| 104 | 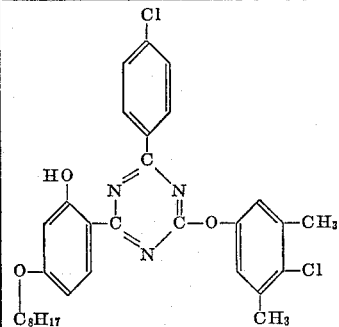 | 139–140° | 65.72 5.87 7.42<br>65.58 5.87 7.57<br>$C_{31}H_{33}O_3N_3Cl_2$ |
| 105 | 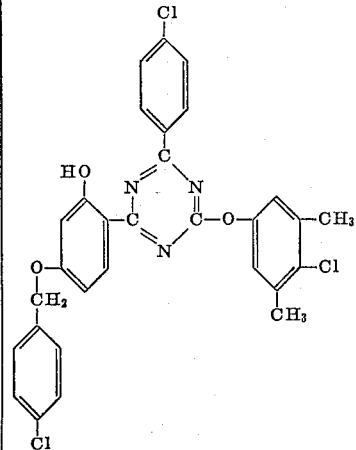 | 231–232° | 63.01 3.75 7.11<br>62.72 3.93 7.27<br>$C_{31}H_{22}O_3N_3Cl_2$ |

A—Continued

| I | II | III | IV |
|---|---|---|---|
| 106 | | 209–210° | 68.42  5.10  8.87<br>68.31  5.36  8.81<br><br>$C_{27}H_{24}O_3N_3Cl$ |
| 107 | | 169–170° | 68.92  5.37  8.61<br>68.62  5.42  8.54<br><br>$C_{28}H_{26}O_3N_3Cl$ |
| 108 | | 143–144° | 71.72  6.88  7.17<br>71.60  6.85  7.12<br><br>$C_{35}H_{40}O_3N_3Cl$ |
| 109 | | 176–177° | 72.40  5.36  7.45<br>72.47  5.35  7.42<br><br>$C_{34}H_{30}O_3N_3Cl$ |

A—Continued
| I | II | III | IV |
|---|---|---|---|
| 110 | 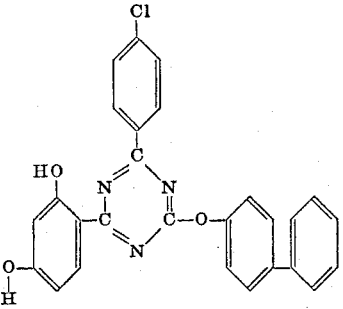 | 250–251° | 69.31 3.88 8.98<br>69.41 4.10 9.15<br>$C_{27}H_{18}O_3N_3Cl$ |
| 111 | 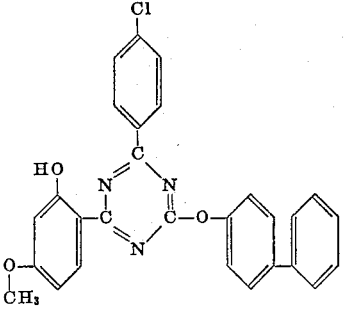 | 225–226° | 69.78 4.18 8.72<br>69.89 3.89 8.74<br>$C_{28}H_{20}O_3N_3Cl$ |
| 112 | 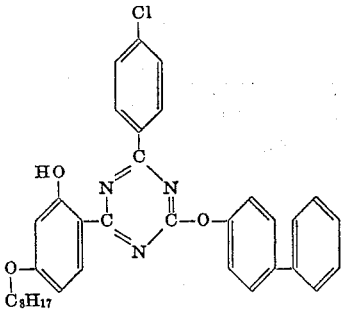 | 186–187° | 72.46 5.91 7.24<br>72.52 6.04 7.42<br>$C_{35}H_{34}O_3N_3Cl$ |
| 113 | 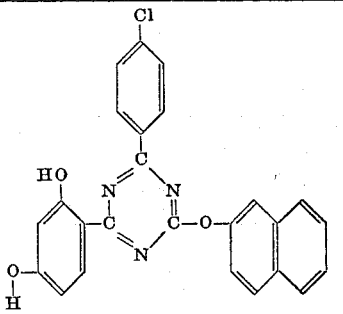 | 237–238° | 67.85 3.65 9.51<br>67.27 3.59 9.28<br>$C_{25}H_{16}O_3N_3Cl$ |
| 114 | 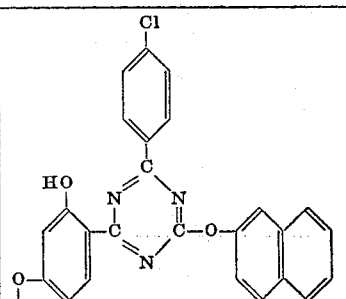 | 114–115° | 71.53 5.82 7.58<br>71.28 5.91 7.40<br>$C_{33}H_{32}O_3N_3Cl$ |

A—Continued
| I | II | III | IV |
|---|----|-----|----|
| 115 | 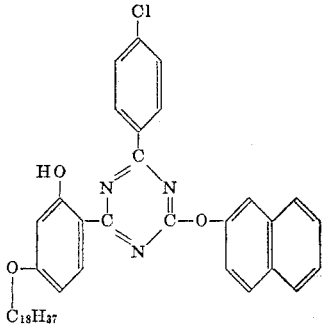 | 112–113° | 74.38 7.44 6.05<br>74.29 7.62 6.20<br><br>$C_{43}H_{52}O_3N_3Cl$ |
| 116 | 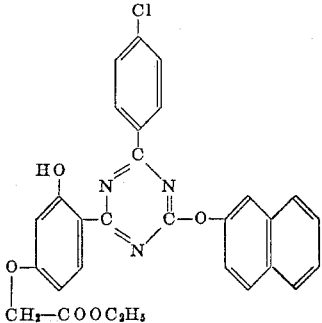 | 182–183° | 65.97 4.20 7.96<br>66.07 4.10 7.93<br><br>$C_{29}H_{22}O_5N_3Cl$ |
| 117 | 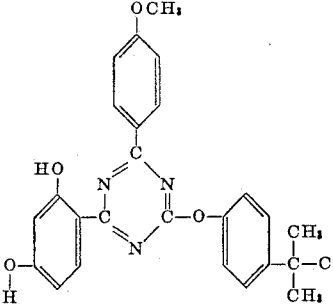 | 128–129° | 70.41 5.68 9.48<br>70.46 5.76 9.60<br><br>$C_{26}H_{25}O_4N_3$ |
| 118 | 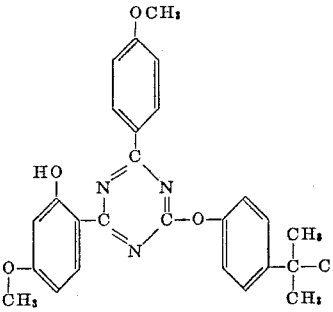 | 154–156° | 70.88 5.95 9.19<br>70.94 5.92 9.50<br><br>$C_{27}H_{27}O_4N_3$ |
| 119 | 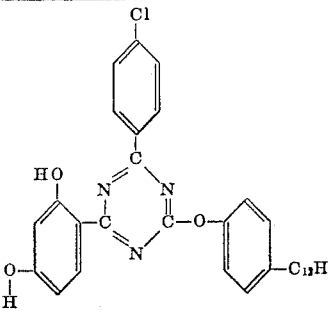 | >300° | 70.76 6.84 7.50<br>70.70 7.10 7.20<br><br>$C_{33}H_{35}O_3N_3Cl$ |

A—Continued
| I | II | III | IV |
|---|---|---|---|
| 120 | 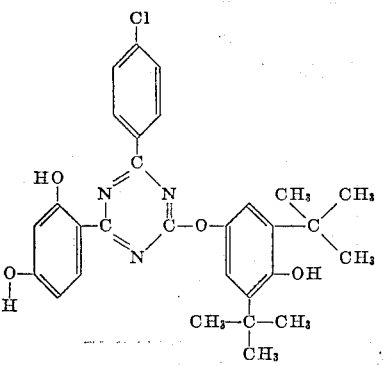 | 214–215° | 66.98  5.82  8.08<br>66.66  5.80  8.01<br><br>$C_{29}H_{30}N_3O_4Cl$ |
| 121 | 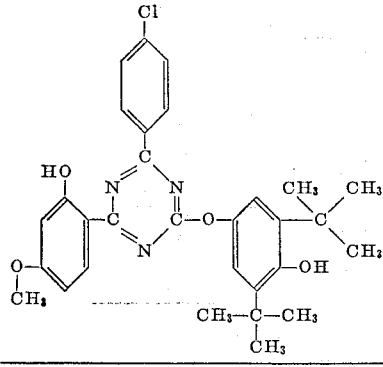 | 219–220° | 67.47  6.04  7.87<br>67.65  5.91  7.81<br><br>$C_{30}H_{32}O_4N_3Cl$ |
| 122 | 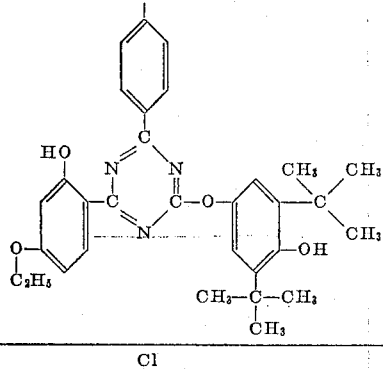 | 194–195° | 69.55  6.35  7.16<br>69.59  6.15  7.27<br><br>$C_{33}H_{38}O_4N_3Cl \cdot \frac{1}{2}C_6H_6$ |
| 123 | 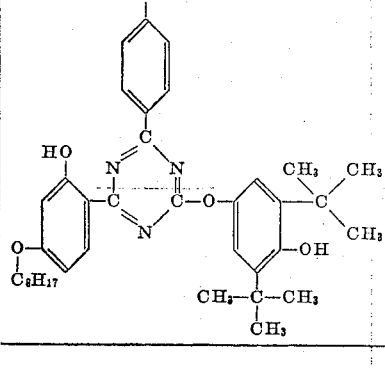 | 114–115° | 70.29  7.33  6.65<br>70.11  7.37  6.65<br><br>$C_{37}H_{36}N_3O_4Cl$ |

A—Continued

| I | II | III | IV |
|---|---|---|---|
| 124 | (structure) | 185–186° | 68.34 6.06 6.83<br>68.35 6.15 6.87<br><br>$C_{32}H_{34}N_3O_5Cl \cdot \tfrac{1}{2}C_2H_6$ |
| 125 | (structure) | 218–219° | 72.15 6.06 6.47<br>71.62 6.05 6.31<br><br>$C_{36}H_{36}O_4N_3Cl \cdot \tfrac{1}{2}C_6H_6$ |
| 126 | (structure) | 108–109° | 65.72 5.52 6.97<br>65.12 5.86 7.06<br><br>$C_{33}H_{36}O_6N_3Cl$ |
| 127 | (structure) | 178–179° | 67.04 4.95 9.38<br>67.12 5.01 9.27<br><br>$C_{25}H_{22}O_3N_3Cl$ |

A—Continued

| I | II | III | IV |
|---|---|---|---|
| 128 | (structure: triazine with 4-Cl-phenyl, 2-hydroxy-4-ethoxyphenyl, and 4-tert-butylphenoxy substituents) | 164–165° | 68.13  5.51  8.83<br>68.20  5.50  8.54<br><br>$C_{27}H_{26}O_3N_3Cl$ |
| 129 | (structure: triazine with 4-Cl-phenyl, 2-hydroxy-4-benzyloxyphenyl, and 4-tert-butylphenoxy substituents) | 190–191° | 71.43  5.25  7.81<br>71.35  5.34  7.53<br><br>$C_{32}H_{28}O_3N_3Cl$ |
| 130 | (structure: triazine with 4-Cl-phenyl, 2-hydroxy-4-(2-butenyloxy)phenyl, and 4-tert-butylphenoxy substituents; O—CH₂—CH=CH—CH₃) | 145–146° | 69.38  5.62  8.37<br>69.47  5.72  8.26<br><br>$C_{29}H_{28}O_3N_3Cl$ |
| 131 | (structure: triazine with 4-Cl-phenyl, 2-hydroxy-4-(lauroyloxy)phenyl, and 4-tert-butylphenoxy substituents; O—C(=O)—C₁₁H₂₃) | 66–67° | 70.52  7.04  6.67<br>70.74  6.88  6.71<br><br>$C_{37}H_{44}O_4N_3Cl$ |

A—Continued
| I | II | III | IV |
|---|---|---|---|
| 132 | 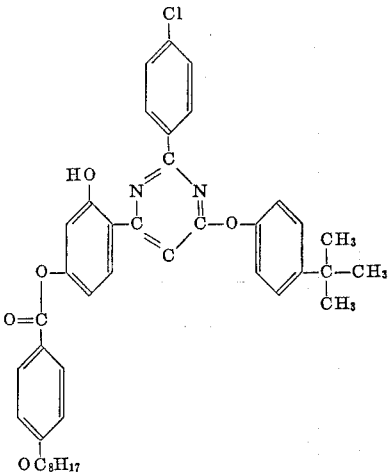 | 90–91° | 70.63 6.22 6.18<br>70.84 6.31 5.99<br><br>$C_{40}H_{42}O_5N_3Cl$ |
| 133 | 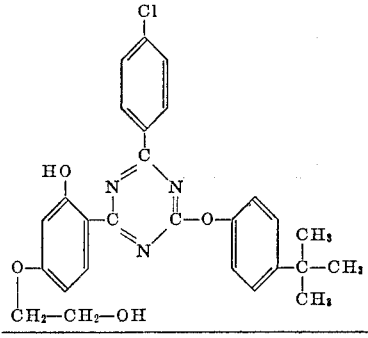 | 120–121° | 65.92 5.33 8.54<br>66.15 5.15 9.09<br><br>$C_{27}H_{26}O_4N_3Cl$ |
| 134 | 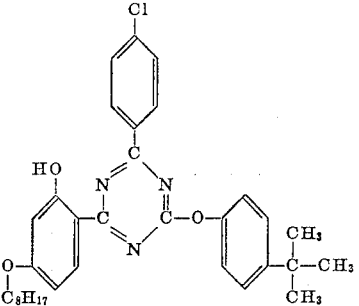 | 117–118° | 70.68 6.94 7.64<br>70.76 6.84 7.50<br><br>$C_{33}H_{38}O_3N_3Cl$ |
| 135 | 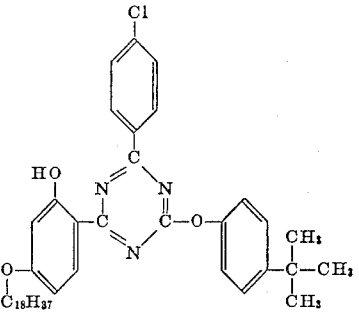 | 79–80° | 73.74 8.35 6.00<br>73.74 8.40 5.97<br><br>$C_{43}H_{58}O_3N_3Cl$ |

A—Continued

| I | II | III | IV |
|---|---|---|---|
| 136 | (structure) | 94–95° | 65.23  5.29  7.87<br>65.21  5.01  7.92<br>$C_{29}H_{28}O_5N_3Cl$ |
| 137 | (structure) | 252–253° | 60.02  3.43  9.54<br>60.18  3.43  9.71<br>$C_{22}H_{15}O_3N_3Cl_2$ |
| 138 | (structure) | 254–255° | 54.75  2.63  9.12<br>54.84  2.72  9.06<br>$C_{21}H_{12}O_3N_3Cl_3$ |
| 139 | (structure) | 283–284° | 57.74  3.00  12.83<br>57.91  3.09  12.65<br>$C_{21}H_{13}O_5N_4Cl$ |
| 140 | (structure) | 186–187° | 68.50  3.98  9.22<br>68.25  4.12  9.32<br>$C_{26}H_{18}O_3N_3Cl$ |

| I | II | III | IV |
|---|---|---|---|
| 141 | (structure: triazine with 4-Cl-phenyl, 2,4-dihydroxyphenyl, and 2,4-dichlorophenoxy substituents) | 240–241° | 50.94  2.24  8.49<br>50.82  2.54  8.36<br><br>$C_{21}H_{11}O_3N_3Cl_4$ |
| 142 | (structure: triazine with 4-methylphenyl, 2,4-dihydroxyphenyl, and 2,4-dichlorophenoxy substituents) | 241–242° | 55.56  3.50  8.10<br>55.84  3.75  8.01<br><br>$C_{22}H_{14}O_3N_3Cl_3 \cdot \tfrac{1}{2}C_4H_8O_2$ |
| 143 | (structure: triazine with 4-Cl-phenyl, 2-hydroxy-4-benzyloxyphenyl, and 2,4-dichlorophenoxy substituents) | 202–208° | 56.80  2.79  6.85<br>56.51  2.62  7.17<br><br>$C_{29}H_{17}O_4N_3Cl_4$ |
| 144 | (structure: triazine with 4-methylphenyl, 2-hydroxy-4-ethoxyphenyl, and 2,4-dichlorophenoxy substituents) | 194–197° | 57.33  3.61  8.36<br>57.43  3.54  8.07<br><br>$C_{24}H_{18}O_3N_3Cl$ |
| 145 | (structure: triazine with 4-Cl-phenyl, 2,4-dihydroxyphenyl, and 2,3,4-trichlorophenoxy substituents) | 286–287° | 44.72  1.61  7.45<br>44.88  1.57  7.57<br><br>$C_{21}H_9O_3N_3Cl_5$ |

A—Continued

| I | II | III | IV |
|---|---|---|---|
| 146 | [structure: 4-chlorophenyl-triazine with 2,4,5-trichlorophenoxy and hydroxyphenyl bearing OCONHCH₃] | 283–285° | 44.48  1.95  9.02<br>44.78  1.94  9.04<br>$C_{23}H_{12}O_4N_4Cl_5$ |
| 147 | [structure: 4-chlorophenyl-triazine with 2,4,5-trichlorophenoxy and hydroxyphenyl bearing OCO(CH₂)₁₆CH₃] | 169–170° | 56.40  5.22  5.06<br>56.48  5.14  4.81<br>$C_{39}H_{42}O_4N_3Cl_6$ |
| 148 | [structure: 4-chlorophenyl-triazine with 3-methylphenoxy and 2,4-dihydroxyphenyl] | 193–194° | 65.11  3.97  10.35<br>65.31  4.24  10.41<br>$C_{22}H_{16}O_3N_3Cl$ |
| 149 | [structure: 4-chlorophenyl-triazine with 3-methylphenoxy and hydroxyphenyl bearing OC₂H₅] | 156–158° | 66.50  4.70  9.70<br>66.40  4.80  9.70<br>$C_{24}H_{20}O_3N_3Cl$ |
| 150 | [structure: 4-chlorophenyl-triazine with 3-methylphenoxy and hydroxyphenyl bearing O(CH₂)₇—CH₃] | 104–105° | 69.55  6.23  8.11<br>69.79  6.23  8.13<br>$C_{30}H_{32}O_3N_3Cl$ |

A—Continued
| I | II | III | IV |
|---|---|---|---|
| 151 | 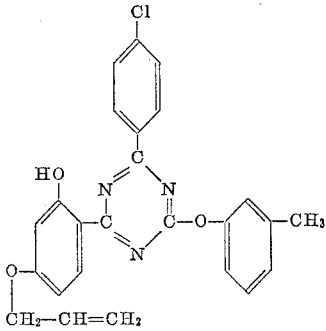 | 116–118° | 67.34  4.52  9.42<br>67.57  4.64  9.58<br><br>$C_{25}H_{20}O_3N_3Cl$ |
| 152 | 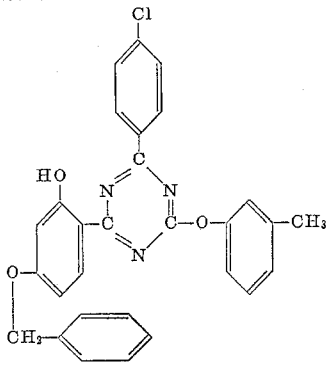 | 147–149° | 70.23  4.47  8.47<br>70.29  4.65  8.44<br><br>$C_{29}H_{22}O_3N_3Cl$ |
| 153 | 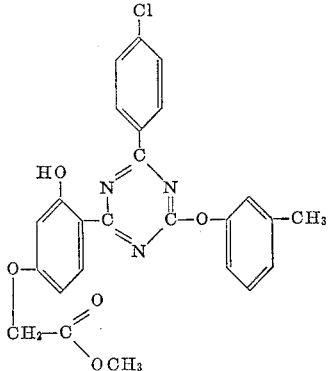 | 170–171° | 63.30  4.20  8.70<br>63.40  4.30  8.80<br><br>$C_{25}H_{20}O_5N_3Cl;\ x1/10\,C_6H_6$ |
| 154 | 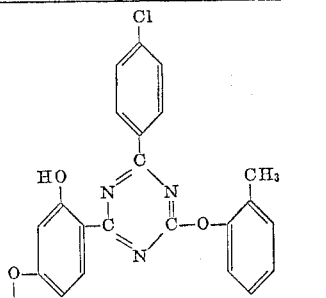 | 212–213° | 65.20  4.00  10.40<br>65.20  4.15  10.40<br><br>$C_{22}H_{16}O_3N_3Cl$ |
| 155 | 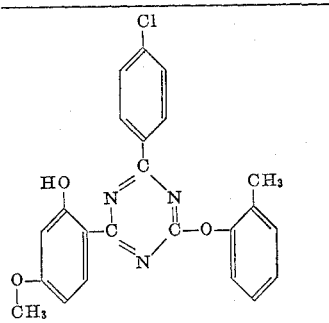 | 192–193° | 65.79  4.32  10.01<br>65.73  4.35  10.13<br><br>$C_{23}H_{18}O_3N_3Cl$ |

A—Continued
| I | II | III | IV |
|---|---|---|---|
| 156 | 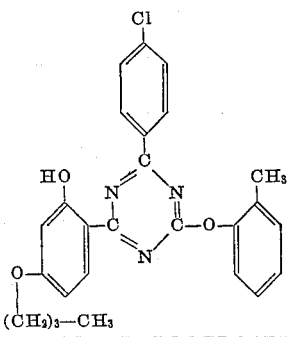 | 135–137° | 67.60  5.24  9.10<br>67.80  5.34  9.33<br><br>$C_{25}H_{24}O_3N_3Cl$ |
| 157 | 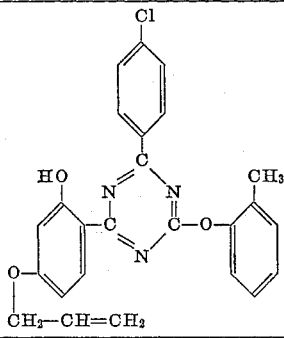 | 136–137° | 67.34  4.52  9.42<br>67.38  4.57  9.29<br><br>$C_{25}H_{20}O_3N_3Cl$ |
| 158 | 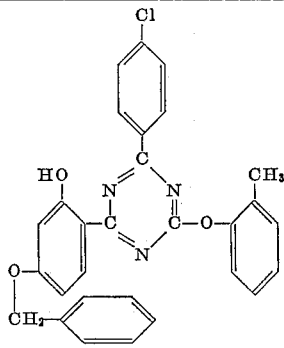 | 175–176° | 70.23  4.47  8.47<br>70.35  4.56  8.43<br><br>$C_{29}H_{22}O_3N_3Cl$ |
| 159 | 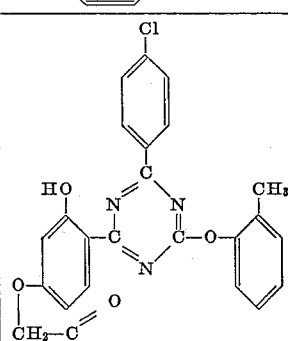 | 175–176° | 62.83  4.22  8.79<br>62.95  4.42  8.70<br><br>$C_{25}H_{20}O_5N_3Cl$ |
| 160 | 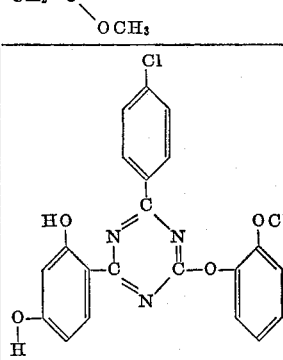 | 215–216° | 62.64  3.82  9.96<br>62.80  3.87  9.77<br><br>$C_{23}H_{16}O_4N_3Cl$ |

A—Continued
| I | II | III | IV |
|---|---|---|---|
| 161 | 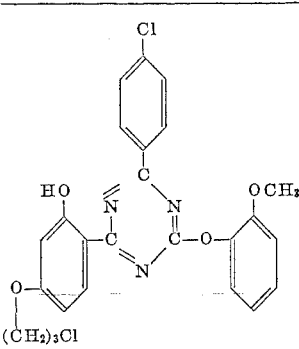 | 163–165° | 60.25 4.25 8.43<br>60.18 4.15 8.43<br><br>$C_{25}H_{21}O_4N_3Cl_2$ |
| 162 | 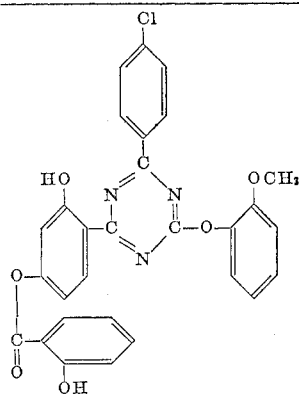 | 185–187° | 64.28 3.72 7.75<br>63.99 3.90 7.54<br><br>$C_{29}H_{20}O_6N_3Cl$ |
| 163 | 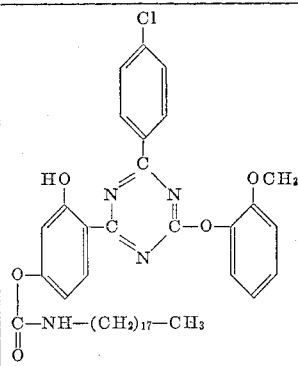 | 163–165° | 68.65 7.45 7.81<br>68.43 7.60 7.68<br><br>$C_{41}H_{53}O_5N_4Cl$ |
| 164 | 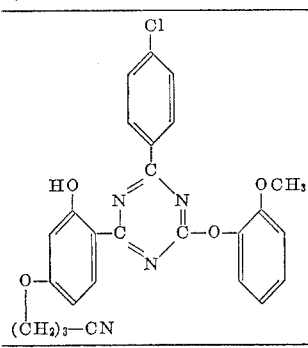 | 120–122°<br>159–161° | 63.87 4.33 11.46<br>63.92 4.38 11.63<br><br>$C_{26}H_{21}O_4N_4Cl$ |

A—Continued

| I | II | III | IV |
|---|---|---|---|
| 165 | (structure: triazine with 4-Cl-phenyl, 2-hydroxy-4-ethylphenyl, and 2-methoxyphenoxy substituents) | 186–187° | 64.07  4.48  9.34<br>64.28  4.35  9.24<br><br>$C_{24}H_{20}O_4N_3Cl$ |
| 166 | (structure: triazine with 4-Cl-phenyl, 2,4-dihydroxyphenyl, and 2-methyl-4-propylphenoxy substituents) | 213–214° | 67.04  4.95  9.38<br>67.03  5.25  9.46<br><br>$C_{25}H_{22}O_3N_3Cl$ |
| 167 | (structure: triazine with 4-Cl-phenyl, 2-hydroxy-4-butoxyphenyl, and 2-methyl-4-propylphenoxy substituents) | 125–126° | 69.11  6.00  8.34<br>69.01  5.88  8.41<br><br>$C_{29}H_{30}O_3N_3Cl$ |
| 168 | (structure: triazine with 4-Cl-phenyl, 2-hydroxy-4-ethoxyphenyl, and 2-methyl-4-propylphenoxy substituents) | 152–153° | 68.13  5.51  8.83<br>67.93  5.68  8.92<br><br>$C_{27}H_{26}O_3N_3Cl$ |
| 169 | (structure: triazine with 4-Cl-phenyl, 2-hydroxy-4-benzyloxyphenyl, and 2-methyl-4-propylphenoxy substituents) | 151–152° | 71.43  5.25  7.81<br>71.78  5.33  7.79<br><br>$C_{32}H_{28}O_3N_3Cl$ |

A—Continued

| I | II | III | IV |
|---|---|---|---|
| 170 | [structure: triazine with 4-Cl-phenyl, 2,4-dihydroxyphenyl, and O-(2-C₃H₇-4-CH₃-phenyl)] | 143–145°<br>+<br>(174–175°) | 66.35  5.35  8.92<br>66.30  5.46  8.85<br>$C_{25}H_{22}O_3N_3Cl$; ½ $C_2H_5OH$<br>$C_{25}H_{22}O_3N_3Cl$) |
| 171 | [structure: triazine with 4-Cl-phenyl, 2,4-dihydroxyphenyl, and O-(2-CH₃-4-Cl-phenyl)] | 258–259° | 60.02  3.43  9.54<br>60.00  3.57  9.60<br>$C_{22}H_{15}O_3N_3Cl$ |
| 172 | [structure: triazine with 4-Cl-phenyl, 2-hydroxy-4-(OCH₂COOCH₃)-phenyl, and O-(2-CH₃-4-Cl-phenyl)] | 180–182° | 58.61  3.74  8.20<br>58.79  3.78  8.26<br>$C_{25}H_{19}O_5N_3Cl_2$ |
| 173 | [structure: triazine with 4-Cl-phenyl, 2-hydroxy-4-O(CH₂)₁₇CH₃-phenyl, and O-(2-CH₃-4-Cl-phenyl)] | 96–98° | 69.50  7.40  6.10<br>69.70  7.50  6.30<br>$C_{40}H_{51}O_3N_3Cl_2$ |
| 174 | [structure: triazine with 4-Cl-phenyl, 2-hydroxy-4-O(CH₂)₇CH₃-phenyl, and O-(2-CH₃-4-Cl-phenyl)] | 124–125° | 65.22  5.66  7.61<br>64.94  5.75  7.79<br>$C_{30}H_{31}O_3N_3Cl_2$ |

A—Continued
| I | II | III | IV |
|---|---|---|---|
| 175 | 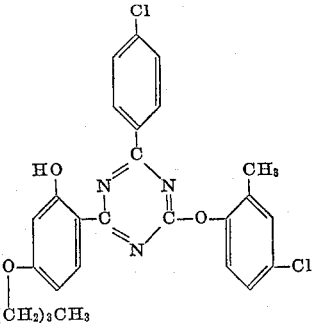 | 155–156° | 62.91  4.67  8.47<br>62.92  4.66  8.58<br><br>C$_{26}$H$_{23}$O$_3$N$_3$Cl$_2$ |
| 176 | 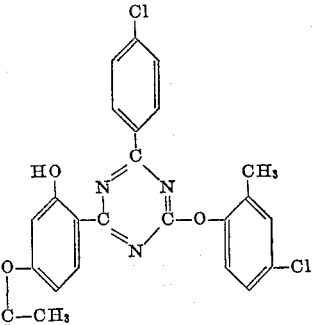 | 187–189° | 59.77  3.55  8.71<br>59.81  3.35  8.83<br><br>C$_{24}$H$_{17}$O$_4$N$_3$Cl$_2$ |
| 177 | 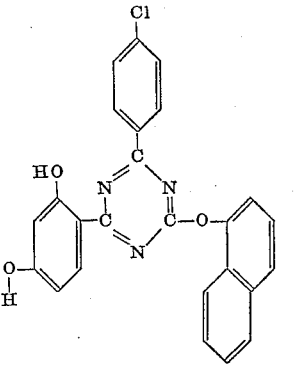 | 258–259° | 67.80  3.70  9.10<br>67.80  3.78  9.10<br><br>C$_{25}$H$_{16}$O$_3$N$_3$Cl; 1/5C$_6$H$_5$Cl |
| 178 | 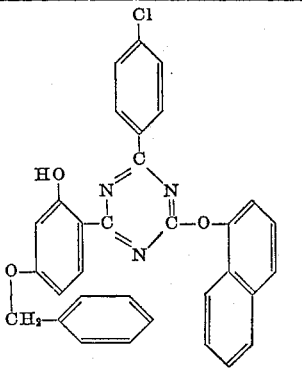 | 195–197° | 72.25  4.17  7.90<br>72.32  4.26  8.20<br><br>C$_{32}$H$_{22}$O$_3$N$_3$Cl |

A—Continued
| I | II | III | IV |
|---|---|---|---|
| 179 | 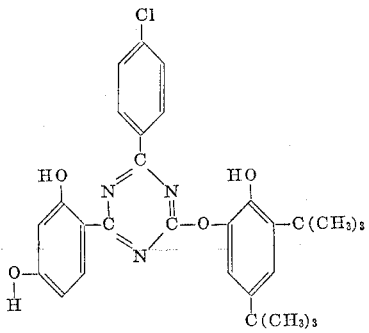 | 290–291° | 66.98  5.82  8.08<br>66.70  5.68  8.12<br><br>$C_{29}H_{30}O_4N_3Cl$ |
| 180 | 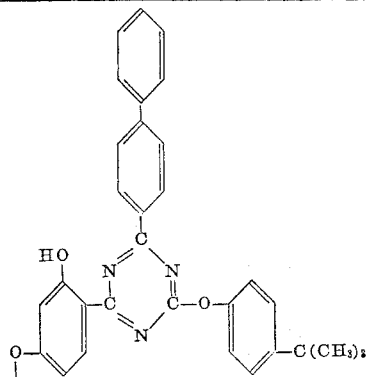 | 209–211° | 76.05  5.56  8.58<br>75.85  5.63  8.71<br><br>$C_{31}H_{27}O_3N_3$ |
| 181 | 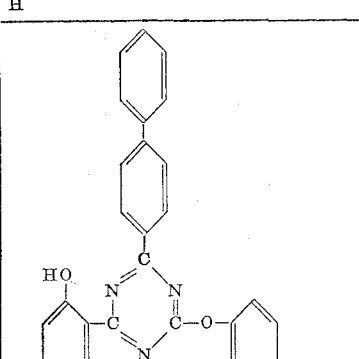 | 203–205° | 76.57  6.04  8.12<br>76.47  6.30  8.34<br><br>$C_{33}H_{31}O_3N_3$ |
| 182 | 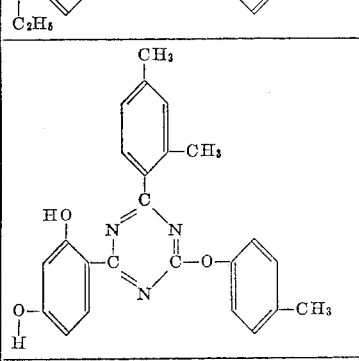 | 157–158° | 72.16  5.30  10.52<br>72.23  5.31  10.79<br><br>$C_{24}H_{21}O_3N_3$ |

A—Continued
| I | II | III | IV |
|---|---|---|---|
| 183 | 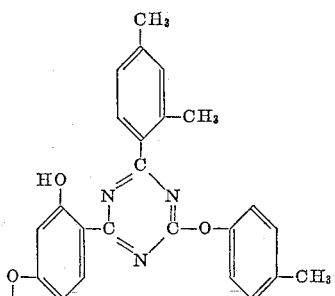 | 149–151° | 73.05  5.90  9.83<br>73.19  5.99  9.87<br><br>$C_{26}H_{25}O_3N_3$ |
| 184 | 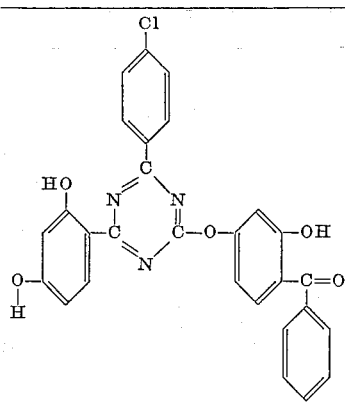 | 149–150° | 65.70  3.54  8.21<br>65.87  3.37  8.29<br><br>$C_{28}H_{18}O_5N_3Cl$ |
| 185 | 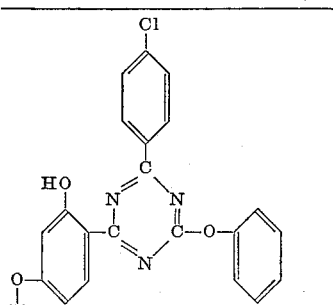 | 202.5–204° | 62.75  3.74  10.48<br>62.76  3.81  10.42<br><br>$C_{21}H_{14}O_3N_3Cl \cdot \frac{1}{2}H_2O$ |
| 186 | 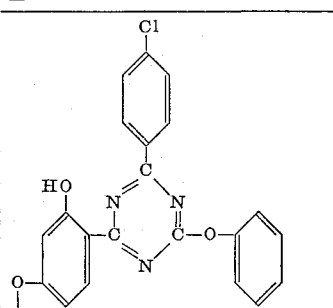 | 164.5–168° | 65.79  4.32  10.01<br>66.09  4.27  10.16<br><br>$C_{23}H_{18}O_3N_3Cl$ |
| 187 | 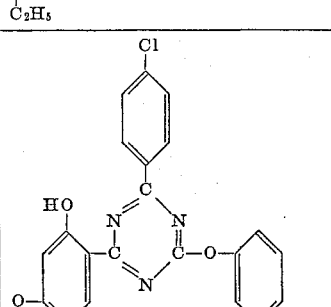 | 189–190° | 69.78  4.18  8.72<br>69.71  4.08  8.71<br><br>$C_{28}H_{20}O_3N_3Cl$ |

A—Continued
| I | II | III | IV |
|---|---|---|---|
| 188 | 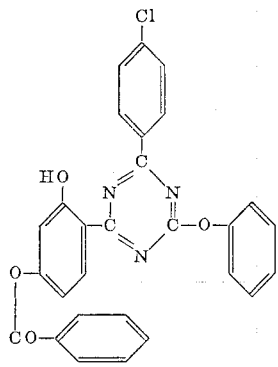 | 181–182° | 67.81 3.66 8.47<br>68.04 3.73 8.46<br><br>$C_{28}H_{18}O_4N_3Cl$ |
| 189 | | 127–128.5° | 64.10 4.78 8.31<br>64.00 4.75 7.95<br><br>$C_{27}H_{24}O_5N_3Cl$ |
| 190 | | 173.5–174.5° | 65.11 3.97 10.35<br>65.32 4.19 10.39<br><br>$C_{22}H_{16}O_3N_3Cl$ |
| 191 | | 158–159° | 62.83 4.22 8.79<br>62.58 4.21 8.88<br><br>$C_{25}H_{20}O_5N_3Cl$ |

A—Continued
| I | II | III | IV |
|---|---|---|---|
| 192 | 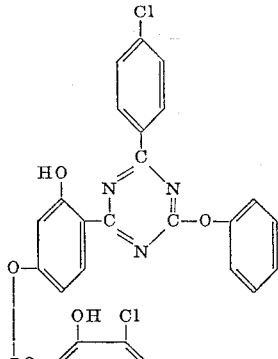 | 234–235° | 57.90  2.78  7.23<br>58.02  2.72  7.11<br><br>$C_{28}H_{16}O_5N_3Cl_3$ |
| 193 | 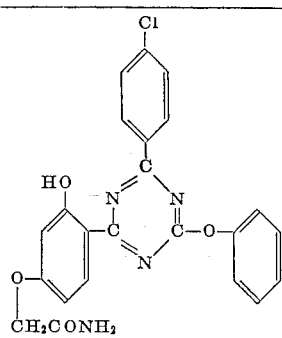 | 233–235° | 60.36  3.96  12.23<br>60.44  4.00  12.37<br><br>$C_{23}H_{17}O_4N_4Cl \cdot \tfrac{1}{2}H_2O$ |
| 194 | 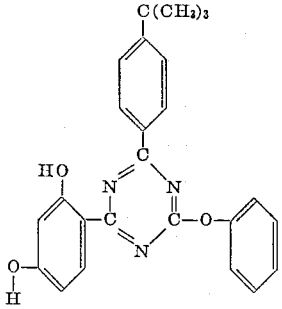 | 234–241° | 72.62  5.61  10.16<br>72.10  5.80  10.40<br><br>$C_{25}H_{23}O_3N_3$ |
| 195 | 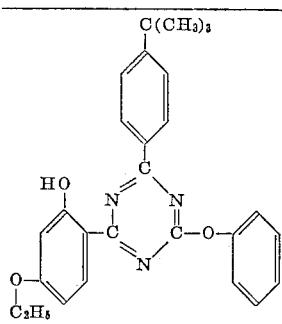 | 149.5–153° | 73.45  6.16  9.52<br>73.54  6.29  9.67<br><br>$C_{27}H_{27}O_3N_3$ |

A—Continued
| I | II | III | IV |
|---|---|---|---|
| 196 | 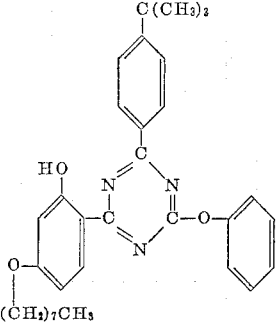 | 89–90° | 75.40  7.48  7.99<br>75.27  7.65  7.90<br><br>$C_{33}H_{39}O_3N_3$ |
| 197 | 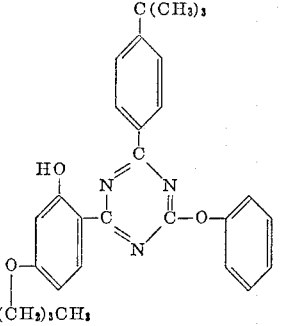 | 115–119° | 74.17  6.65  8.95<br>74.39  6.87  9.05<br><br>$C_{29}H_{31}O_3N_3$ |
| 198 | 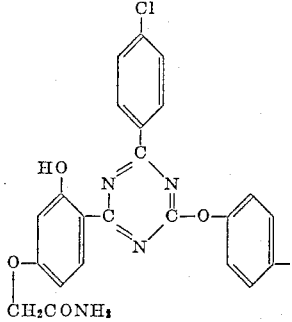 | 243–244° | 64.22  4.99  11.10<br>64.21  4.94  11.12<br><br>$C_{27}H_{25}O_4N_4Cl$ |
| 199 | 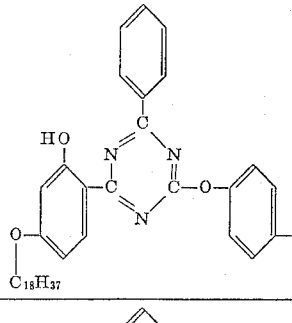 | 70–71° | 77.01  8.56  6.74<br>76.76  8.70  6.83<br><br>$C_{40}H_{53}O_3N_3$ |
| 200 | 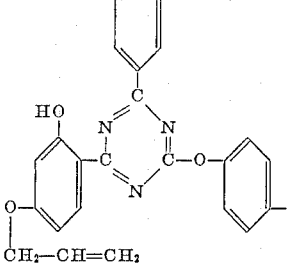 | 160–161° | 72.98  5.14  10.21<br>72.91  5.21  10.16<br><br>$C_{25}H_{21}O_3N_3$ |

3,293,247

A—Continued

| I | II | III | IV |
|---|---|---|---|
| 201 | [structure: triazine with phenyl, 2-hydroxy-4-hydroxyphenyl, and 2-naphthyloxy substituents] | 212–213° | 73.70 4.21 10.31<br>73.54 4.22 10.35<br>$C_{25}H_{17}O_3N_3$ |
| 202 | [structure: triazine with phenyl, 2-hydroxy-4-ethoxyphenyl, and 2-naphthyloxy substituents] | 166–167° | 74.47 4.86 9.65<br>74.10 4.92 9.79<br>$C_{27}H_{21}O_3N_3$ |
| 203 | [structure: triazine with phenyl, 2,4-dihydroxyphenyl, and 4-tert-butylphenoxy substituents] | 117–120°<br>175–176° | 72.90 6.20 9.60<br>72.70 6.30 9.50<br>$C_{25}H_{23}O_3N_3$; ¼$C_6H_{12}$ |
| 204 | [structure: triazine with phenyl, 2-hydroxy-4-ethoxyphenyl, and 4-tert-butylphenoxy substituents] | 187–188° | 73.50 6.20 9.50<br>73.50 6.00 9.40<br>$C_{27}H_{27}O_3N_3$ |
| 205 | [structure: triazine with phenyl, 2,4-dihydroxyphenyl, and 2-methoxyphenoxy substituents] | 171–173° | 68.21 4.42 10.85<br>68.39 4.59 10.65<br>$C_{22}H_{17}O_4N_3$ |
| 206 | [structure: triazine with phenyl, 2-hydroxy-4-methoxyphenyl, and 2-methoxyphenoxy substituents] | 167–168° | 68.81 4.77 10.47<br>68.30 4.72 10.31<br>$C_{23}H_{19}O_4N_3$ |

A—Continued

| I | II | III | IV |
|---|---|---|---|
| 207 | (structure: triazine with phenyl, 2,4-dihydroxyphenyl, and o-tolyloxy groups) | 204–205° | 71.15 4.61 11.32<br>70.99 4.62 11.11<br>$C_{22}H_{17}O_3N_3$ |
| 208 | (structure: triazine with phenyl, 2-hydroxy-4-methoxyphenyl, and o-tolyloxy groups) | 182–183° | 71.67 4.97 10.90<br>71.50 5.10 10.97<br>$C_{23}H_{19}O_3N_3$ |
| 209 | (structure: triazine with phenyl, 2,4-dihydroxyphenyl, and m-tolyloxy groups) | 186–187° | 70.30 4.70 11.20<br>70.30 4.70 11.30<br>$C_{22}H_{17}O_3N_3; \frac{1}{4}H_2O$ |
| 210 | (structure: triazine with phenyl, 2-hydroxy-4-ethoxyphenyl, and m-tolyloxy groups) | 165–167° | 72.16 5.30 10.52<br>71.97 5.22 10.70<br>$C_{24}H_{21}O_3N_3$ |
| 211 | (structure: triazine with phenyl, 2,4-dihydroxyphenyl, and propyl-methylphenoxy groups) | 209–210° | 72.58 5.61 10.15<br>72.30 5.70 10.27<br>$C_{25}H_{23}O_3N_3$ |

| I | II | III | IV |
|---|---|---|---|
| 212 | (structure: 2-phenyl-4-(2-hydroxy-4-ethoxyphenyl)-6-(2-methyl-4-methylphenoxy)-triazine) | 162–163° | 73.45 6.16 9.52<br>73.22 6.11 9.54<br><br>$C_{27}H_{27}O_3N_3$ |
| 213 | (structure: 2-phenyl-4-(2-hydroxy-4-hydroxyphenyl)-6-(2,4-di-tert-butyl-6-hydroxyphenoxy)-triazine) | 245–246° | 73.30 6.60 7.90<br>73.30 6.80 8.10<br><br>$C_{29}H_{31}O_4N_3;\ \tfrac{1}{2}C_7H_8$ |
| 214 | (structure: 2-phenyl-4-(2-hydroxy-4-hydroxyphenyl)-6-(2-methyl-4-chlorophenoxy)-triazine) | 208–210° | 65.11 3.97 10.35<br>65.24 4.27 10.19<br><br>$C_{22}H_{16}O_3N_3Cl$ |
| 215 | (structure: 2-phenyl-4-(2-hydroxy-4-ethoxyphenyl)-6-(2-methyl-4-chlorophenoxy)-triazine) | 178–180° | 66.30 4.62 9.69<br>65.96 4.55 9.70<br><br>$C_{24}H_{20}O_3N_3Cl$ |
| 216 | (structure: 2-phenyl-4-(2-hydroxy-4-butoxyphenyl)-6-(2-methyl-4-chlorophenoxy)-triazine; $O-(CH_2)_3-CH_3$) | 175–176° | 67.20 5.40 8.90<br>67.20 5.30 9.00<br><br>$C_{26}H_{24}O_3N_3Cl;\ \tfrac{1}{4}C_2H_5OH$ |

EXAMPLES 6 AND 7 AND TABLE B

The compounds of the general Formula 23 listed in the following Table B can be manufactured by a variety of methods, among them the direct method [Example 6] and the indirect method [Example 7; via transesterification]. Both these methods are illustrated below by typical examples.

Concerning instructions for etherification, esterification and urethane formation on the para-hydroxyl group see Examples 2, 3, 4 and 5 preceding Table A as well as Example 11 preceding Table C.

Example 6

122 parts of methanol and 40 parts of water are added to a solution of 130.25 parts of 2-para-chlorophenyl-4,6-dichlorotriazine in 650 parts of dioxane. A solution of 20 parts of sodium hydroxide in 100 parts of water is then stirred in dropwise at 35 to 40° C. at a rate such that the pH does not rise above 7. On completion of the alkali addition the batch is stirred on for one hour at 40° C., 300 parts of water are added, and the precipitated product of the formula (218)

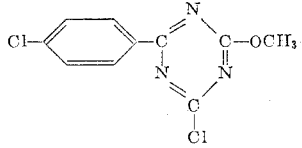

is suctioned off at room temperature. After recrystallization from cyclohexane the product melts at 123 to 126° C. By sublimation an analytically pure product is obtained which melts at 127 to 128° C.

41 parts of anhydrous aluminum chloride are added within 10 minutes at 20 to 25° C. to a solution, prepared at 40° C., of 77.7 parts of the compound of the Formula 218 and 33.4 parts of resorcinol in 450 parts of nitrobenzene; the reaction mixture is then heated (at 40° C.) until an elimination of hydrogen chloride sets in and then stirred at the same temperature for 20 hours. For working up the dark-coloured solution is decomposed with 2000 parts of ice+water, the supernatant aqueous phase decanted and the nitrobenzene phase washed neutral with warm water. The nitrobenzene is then distilled off with steam. The residue is suctioned off and dried. Yield: 91.2 parts.

The analytically pure product, obtained by recrystallization from aqueous dioxane, of the formula (219)

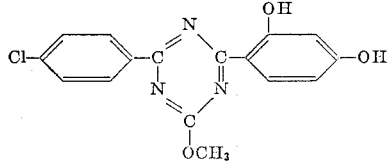

melts at 232° C. with decomposition.

$C_{16}H_{12}O_3N_3Cl$—Calculated: C, 58.28; H, 3.67; N, 12.74%. Found: C, 58.01; H, 3.73; N, 12.53%.

*Example 7*

9 parts of 2-(4'-chlorophenyl)-4-(4'-tertiary butylphenoxy) - 6 - (2',4'-dihydroxyphenyl)-1,3,5-triazine are stirred for 70 hours under reflux in 120 parts of methanol with 0.1 part of sodium metal. The batch is then neutralized at the boil with 2N-hydrochloric acid and water is added until it remains turbid. On cooling, the crystalline product of the formula (220)

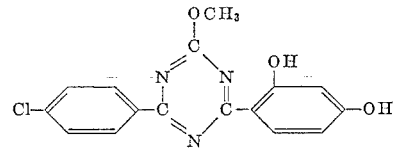

is obtained in a substantially quantitative yield; it melts without any further purification at 232° C. and reveals the following analytical data:

$C_{16}H_{12}O_3N_3Cl$—Calculated: C, 58.28; H, 3.67; N, 12.74%. Found: C, 58.01; H, 3.73; N, 12.53%.

When in the above example methanol is replaced by ethylenediglycol and the batch is heated for 6 hours at 100° C., the product of the formula (221)

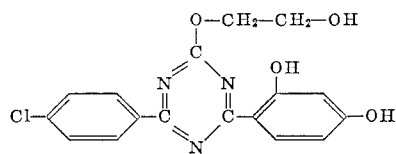

melting at 224 to 226° C. is obtained in an 85% yield.

$C_{17}H_{14}O_4N_3Cl$—Calculated: C, 56.76; H, 3.92; N, 11.68%. Found: C, 56.92; H, 3.89; N, 11.56%.

B

| I | II | III | IV |
|---|---|---|---|
| 222 | (structure) | 111–112° | 60.42  4.51  11.74<br>60.29  4.49  11.52<br><br>$C_{18}H_{16}O_3N_3Cl$ |
| 223 | (structure) | 184–185° | 59.40  4.11  12.22<br>59.23  3.85  12.21<br><br>$C_{17}H_{14}O_3N_3Cl$ |

B—Continued
| I | II | III | IV |
|---|---|---|---|
| 224 | 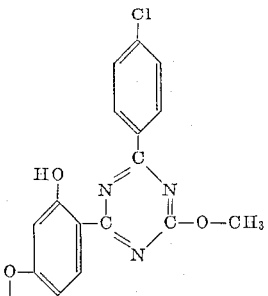 | 142–143° | 62.26  5.22  10.89<br>62.32  5.09  10.80<br>$C_{20}H_{20}O_3N_3Cl$ |
| 225 | 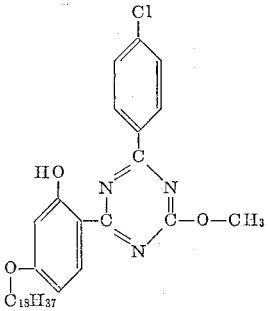 | 97–98° | 70.14  8.31  7.22<br>70.40  8.60  7.12<br>$C_{34}H_{48}O_3N_3Cl$ |
| 226 | 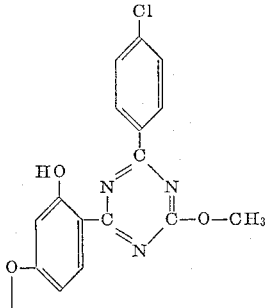 | 87–88° | 57.77  4.36  10.11<br>57.15  4.37  10.07<br>$C_{20}H_{18}O_5N_3Cl$ |
| 227 | 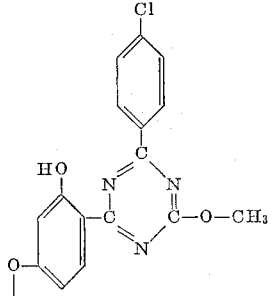 | 160–161° | 57.84  4.31  11.51<br>58.38  3.77  11.24<br>$C_{18}H_{16}O_4N_3Cl$ |
| 228 | 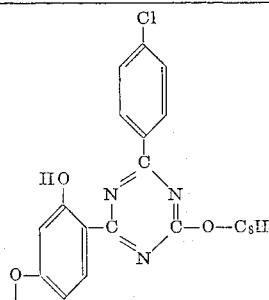 | 80–81° | 65.85  6.63  9.22<br>65.96  6.45  9.13<br>$C_{25}H_{30}O_3N_3Cl$ |

| I | II | III | IV |
|---|---|---|---|
| 229 | 4-Cl-C6H4 triazine with HO, OH aryl and O-C4H9 | 204–205° | 61.38  4.88  11.30<br>61.48  4.94  11.35<br>C19H18O3N3Cl |
| 230 | 4-Cl-C6H4 triazine with HO, OC18H37 aryl and O-CH2-CH2-OCH3 | 77–78° | 73.06  9.03  7.10<br>72.90  8.76  6.71<br>C39H50O3N3Cl |
| 231 | 4-Cl-C6H4 triazine with HO, OC2H5 aryl and O-H | 290–291° | 59.40  4.11  12.22<br>59.45  4.07  12.12<br>C17H14O3N3Cl |
| 232 | 4-Cl-C6H4 triazine with HO, OC2H5 aryl and O-C2H5 | 145–146° | 61.38  4.88  11.30<br>61.45  4.94  11.22<br>C19H18O3N3Cl |
| 233 | 4-Cl-C6H4 triazine with HO, O-CO-(CH2)10-CH3 aryl and O-CH3 | 90–91° | 65.68  6.69  8.21<br>65.77  6.52  8.01<br>C28H34O4N3Cl |

B—Continued
| I | II | III | IV |
|---|---|---|---|
| 234 | 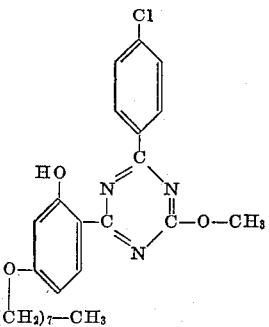 | 111–112° | 65.22 6.39 9.51<br>65.37 6.11 9.50<br><br>$C_{24}H_{28}O_3N_3Cl$ |
| 235 | 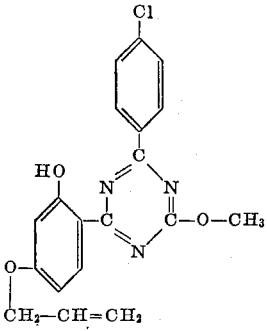 | 138–139° | 61.76 4.36 11.36<br>61.81 4.47 11.50<br><br>$C_{19}H_{16}O_3N_3Cl$ |
| 236 | 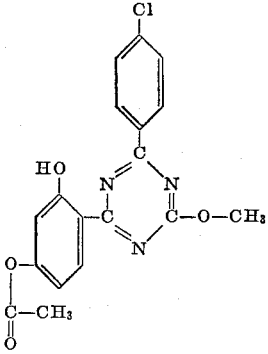 | 162–164° | 58.15 3.80 11.30<br>57.88 3.56 11.50<br><br>$C_{12}H_{14}O_4N_3Cl$ |
| 237 | 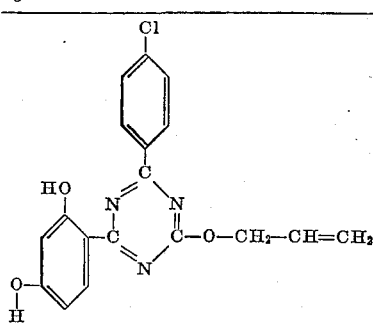 | 190–192° | 60.77 3.97 11.81<br>60.94 3.96 11.78<br><br>$C_{18}H_{14}O_3N_3Cl$ |
| 238 | 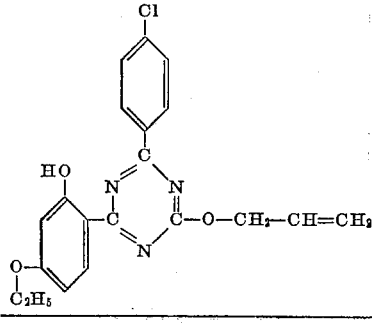 | 103–105° | 62.58 4.73 10.95<br>62.46 4.60 11.16<br><br>$C_{20}H_{18}O_3N_3Cl$ |

B—Continued
| I | II | III | IV |
|---|---|---|---|
| 239 | 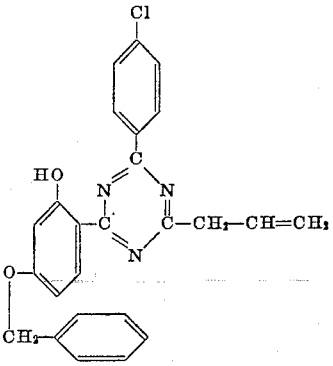 | 110–113° | 67.34 4.52 9.42<br>67.18 4.80 9.46<br><br>$C_{25}H_{20}O_2N_3Cl$ |
| 240 | 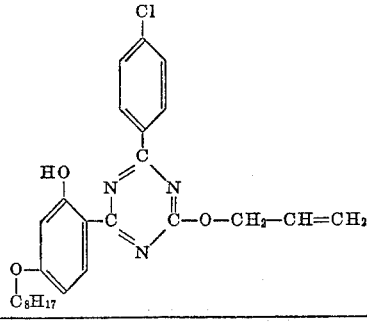 | 67–68° | 66.73 6.46 8.98<br>66.60 6.37 9.04<br><br>$C_{26}H_{30}O_3N_3Cl$ |
| 241 | 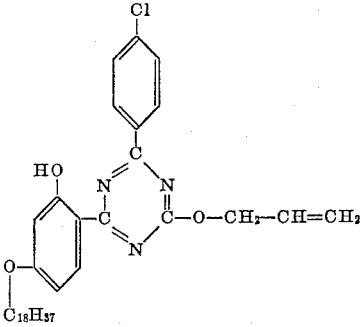 | 94–96° | 71.09 8.29 6.91<br>70.99 8.06 6.86<br><br>$C_{36}H_{50}O_3N_3Cl$ |
| 242 | 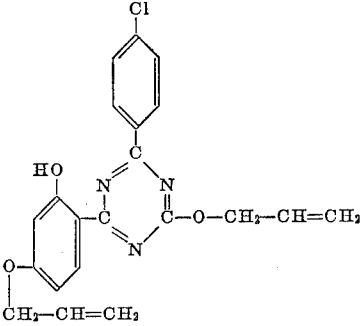 | 110–112° | 63.72 4.58 10.62<br>63.84 4.44 10.81<br><br>$C_{21}H_{18}O_3N_3Cl$ |
| 243 | 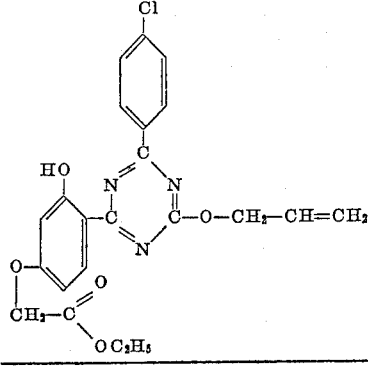 | 109–110° | 59.80 4.56 9.51<br>59.82 4.64 9.44<br><br>$C_{22}H_{20}O_5N_3Cl$ |

B—Continued
| I | II | III | IV |
|---|---|---|---|
| 244 | 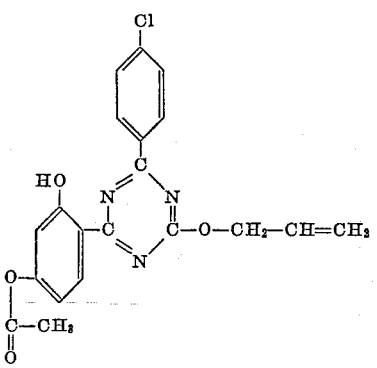 | 118–120° | 60.38 4.05 10.56<br>60.24 4.13 10.57<br><br>$C_{20}H_{16}O_4N_3Cl$ |
| 245 | 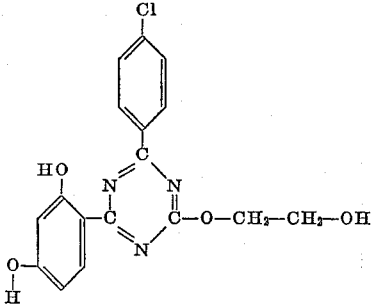 | 224–225° | 56.76 3.92 11.68<br>56.92 3.89 11.56<br><br>$C_{17}H_{14}O_4N_3Cl$ |
| 246 | 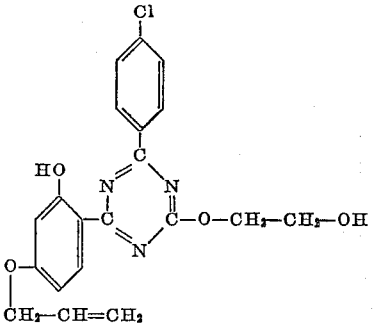 | 142–144° | 60.08 4.54 10.51<br>60.35 4.59 10.54<br><br>$C_{20}H_{18}O_4N_3Cl$ |
| 247 | 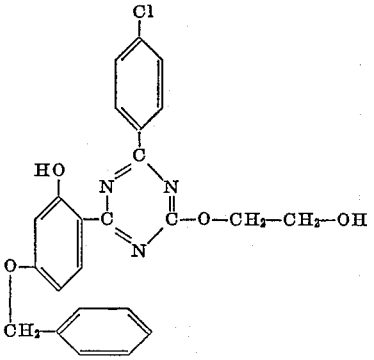 | 167–168° | 64.07 4.48 9.34<br>63.93 4.33 9.30<br><br>$C_{24}H_{20}O_4N_3Cl$ |
| 248 | 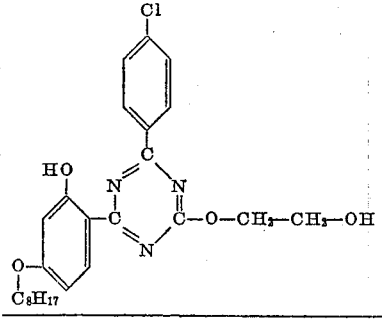 | 102–104° | 63.62 6.42 8.90<br>63.46 6.39 8.81<br><br>$C_{25}H_{30}O_4N_3Cl$ |

B—Continued
| I | II | III | IV |
|---|---|---|---|
| 249 | 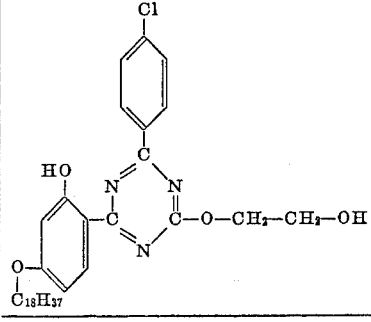 | 89–91° | 68.66 8.23 6.86<br>68.64 8.32 6.92<br><br>$C_{35}H_{50}O_4N_3Cl$ |
| 250 | 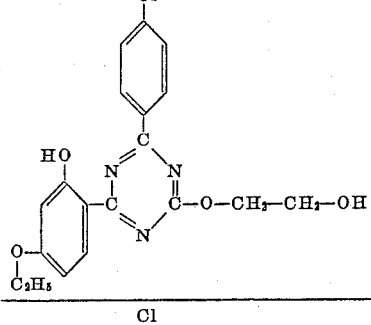 | 191–193° | 58.84 4.68 10.84<br>58.80 4.69 10.95<br><br>$C_{19}H_{18}O_4N_3Cl$ |
| 251 | 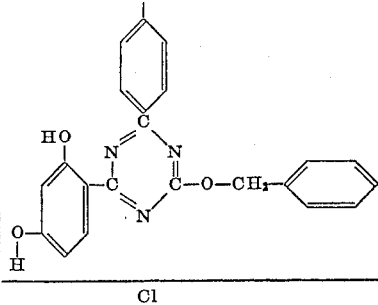 | 214–216° | 65.11 3.97 10.35<br>65.02 3.84 10.29<br><br>$C_{22}H_{16}O_2N_3Cl$ |
| 252 | 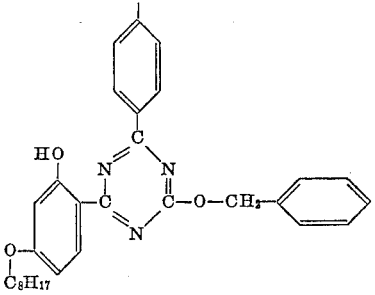 | 100–102° | 69.55 6.23 8.11<br>69.85 6.31 8.10<br><br>$C_{30}H_{32}O_3N_3Cl$ |
| 253 | 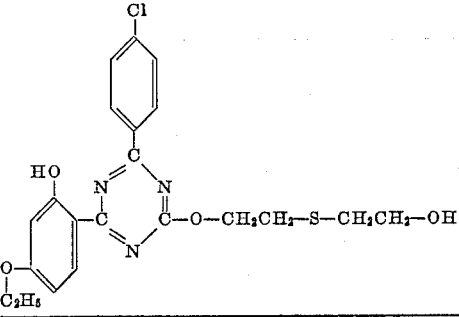 | 152–156° | 56.31 4.95 9.38<br>56.49 5.11 9.55<br><br>$C_{21}H_{22}O_4N_3ClS$ |

B—Continued
| I | II | III | IV |
|---|---|---|---|
| 254 | 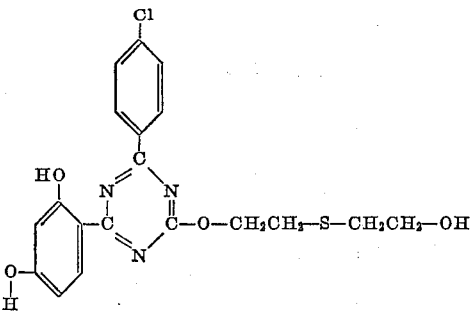 | 145–150° | 54.35 4.32 10.01<br>54.44 4.32 9.74<br><br>$C_{19}H_{19}O_4N_3ClS$ |
| 255 | 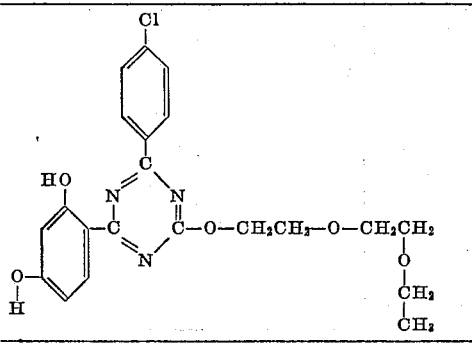 | 110–112° | 58.40 5.13 9.73<br>58.20 5.12 9.61<br><br>$C_{21}H_{22}O_5N_3Cl$ |
| 256 | 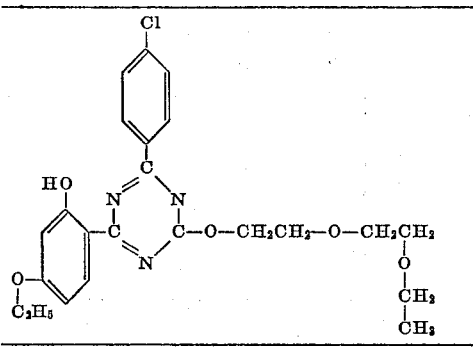 | 67–68° | 60.06 5.70 9.14<br>59.98 5.54 9.03<br><br>$C_{23}H_{26}O_5N_3Cl$ |
| 257 | 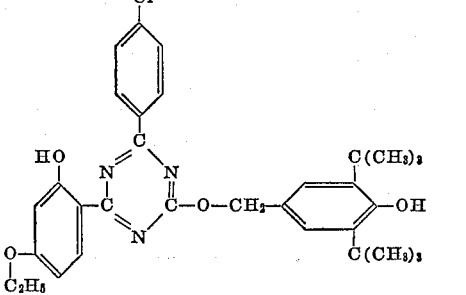 | 217–218° | 68.38 5.46 7.48<br>68.36 6.38 7.15<br><br>$C_{32}H_{36}O_4N_3Cl$ |
| 258 | 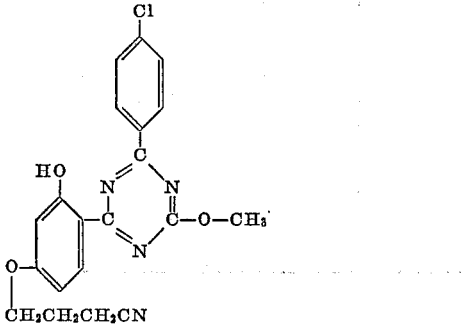 | 153–154° | 60.53 4.32 14.12<br>60.77 4.24 13.80<br><br>$C_{20}H_{17}O_2N_4Cl$ |

B—Continued
| I | II | III | IV |
|---|---|---|---|
| 259 | 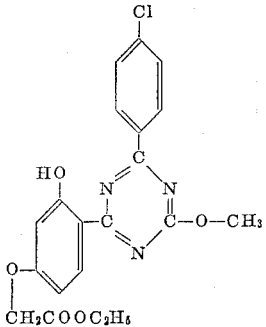 | 129–131° | 57.77 4.36 10.11<br>57.92 4.29 10.24<br>C₂₀H₁₈O₅N₃Cl |
| 260 | 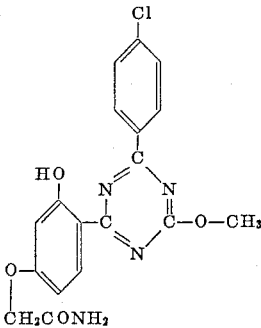 | 227–230° | 55.89 3.91 14.49<br>55.90 3.96 14.62<br>C₁₈H₁₅O₄N₄Cl |
| 261 | 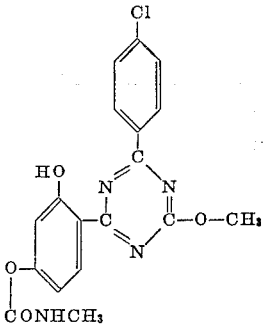 | 185°+ | 55.89 3.91 14.49<br>55.65 3.91 14.29<br>C₁₈H₁₅O₄N₄Cl |
| 262 | 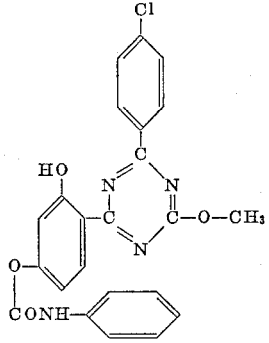 | 185°+ | 61.54 3.82 12.48<br>61.90 3.89 12.42<br>C₂₃H₁₇O₄N₄Cl |

| I | II | III | IV |
|---|---|---|---|
| 263 | [structure: triazine with 4-Cl-phenyl, OCH₃, and hydroxyphenyl bearing O-CH₂-(2,4-dichloro-6-hydroxyphenyl) substituent] | 287–288° | 53.25 2.72 8.10<br>53.05 2.76 8.27<br>C₂₃H₁₄O₅N₃Cl₃ |
| 264 | [structure: triazine with phenyl, O-CH₂CH₂OCH₃, and hydroxyphenyl with O-CH₂-(4-Cl-phenyl)] | 145–146.5° | 64.73 4.78 9.06<br>64.70 4.92 8.99<br>C₂₅H₂₂O₄N₃Cl |
| 265 | [structure: triazine with 4-Cl-phenyl, O-CH₂CH=CHCH₃, and dihydroxyphenyl] | 204–206° | 61.71 4.36 11.36<br>61.93 4.07 11.43<br>C₁₉H₁₆O₃N₃Cl |
| 266 | [structure: triazine with 4-Cl-phenyl, CH₂CH=CHCH₃, and hydroxy-ethoxyphenyl] | 118–121° | 63.40 5.07 10.56<br>63.46 4.82 10.86<br>C₂₁H₂₀O₃N₃Cl |
| 267 | [structure: triazine with 4-Cl-phenyl, O-C₁₈H₃₇, and hydroxy-ethoxyphenyl] | 91.5–92.5° | 70.50 8.45 7.05<br>70.07 8.25 7.22<br>C₃₅H₅₀O₃N₃Cl |

B—Continued

| I | II | III | IV |
|---|---|---|---|
| 268 | (structure: 2-phenyl-4-methoxy-6-(2,4-dihydroxyphenyl)-1,3,5-triazine) | 196–197° | 65.08  4.44  14.23<br>65.19  4.47  14.21<br><br>C₁₆H₁₃O₃N₃ |
| 269 | (structure: 2-(4-tert-butylphenyl)-4-methoxy-6-(2-hydroxy-4-methoxyphenyl)-1,3,5-triazine) | 140–141° | 69.02  6.34  11.50<br>69.35  6.35  11.33<br><br>C₂₁H₂₃O₃N₃ |
| 270 | (structure: 2-(4-tert-butylphenyl)-4-methoxy-6-(2,4-dihydroxyphenyl)-1,3,5-triazine) | 218–220° | 68.36  6.02  11.96<br>68.39  6.14  11.69<br><br>C₂₀H₂₁O₃N₃ |

EXAMPLES 8 TO 14 AND TABLE C

The compounds of the general Formula 25 listed in the following Table C were manufactured in a manner similar to that described in the following Examples 8 to 14.

Concerning instructions for esterification and formation of the urethane group on the para-hydroxyl group see Examples 3, 4 and 5 preceding Table A.

*Example 8*

93 parts of 2-(4′tertiary butylphenoxy)-4,6-(dichloro-1,3,5-triazine and 75 parts of 1,3-dihydroxybenzene are dissolved in 500 parts of nitrobenzene, and 108 parts of anhydrous aluminium chloride are added portionwise at 5° C. The batch is then stirred until it has assumed room temperature, after the temperature has first risen to 30° C. owing to the exothermic reaction. The batch is then stirred for 40 hours at 20 to 25° C. and then poured over a mixture of 1000 parts of ice and 3000 parts of water. The supernatant aqueous phase is decanted and the remaining organic phase subjected to steam distillation, to yield 133 parts of the compound of the formula (271)

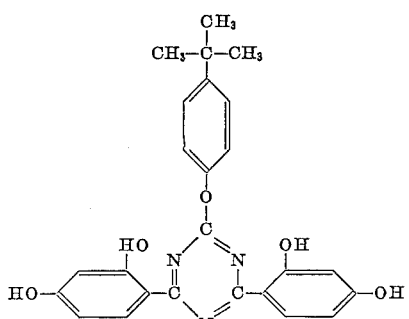

which melts at 282 to 285° C. and, after two recrystallizations, at 286 to 287° C.

C₂₅H₂₃O₅N₃—Calculated: C, 67.40; H, 5.20; N, 9.02%.
Found: C, 67.47; H, 5.47; N, 9.43%.

The 2-(4′-tertiary butylphenoxy)-4,6-dichloro-1,3,5-triazine used as starting material can be prepared by dissolving 45 parts of para-tertiary butylphenol and 55 parts of cyanuric chloride in 1000 parts of acetone, dropping in 300 parts of N-sodium hydroxide solution at 5 to 0° C. so rapidly that the pH value remains below 6.5, and the whole is then poured into 2500 parts of water. The precipitated oil is separated, dried over sodium sulphate and distilled in a high vacuum. Under a pressure of 0.7 mm. Hg 56 parts of the above product pass over between 171 and 180° C.; it reveals the following analytical data:

$C_{13}H_{13}Cl_2N_3O$—Calculated: C, 52.37; H, 4.39; N, 14.09%. Found: C, 52.31; H, 4.09; N, 13.98%.

*Example 9*

8.9 parts of the compound of the Formula 271 and 2.5 parts of anhydrous 90% potassium hydroxide are dissolved at 40° C. in 100 parts of methylcellosolve and mixed with 5.3 parts of allylbromide. The temperature is maintained for one hour at 40° C., for one hour at 50° C. and then for 5 hours at 60° C., and the batch is then poured into 400 parts of water. Chromatography of the benzene fraction on alumina (activity I) furnishes 6 parts of the compound of the formula (272)

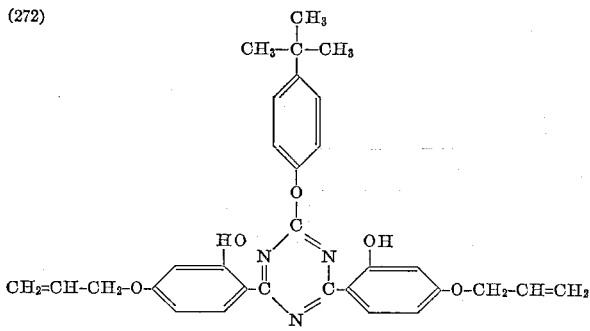

which melts at 130 to 134° C. and reveals the following analytical data:

$C_{31}H_{31}N_3O_5$—Calculated: C, 70.84; H, 5.95; N, 8.00%. Found: C, 70.90; H, 6.07; N, 7.89%.

*Example 10*

When in Example 9 allylbromide is replaced by 7.5 parts of benzylbromide, the whole is stirred for 5 hours at 40 to 45° C., then mixed with a small amount of water and cooled with ice, there are obtained 9 parts of the product of the formula (273)

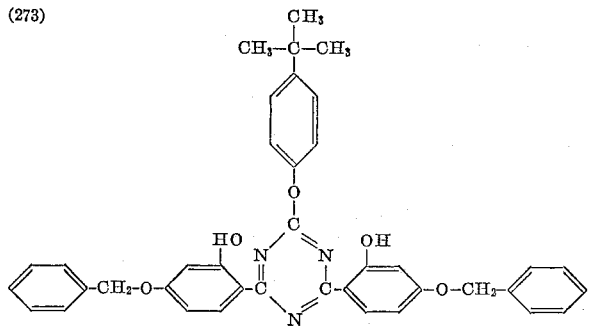

which melts at 213 to 214° C. after two recrystallizations from benzene+alcohol.

$C_{39}H_{35}N_3O_5$—Calculated: C, 74.86; H, 5.64; N, 6.72%. Found: C, 74.79; H, 5.65; N, 6.75%.

*Example 11*

8.9 parts of the compound of the Formula 271 and 2.5 parts of 90% potassium hydroxide are suspended at 30 to 35° C. in 80 parts of acetone; a solution of 3 parts of anhydrous potassium carbonate in 5 parts of water is added and then, within about 1 hour, 6.5 parts of diethylsulphate in 15 parts of acetone are dropped in. The batch is stirred for 2 hours at 30 to 35° C., then for 2 hours under reflux, cooled, and the precipitate is rinsed on the suction filter with ethanol, to yield about 8 parts of the product of the formula (274)

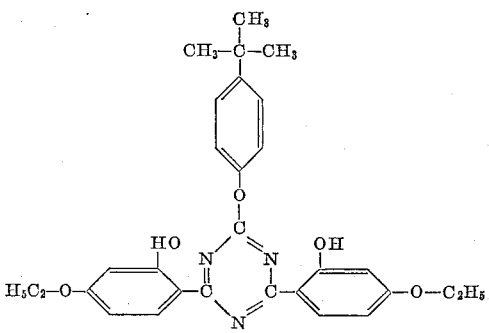

which melts at 211 to 212° C. after recrystallization from benzene+methanol and from aqueous dioxane.

$C_{29}H_{31}N_3O_5.\frac{1}{2}$ dioxane—Calculated: C, 68.22; H, 6.45; N, 7.72%. Found: C, 68.23; H, 6.36; N, 7.76%.

*Example 12*

When in Example 8 the 2-(4'-tertiary butylphenoxy)-4,6-dichloro-1,3,5-triazine is replaced by an equimolecular quantity of 2-(2'-methylphenoxy)-4,6-dichloro-1,3,5-triazine (melting at 89 to 90° C., from hexane; obtained in a yield of over 80% by the method described in Example 1), except that the batch is reacted for only 3 hours at 20 to 25° C. and then for 20 hours at 30° C., there is obtained a 94% yield of the product of the formula (275)

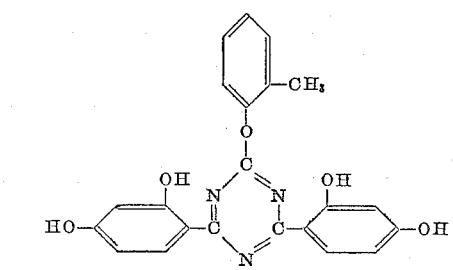

which melts at 287 to 290° C. and, after two recrystallizations from aqueous alcohol, at 293 to 294° C.

$C_{22}H_{17}N_3O_5$—Calculated: C, 65.50; H, 4.25; N, 10.42%. Found: C, 65.75; H, 3.95; N, 10.28%.

*Example 13*

When in Example 8 the 2-(4'-tertiary butylphenoxy)-4,6-dichloro-1,3,5-triazine is replaced by 2-phenoxy-4,6- dichloro-1,3,5-triazine (melting at 118 to 119° C., from cyclohexane), the product of the formula (276) 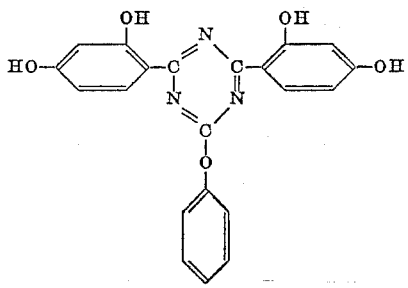

is obtained in a similar yield; after three recrystallizations from aqueous alcohol it is analytically pure and melts at 287 to 288° C. with decomposition. The product contains 1 molecule of water of crystallization and reveals the following data:

$C_{21}H_{15}O_5N_3 \cdot H_2O$—Calculated: C, 61.91; H, 4.21; N, 10.32%. Found: C, 61.81; H, 4.16; N, 10.34%.

*Example 14*

11 parts of the compound of the Formula 276 and 2.4 parts of sodium hydroxide are dissolved in 50 parts of methylcellosolve, then 7.5 parts of allylbromide are dropped in at 20° C., the temperature is raised to 45 to 50° C. and maintained at this level for 5 hours. The reaction product of the formula (277) 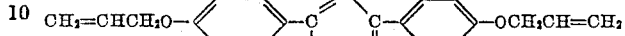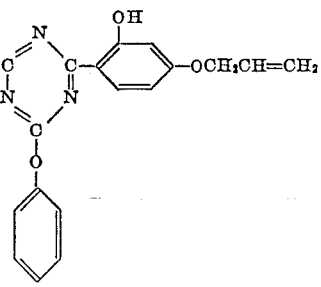

which crystallizes out is suctioned off and washed with methanol. Yield: 9.4 parts. The analytically pure product obtained on two recrystallizations from benzene+methanol melts at 197 to 198° C.

$C_{27}H_{23}O_5N_3$—Calculated: C, 69.07; H, 4.94; N, 8.95%. Found: C, 69.18; H, 4.88; N, 8.88%.

| I | II | III | IV |
|---|---|---|---|
| 278 | triazine structure with phenyl-CH₃ ether, two OH, two OC₂H₅ substituents | 232–233° | 67.96  5.48  9.15<br>68.15  5.46  9.36<br><br>$C_{25}H_{25}O_5N_3$ |
| 279 | triazine structure with phenyl-CH₃ ether, two OH, one OH and one OC₂H₅ | 259–260° | 66.80  4.90  9.80<br>66.40  4.90  9.80<br><br>$C_{24}H_{21}O_5N_3$ |
| 280 | triazine structure with phenyl-CH₃ ether, two OH, two O(CH₂)₃—CH₃ | 190–191° | 69.88  6.45  8.15<br>70.02  6.56  8.14<br><br>$C_{30}H_{33}O_5N_3$ |

C—Continued

| I | II | III | IV |
|---|---|---|---|
| 281 | [structure: triazine with OCH₃-phenoxy, two 2-hydroxy-4-hydroxyphenyl groups] | 281–283° | 61.70 4.20 9.80<br>61.70 4.30 9.60<br><br>C₂₂H₁₇O₆N₃; ½H₂O |
| 282 | [structure: triazine with OCH₃-phenoxy, two 2-hydroxy-4-(O(CH₂)₃CH₃)phenyl groups] | 179–180° | 67.78 6.26 7.91<br>67.67 6.30 7.82<br><br>C₃₀H₃₃O₆N₃ |
| 283 | [structure: triazine with OCH₃-phenoxy, two 2-hydroxy-4-(OC₂H₅)phenyl groups] | 223–224° | 64.50 5.41 8.67<br>64.57 5.22 8.79<br><br>C₂₆H₂₅O₆N₃; ½H₂O |
| 284 | [structure: triazine with OCH₃-phenoxy, two 2-hydroxy-4-(O(CH₂)₇CH₃)phenyl groups] | 136–138° | 70.89 7.67 6.53<br>70.61 7.70 6.89<br><br>C₃₈H₄₉O₆N₃ |
| 285 | [structure: triazine with N(C₂H₅)₂-phenoxy, two 2,4-dihydroxyphenyl groups] | 287–290°<br>+ | 60.40 5.10 11.30<br>60.10 5.20 11.70<br><br>C₂₅H₂₄O₅N₄; HCl |

C—Continued
| I | II | III | IV |
|---|---|---|---|
| 286 | 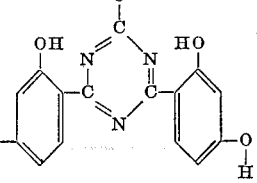 | 305–306° | 66.15 6.12 7.98<br>66.05 6.17 8.23<br>$C_{39}H_{51}O_6N_3; \tfrac{1}{2}H_2O$ |
| 287 | 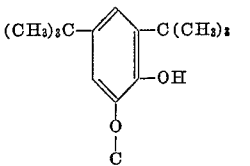 | 184–190° | 74.01 6.21 6.02<br>74.43 6.28 6.10<br>$C_{53}H_{53}O_6N_3$ |
| 288 | 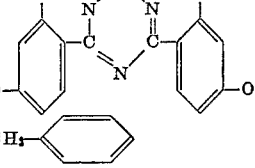 | 326–327° | 59.40 4.60 8.00<br>59.40 4.50 8.00<br>$C_{22}H_{16}O_5N_3Cl; C_4H_8O_2$ |
| 289 | 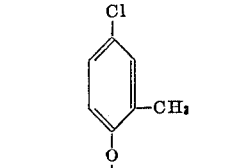 | 254–255° | 63.22 4.90 8.51<br>63.13 5.05 8.40<br>$C_{26}H_{24}O_5N_3Cl$ |
| 290 | 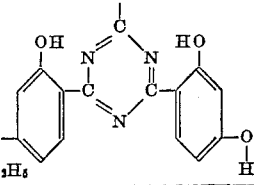 | 178–182° | 65.51 5.86 7.64<br>65.24 6.05 7.97<br>$C_{30}H_{32}O_5N_3Cl$ |

| I | II | III | IV |
|---|---|---|---|
| 291 | 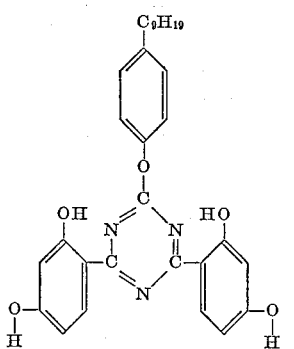 | 186–187° | 67.78 6.26 7.91<br>67.98 6.50 7.92<br>C₃₀H₃₃O₅N₃ |
| 292 | 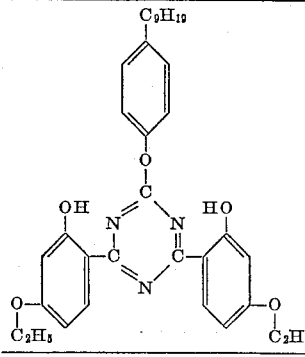 | 161–162° | 71.68 6.90 7.38<br>71.46 7.05 7.45<br>C₃₄H₃₉O₅N₃ |
| 293 | 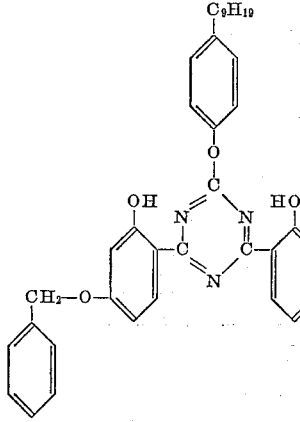 | 124–125° | 77.06 6.14 6.13<br>76.74 6.65 6.16<br>C₄₄H₃₅O₅N₃ |
| 294 | 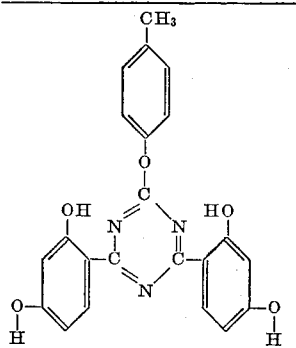 | 298–299° | 65.50 4.25 10.42<br>65.34 4.32 10.10<br>C₂₂H₁₇O₅N₃ |

C—Continued

| I | II | III | IV |
|---|---|---|---|
| 295 | (structure: triazine with p-tolyloxy group, two 2-hydroxy-4-ethoxyphenyl groups) | 228–229° | 67.96 5.48 9.15<br>68.05 5.68 9.24<br><br>$C_{26}H_{25}N_3O_5$ |
| 296 | (structure: triazine with p-chlorophenoxy group, two 2,4-dihydroxyphenyl groups) | 288–289° | 55.28 3.49 9.71<br>58.43 3.40 9.99<br><br>$C_{21}H_{14}O_5N_3Cl\cdot\tfrac{1}{2}H_2O$ |
| 297 | (structure: triazine with p-chlorophenoxy group, two 2-hydroxy-4-ethoxyphenyl groups) | 236–237° | 62.57 4.62 8.76<br>62.74 4.58 8.98<br><br>$C_{25}H_{22}O_5N_3Cl$ |
| 298 | (structure: triazine with 3,4-dimethylphenoxy group, two 2,4-dihydroxyphenyl groups) | 291–292° | 66.18 4.59 10.07<br>65.66 4.59 9.85<br><br>$C_{23}H_{19}O_5N_3$ |

C—Continued
| I | II | III | IV |
|---|---|---|---|
| 299 | 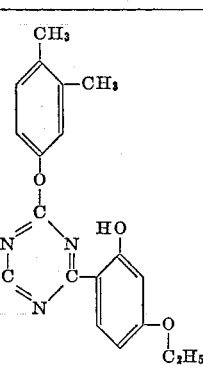 | 170–171° | 68.48 5.75 8.87<br>68.54 5.71 8.74<br><br>$C_{27}H_{27}O_5N_3$ |
| 300 | 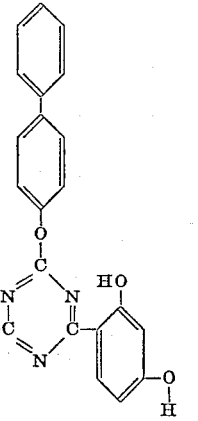 | 299–300° | 69.67 4.11 9.03<br>69.38 4.37 9.06<br><br>$C_{27}H_{19}O_5N_3$ |
| 301 | 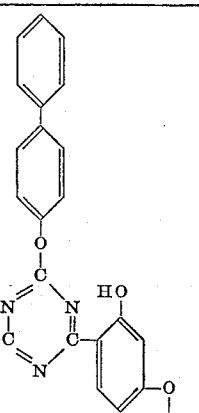 | 269–270° | 71.39 5.22 8.06<br>71.32 5.09 7.90<br><br>$C_{31}H_{27}O_5N_3$ |
| 302 | 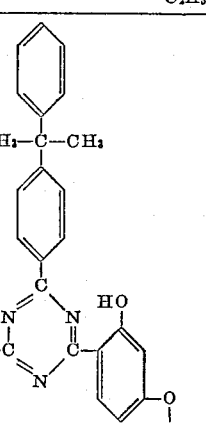 | 222–223° | 70.99 4.97 8.28<br>70.84 4.99 8.14<br><br>$C_{30}H_{25}O_5N_3$ |

C—Continued

| I | II | III | IV |
|---|---|---|---|
| 303 | (structure) | 192–193° | 72.45 5.90 7.46<br>72.50 5.88 7.65<br><br>$C_{34}H_{33}O_5N_3$ |
| 304 | (structure) | 269–270° | 68.48 5.75 8.87<br>68.24 5.80 8.74<br><br>$C_{27}H_{27}O_5N_3$ |
| 305 | (structure) | 186–187° | 70.30 6.66 7.93<br>70.19 6.51 8.01<br><br>$C_{31}H_{35}O_5N_3$ |
| 306 | (structure) | 278–279° | 70.30 6.66 7.93<br>69.93 6.61 7.96<br><br>$C_{31}H_{35}O_5N_3$ |

C—Continued
| I | II | III | IV |
|---|---|---|---|
| 307 | 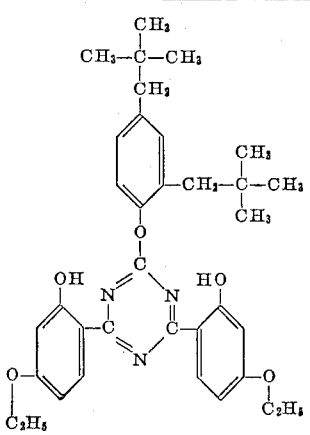 | 168–169° | 71.77  7.40  7.17<br>71.54  7.39  7.24<br><br>$C_{35}H_{43}O_5N_3$ |
| 308 | 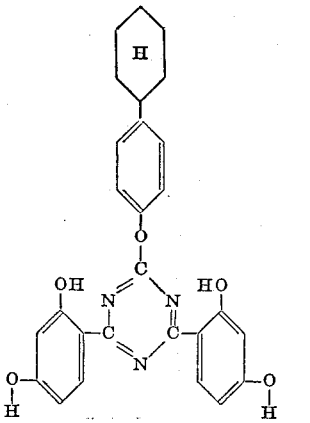 | 285–286° | 68.78  5.34  8.91<br>68.89  5.40  8.96<br><br>$C_{27}H_{25}O_5N_3$ |
| 309 | 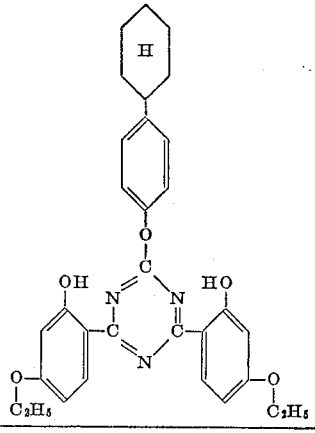 | 203–204° | 70.57  6.30  7.97<br>70.75  6.27  7.99<br><br>$C_{31}H_{33}O_5N_3$ |
| 310 | 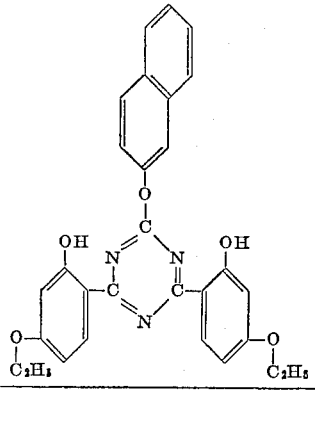 | 286–287° | 68.33  3.90  9.56<br>67.86  4.09  9.47<br><br>$C_{25}H_{17}O_5N_3$ |

C—Continued

| I | II | III | IV |
|---|---|---|---|
| 311 | (structure) | 215–216° | 70.29  5.09  8.48<br>70.17  5.13  8.76<br>$C_{29}H_{25}O_5N_3$ |
| 312 | (structure) | 280–281° | 62.47  4.15  9.11<br>62.15  4.31  8.94<br>$C_{24}H_{19}O_7N_3$ |
| 313 | (structure) | 210–211° | 64.98  5.26  8.12<br>64.45  5.23  8.55<br>$C_{28}H_{27}O_7N_3$ |
| 314 | (structure) | 274–275° | 61.28  4.29  8.93<br>61.59  4.20  8.78<br>$C_{24}H_{19}O_7N_3\cdot\tfrac{1}{2}H_2O$ |
| 315 | (structure) | 151–152° | 64.98  5.26  8.12<br>64.37  5.22  ---<br>$C_{28}H_{27}O_7N_3$ |

| I | II | III | IV |
|---|---|---|---|
| 316 | (structure: tetrahydronaphthyl-O-triazine with two 2,4-dihydroxyphenyl groups) | 275–276° | 65.07  5.02  9.11<br>65.21  5.18  9.28<br><br>$C_{25}H_{21}O_5N_3\cdot H_2O$ |
| 317 | (structure: tetrahydronaphthyl-O-triazine with two 2-hydroxy-4-ethoxyphenyl groups) | 188–189° | 69.72  5.85  8.41<br>69.45  5.79  8.48<br><br>$C_{29}H_{29}O_5N_3$ |
| 318 | (structure: 4-(2,4,4-trimethylpent-2-yl)phenoxy-triazine with two 2,4-dihydroxyphenyl groups) | 233–234° | 69.44  6.23  8.38<br>68.99  6.17  8.38<br><br>$C_{29}H_{31}O_5N_3$ |
| 319 | (structure: 4-(2,4,4-trimethylpent-2-yl)phenoxy-triazine with two 2-hydroxy-4-ethoxyphenyl groups) | 226–227° | 71.07  7.05  7.54<br>70.94  6.86  7.60<br><br>$C_{33}H_{39}O_5N_3$ |

| I | II | III | IV |
|---|---|---|---|
| 320 | (structure: 2,6-bis(2,4-dihydroxyphenyl)-4-(4-chloro-3,5-dimethylphenoxy)-1,3,5-triazine) | 295–296° | 61.00  4.00  9.32<br>61.07  4.12  9.50<br><br>$C_{23}H_{18}O_5N_3Cl$ |
| 321 | (structure: 2,6-bis(2-hydroxy-4-ethoxyphenyl)-4-(4-chloro-3,5-dimethylphenoxy)-1,3,5-triazine) | 208–209° | 63.84  5.16  8.27<br>63.96  5.41  8.47<br><br>$C_{27}H_{26}O_5N_3Cl$ |
| 322 | (structure: 2,6-bis(2,4-dihydroxyphenyl)-4-(biphenylyloxy)-1,3,5-triazine) | 292–293° | 69.67  4.11  9.03<br>69.65  4.25  9.09<br><br>$C_{27}H_{19}O_5N_3$ |
| 323 | (structure: 2,6-bis(2-hydroxy-4-ethoxyphenyl)-4-(biphenylyloxy)-1,3,5-triazine) | 217–218° | 71.39  5.22  8.06<br>71.30  5.21  8.13<br><br>$C_{31}H_{27}O_5N_3$ |
| 324 | (structure: 2,6-bis(2,4-dihydroxyphenyl)-4-(4-methoxyphenoxy)-1,3,5-triazine) | 264–265° | 63.00  4.09  10.02<br>62.34  4.27  9.95<br><br>$C_{22}H_{17}O_6N_3$ |

C—Continued
| I | II | III | IV |
|---|---|---|---|
| 325 | 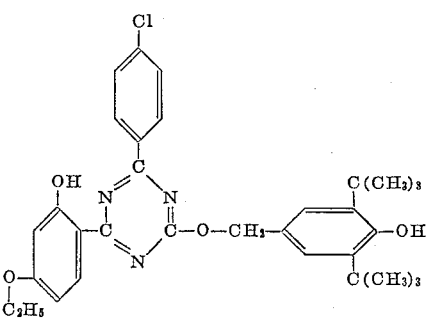 | 217–218° | 68.38  6.46  7.48<br>68.36  6.38  7.15<br><br>C₃₂H₃₆O₄N₃Cl |
| 326 | 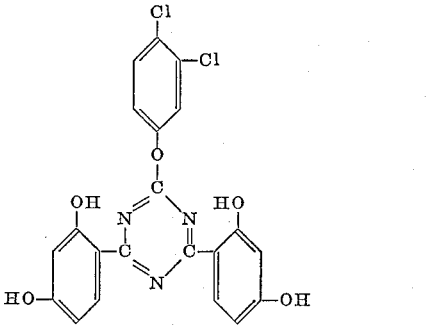 | 269–270° | 55.04  2.86  9.17<br>55.03  2.88  9.40<br><br>C₂₁H₁₃O₅N₃Cl₂ |
| 327 | 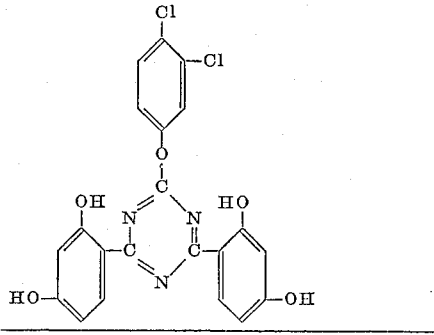 | 298–300° | 55.46  3.31  8.62<br>55.46  3.44  8.55<br><br>C₂₁H₁₃O₅N₃Cl₂·½CH₃COCH₃ |
| 328 | 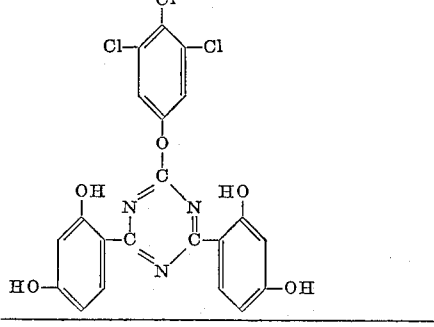 | 291–292° | 51.19  2.46  8.53<br>51.37  2.34  8.59<br><br>C₂₁H₁₂O₅N₃Cl₃ |
| 329 | 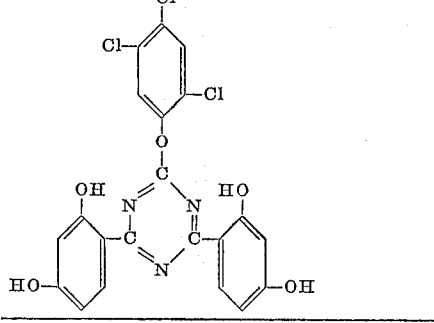 | 291–292° | 51.19  2.46  8.53<br>51.36  2.61  8.76<br><br>C₂₁H₁₂O₅N₃Cl₃ |

C—Continued
| I | II | III | IV |
|---|---|---|---|
| 330 | 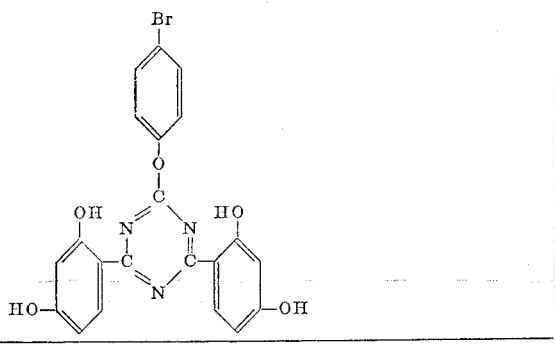 | 307–308° | 53.86  3.01  8.97<br>54.00  2.91  8.94<br><br>C₂₁H₁₄O₅N₃Br |
| 331 | 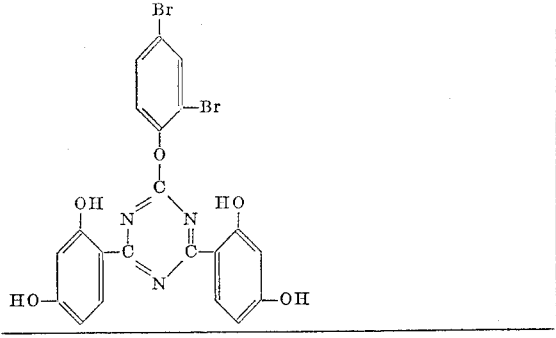 | 294–295° | 46.10  2.39  7.68<br>45.47  2.41  7.66<br><br>C₂₁H₁₃O₅N₃Br₂ |
| 332 | 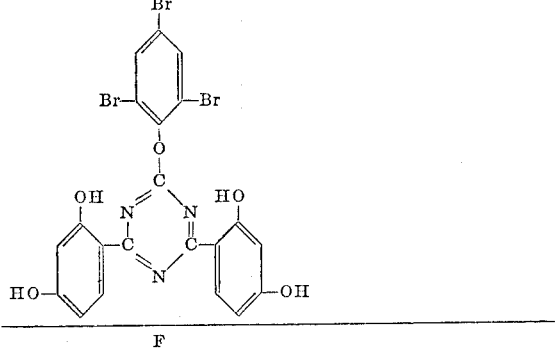 | 293–294° | 40.29  1.93  6.71<br>39.76  1.77  6.62<br><br>C₂₁H₁₂O₅N₃Br₃ |
| 333 | 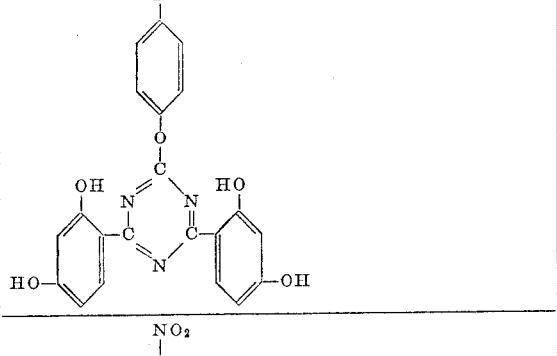 | 282–284° | 61.92  3.46  10.32<br>61.66  3.66  10.32<br><br>C₂₁H₁₄O₅N₃F |
| 334 | 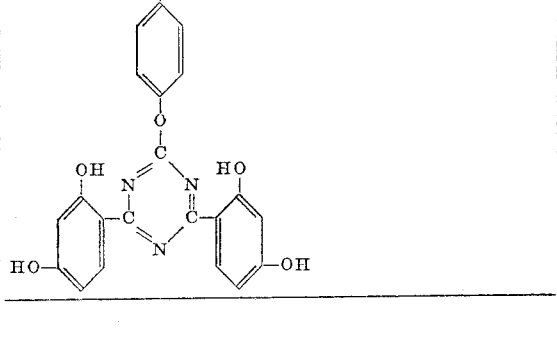 | 318–319° | 58.07  3.25  12.90<br>58.34  3.53  12.87<br><br>C₂₁H₁₄O₇N₄ |

C—Continued

| I | II | III | IV |
|---|---|---|---|
| 335 | (structure with CF₃ phenoxy-triazine and two dihydroxyphenyl groups) | ~265 + | 57.77 3.09 9.19<br>57.75 3.18 9.22<br>C₂₂H₁₄O₅N₃F₃ |
| 336 | (structure with phenoxy-triazine and two hydroxy-ethoxyphenyl groups) | 225–226° | 67.40 5.20 9.43<br>67.29 5.44 9.45<br>C₂₅H₂₃O₅N₃ |
| 337 | (structure with phenoxy-triazine and two hydroxy-(CH₂COOC₂H₅)oxyphenyl groups) | 180–181° | 62.03 4.85 7.48<br>61.74 5.00 7.78<br>C₂₉H₂₇O₉N₃ |
| 338 | (structure with phenoxy-triazine and two hydroxy-(CH₂-phenyl)oxyphenyl groups) | 176–182° | 73.80 4.78 7.38<br>73.53 4.67 7.15<br>C₃₅H₂₇O₅N₃ |

EXAMPLES 15 TO 17 AND TABLE D

The following Examples 15 to 17 and Table D concern types of compounds of the Formula 28; the Examples 15 to 17 describe the methods of manufacturing all these compounds.

Concerning instructions for esterification and formation of the urethane group on the para-hydroxyl group see Examples 3, 4 and 5 preceding Table A.

Example 15

When in Example 8 the 2-(4'-tertiary butylphenoxy)-4,6-dichloro-1,3,5-triazine is replaced by 2-methoxy-4,6-dichloro-1,3,5-triazine, and the reaction is carried out for 3 hours at 50° C., the product of the formula (339)

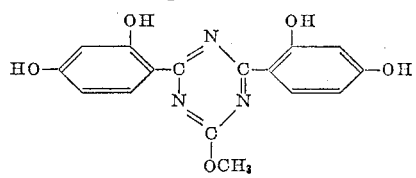

is obtained in a yield of 96%. After recrystallization from aqueous dioxane, it is analytically pure and melts at 313° C. with decomposition.

$C_{16}H_{13}O_5N_3$—Calculated: C, 58.71; H, 4.00; N, 12.84%. Found: C, 58.85; H, 4.27; N, 12.73%.

Example 16

16.4 parts of the compound of the Formula 339, 4 parts of sodium hydroxide and 5.3 parts of sodium carbonate are dissolved in 300 parts of acetone and 150 parts of water; 14.25 parts of diethylsulphate in 50 parts of acetone are then dropped in within 30 minutes at room temperature, and the mixture is stirred on for 5 hours at 50° C. The precipitated product of the formula (340) 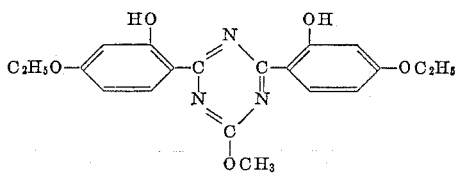

is suctioned off and dried. Yield: 7.1 parts after two recrystallization from benzene+cyclohexane. The product melts at 190 to 191° C.

$C_{20}H_{21}O_5N_3$—Calculated: C, 62.65; H, 5.52; N, 10.96%. Found: C, 62.72; H, 5.60; N, 10.69%.

Example 17

When in Example 14 the compound of the Formula 276 is replaced by the compound of the Formula 339 and equimolecular proportions of the starting materials are used, there are obtained 6.5 parts of the compound of the Formula (341) 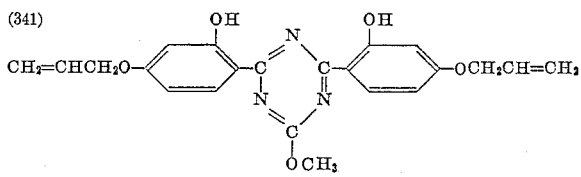

The analytically pure product obtained by recrystallization from benzene+methanol melts at 146 to 147° C., with decomposition.

$C_{22}H_{21}O_5N_3$—Calculated: C, 64.85; H, 5.20; N, 10.31%. Found: C, 64.74; H, 5.11; N, 10.30%.

D

| I | II | III | IV |
|---|---|---|---|
| 342 | ![structure with OH groups and triazine with O-CH3] | 313° + | 58.71 4.00 12.84<br>58.85 4.27 12.73<br>$C_{16}H_{13}O_5N_3$ |
| 343 | ![structure with OC2H5, OH, OC2H5 and triazine with O-CH3] | 190-191° | 62.65 5.52 10.96<br>62.72 5.60 10.69<br>$C_{20}H_{21}O_5N_3$ |
| 344 | ![structure with O(CH2)7-CH3, OH, O(CH2)7-CH3 and triazine with O-CH3] | 96-97.5° | 69.66 8.22 7.62<br>69.70 8.40 7.54<br>$C_{32}H_{45}O_5N_3$ |

D—Continued

| I | II | III | IV |
|---|---|---|---|
| 345 | (structure with OCH₂CH=CH₂, OH, OCH₃ substituents on triazine) | 146–147° | 64.85 5.20 10.31<br>64.74 5.11 10.30<br>$C_{22}H_{21}O_5N_3$ |
| 346 | (structure with OCH₂CH₂CH₂COOC₂H₅ substituents) | 132–132.5° | 60.53 5.99 7.56<br>60.83 6.19 7.62<br>$C_{28}H_{33}O_9N_3$ |
| 347 | (structure with OCH₂-phenyl (benzyloxy) substituents) | 184–186° | 70.99 4.97 8.28<br>70.99 5.18 8.43<br>$C_{30}H_{25}O_5N_3$ |
| 348 | (structure with OCH₂-C₆H₄-Cl substituents) | 197° | 62.51 4.02 7.29<br>62.59 4.19 7.00<br>$C_{30}H_{23}O_5N_3Cl_2$ |
| 349 | (structure with OCOCH₃ substituents) | 185–186.5° | 58.39 4.17 10.22<br>58.16 4.42 10.01<br>$C_{20}H_{17}O_7N_3$ |

D—Continued

| I | II | III | IV |
|---|---|---|---|
| 350 | (structure with OCONHCH₃, OH, OCH₃, OH, OCONHCH₃ substituents on triazine) | 202–204°  + | 54.42  4.34  15.87<br>54.74  4.61  15.65<br>$C_{20}H_{19}O_7N_5$ |
| 351 | (structure with OCONHC₄H₉, OH, OCH₃, OH, OCONHC₄H₉ substituents on triazine) | 206°  + | 59.42  5.95  13.33<br>59.46  6.10  13.29<br>$C_{26}H_{31}O_7N_5$ |
| 352 | (structure with OCH₂CH₂OH, OH, OCH₃, OH, OCH₂CH₂OH substituents on triazine) | 208.5–210° | 57.83  5.10  10.12<br>57.88  4.97  10.08<br>$C_{20}H_{21}O_7N_3$ |
| 353 | (structure with OC₄H₉, OH, OCH₃, OH, OC₄H₉ substituents on triazine) | 151–152.5° | 65.58  6.65  9.56<br>65.60  6.97  9.61<br>$C_{24}H_{29}O_5N_3$ |
| 354 | (structure with O(CH₂)₁₇CH₃, OH, OCH₃, OH, O(CH₂)₁₇CH₃ substituents on triazine) | 97–100° | 75.04  10.29  5.05<br>74.85  10.32  4.98<br>$C_{52}H_{85}O_5N_3$ |

D—Continued

| I | II | III | IV |
|---|---|---|---|
| 355 | 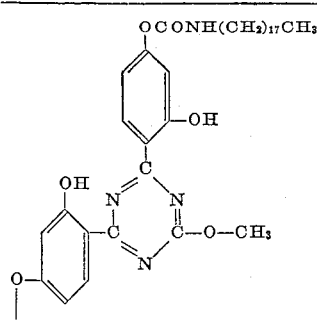 | 181–185.5° | 70.63  9.55  7.63<br>70.79  9.53  7.91<br><br>$C_{51}H_{87}O_7N_5$ |
| 356 | 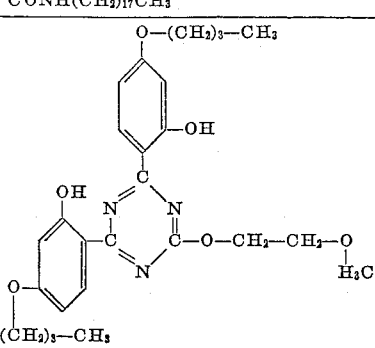 | 137–138° | 64.58  6.88  8.69<br>64.71  7.06  8.70<br><br>$C_{25}H_{33}O_6N_3$ |

EXAMPLES 18 TO 29

In each of the following examples, which illustrate the possibilities of uses, typical representatives were used. Quite generally, all compounds mentioned in the foregoing part of the specification are equally suitable, and only the different solubilities of the compounds concerned in the substrate to be used must be taken into consideration. It may also be necessary to bear in mind that compounds containing 2 resorcinyl residues reveal an ultraviolet absorption maximum at about $\lambda=355$ m$\mu$, whereas those containing only one resorcinyl residue reveal a maximum at about 340 m$\mu$.

Example 18

A film about 60$\mu$ thick is prepared from a 10% acetonic acetylcellulose solution containing 1% of the compound of the Formula 275 referred to acetylcellulose. After drying, the film reveals the following light transmission values in percent:

| Wavelength in m$\mu$ | Light transmission in percent | |
|---|---|---|
| | Film unexposed | Film exposed for 100 hours in a fadeometer |
| 280 to 370 | 0 | 0 |
| 380 | 22 | 22 |
| 390 | 65 | 67 |
| 400 | 83 | 85 |

Similar results are obtained, for example with the compounds of the Formulae 1, 275, 276, 277 and 340 or other compounds mentioned in the specification, provided these compounds have been dissolved in acetylcellulose.

Example 19

A film about 50$\mu$ thick is made by casting a 10% acetonic solution of acetylcellulose containing 1% (calculated from acetylcellulose) of the compound of the Formula 214. The dried film reveals the following values of light transmission in percent:

| Wavelength in m$\mu$ | Light transmission in percent | |
|---|---|---|
| | Film unexposed | Film exposed for 100 hours in a fadeometer |
| 260 to 350 | 0 | 0 |
| 360 | 3 | 3 |
| 370 | 23 | 23 |
| 380 | 54 | 54 |
| 390 | 77 | 77 |
| 400 | 86 | 86 |

Similar results are obtained, for example, with the compounds of the Formulae 41, 54, 66 and 68.

Example 20

A paste from 100 parts of polyvinylchloride, 59 parts by volume of dioctylphthalate and 0.2 part of the compound of the Formula 271 is rolled on a calendar at 145 to 150° C. to form a film about 0.5 mm. thick. The polyvinylchloride film obtained in this manner absorbs completely within the ultraviolet region from 280 to 370 m$\mu$.

Instead of the compound of the Formula 271 there may be used, for example, the compound of the Formula 41, 128 or 274.

Example 21

A mixture of 100 parts of polyethylene and 0.2 part of the compound of the Formula 49 is rolled on a calendar at 130 to 140° C. to form a film which is then pressed at 150° C.

The polyethylene film obtained in this manner is substantially impermeable to ultraviolet light within the region from 280 to 370 m$\mu$.

Instead of the compound of the Formula 49 there may be used, for example, the compound of the Formula 55, 64, 99 or 128.

Example 22

A mixture of 100 parts of polypropylene and 0.2 part of the compound of the Formula 122, 123, 128 or 274 is rolled on a calendar at 170° C. to form a sheet which is then pressed at 230 to 240° C. under a maximum pressure of 40 kg./cm.² to form a panel 1 mm. thick.

The panels obtained in this manner do not transmit ultraviolet light within the region from 280 to 380 mµ. Similar results are obtained with other compounds listed in Tables A to D.

Example 23

0.2 part of the compound of the Formula 291 is dissolved in 1.8 parts of monostyrene and mixed with 0.5 part of a solution of a cobalt naphthenate in monostyrene (containing 1% of cobalt). 40 parts of an unsaturated polyester resin based on phthalic acid+maleic acid+ethylene-glycol in monostyrene are then added and the batch is stirred for 10 minutes. 1.7 parts of a catalyst solution (methyl-ethylketone peroxide in dimethylphthalate) are dropped in and the intimately mixed, air-free mass is cast between two plates of glass. After about 20 minutes the 1 mm. thick polyester film has solidified sufficiently to enable it to be taken out of the mould. It is impermeable to ultraviolet light within the region from 280 to 380 mµ and reveals no signs of yellowing after a 1000 hours' test with the xenon lamp. If the compound 291 is omitted, signs of yellowing appear after only 500 hours in the fadeometer test.

Instead of the compound of the Formula 291 there may be used, for example, the compound of the Formula 271 or 274.

Example 24

25 g. of distilled monostyrene are prepolymerized in a closed bottle in a heating cabinet for 2 days at 90° C. 0.025 g. of benzoyl peroxide and 0.25 g. of the compound of the Formula 49, 77, 95, 127 or 128 are then slowly stirred into the viscous mass. The mixture is poured into a square mould made from aluminum foil and left in it for 1 day at 70° C. When the mass has completely solidified and cooled, the mould is broken up. The resulting block is then pressed in a hydraulic press at a temperature of 138° C. under a pressure of 150 kg./cm.² to form a panel 1 mm. thick.

The polystyrene panels manufactured in this manner are impermeable to ultraviolet light within the region from 280 to 380 mµ. They are completely colourless. On exposure in a fadeometer a distinct improvement in the stability towards light is observed: polystyrene panels containing compounds of the above formulae display not a trace of yellowing after 200 hours' exposure, whereas panels that do not contain such an additive have already turned yellow by then. Other compounds listed in Tables A to D display a similar behaviour.

Example 25

0.1 g. of the compound of the Formula 49, 75, 95, 127 or 128 is dissolved in 40 g. of a clear nitrocellulose lacquer (25%). The lacquer is then evenly applied with a doctor device to maple wood boards and is completely dry within a short time. The addition of the afore-mentioned ultraviolet filters to the lacquer does not affect the shade of the wood. The light colour of the lacquered wood does not change even after several days' exposure to the light of an ultraviolet lamp if the lacquer contains about 1% of one of the said compounds. Untreated wood darkens after only a few days' exposure as described.

Similar results are obtained with acrylic resin and alkyd-melamine lacquers and other compounds listed in Tables A to D.

Example 26

8 g. of a 65:35-mixture of toluylene-2,4-diisocyanate and toluylene-2,6-diisocyanate and 20 g. of a little branched polyester from adipic acid, diethyleneglycol and triol (hydroxyl number 60) are stirred for about 15 seconds. 2 ml. of a catalyst mixture (consisting of 6 ml. of a tertiary amine, 3 ml. of a dispersant, 3 ml. of stabilizer and 2 ml. of water) and 0.28 g. of the compound of the Formula 49, 77, 95, 128 or 199 are then added and the batch is stirred for a short time. A foam fleece forms which is placed in a water bath after 30 minutes. After a further 30 minutes it is thoroughly washed in water and dried at room temperature.

The addition of one of the above ultraviolet filters enhances the stability of the product during its exposure in the Xeno test apparatus. The ultraviolet filters mentioned above are also very suitable for incorporation in many other polyurethanes obtained by the isocyanate polyaddition process.

Other compounds listed in Tables A to D behave in a similar manner.

Example 27

10,000 parts of a polyamide in chip form manufactured in the usual manner from caprolactam are mixed with 30 parts of the compound of the Formula 128, 133, 298 or 352 for 12 hours in a tumbler. The chips treated in this manner are then melted in a boiler heated at 300° C. from which the atmospheric oxygen has first been displaced by superheated steam, and stirred for half an hour. The melt is then expressed through a spinneret under a nitrogen-pressure of 5 atmospheres (gauge), and the spun filament is allowed to cool and wound on a spinning bobbin, whereby it is at the same time stretched.

The addition of one of the above-mentioned compounds inhibits substantially the degradation of the macromolecules caused by exposure in the fadeometer and determined by measuring the relative viscosity in concentrated sulphuric acid.

Other compounds listed in Tables A to D behave in a similar manner.

Example 28

0.2 of the compound of the Formula 284 is dissolved in 10 g. of pure olive oil. Dissolution is achieved quickly and without heating. A layer of this solution of 50 µ thickness completely absorbs ultraviolet light up to 400 mµ.

Other fatty oils and creams or emulsions used in cosmetics can be used in a similar manner for dissolving the above compound or other products of this invention.

Example 29

12 g. of polyacrylonitrile are sprinkled with stirring into 88 g. of dimethylformamide until a complete solution has formed. 0.1 g. of the compound of, for example, the Formula 128, which dissolves immediately, is then added. The viscous mass is applied to a clean plate of glass and spread out with a film forming rod. The layer is dried for 20 minutes in a vacuum drying cabinet at 120° C. under a vacuum of 150 mm. Hg. The resulting film of about 0.05 m. thickness is easy to pull off the glass plate; it is completely colorless and absorbs ultraviolet light up to a wavelength of 350 mµ substantially completely, whereas a film that does not contain the compound of the Formula 128 transmits at least 80% of the ultraviolet light. The other substances mentioned above in connection with polystyrene are likewise suitable for incorporation with polyacrylonitrile.

What is claimed is:
1. A hydroxyphenyl-1,3,5-triazine of the formula

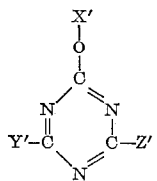

in which X' represents a member selected from the group consisting of hydrogen, alkyl, aryl and alkoxy containing up to 25 carbon atoms which is linked with the oxygen atom through a carbon atom; Y' represents a benzene radical which is linked with the triazine ring directly through a cyclic carbon atom and contains in ortho-position to the bond with the triazine ring a hydroxyl group and in para-position a member selected from the group consisting of a hydroxyl group, an etherified hydroxyl group and the group

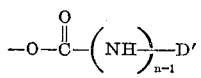

wherein $n$ stands for a whole number from 1 to 2 and D' is an alkyl, cycloalkyl or benzene residue containing up to 18 carbon atoms and Z' represents a member selected from the group consisting of a halogen atom and a benzene radical, and the molecule contains in all no more than 3 free hydroxyl groups.

2. A hydroxyphenyl-1,3,5-triazine of the formula

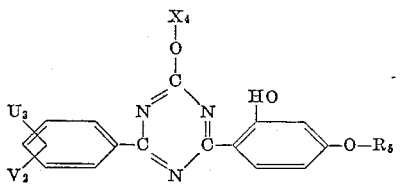

in which $U_3$ and $V_2$ each is a member selected from the group consisting of a hydrogen atom, a halogen atom, an alkoxy group and an alkyl group containing 1 to 4 carbon atoms;
$X_4$ represents a cyclic system containing from one to two 6-membered carbon rings, which may contain substituents being selected from the group consisting of: alkyl, alkoxy, hydroxyl, carbalkoxy groups, halogen atoms, nitro, benzoyl and carbonamido groups;
$R_5$ represents a member selected from the group consisting of hydrogen and an alkyl group which may be substituted by hydroxyl, nitrile, alkoxy, carboxylic acid ester, carboxylic acid amide, benzoyl groups and halogen atoms; an alkenyl group, an aliphatic acyl group, a benzoyl, benzyl and carbonamido group, and these groups may be substituted above all by hydroxyl, alkyl or phenyl groups and by halogen atoms.

3. A hydroxyphenyl-1,3,5-triazine of the formula

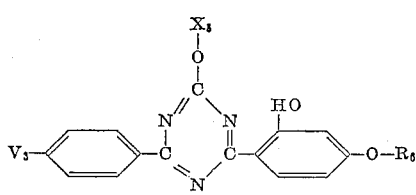

in which
$V_3$ represents a member selected from the group consisting of a hydrogen and a chlorine atom,
$X_5$ (a) represents a member selected from the group consisting of a phenyl group containing 1 to 3 substituents selected from the group consisting of alkyl groups containing 1 to 12 carbon atoms; phenylalkyl groups containing 1 to 4 carbon atoms in the alkyl group; alkoxy groups containing 1 to 8 carbon atoms in the alkyl group; cyclohexyl, phenyl, hydroxyl groups; carbalkoxy groups containing 1 to 8 carbon atoms in the alkoxy group, or carbonamide groups containing 1 to 18 carbon atoms,
(b) a phenyl group containing 1 to 5 halogen atoms, and
(c) a naphthyl group,
$R_6$ represents a member selected from the group consisting of hydrogen, an alkyl group containing up to 18 carbon atoms; an alkyl group which contains up to 8 carbon atoms and is substituted by a member selected from the group consisting of —OH, —CN, halogen, —CO—NH$_2$ and —CO—C$_6$H$_5$; an alkenyl group containing up to 8 carbon atoms, a carbalkoxyalkyl group of the formula $$—(CH_2)_n—COO(CH_2)_n—CH_3$$

where $n=1$ to 4 and $m=1$ to 7; an aliphatic acyl group containing up to 18 carbon atoms, a benzoyl group, a benzyl group, a carbonamido group, a carbonamido group in which one amide hydrogen atom is substituted by a phenyl group, a carbon amido group in which one amido hydrogen is substituted by an alkyl group containing up to 18 carbon atoms.

4. A hydroxyphenyl-1,3,5-triazine of the formula

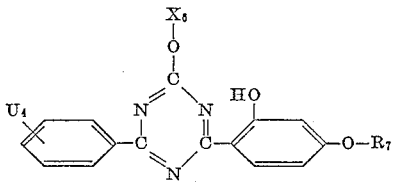

in which
$U_4$ represents a member selected from the group consisting of a halogen atom and an alkyl group containing up to 8 carbon atoms;
$X_6$ is a member selected from the group consisting of a hydrogen atom, an alkyl, alkenyl or hydroxyalkyl group, an alkyl group containing at least one ether oxygen bridge; a hydroxyalkyl group containing a thioether bridge, and a benzyl group;
$R_7$ represents a member selected from the group consisting of a hydrogen atom, an alkyl group; an alkyl group substituted by hydroxyl, an alkyl group substituted by a nitrile group, an alkyl group substituted by a halogen atom, an alkenyl group, an aliphatic acyl group, a carbalkoxyalkyl, a carbonamido, an alkylcarbonamido group, a benzyl and a benzoyl group.

5. A hydroxyphenyl-1,3,5-triazine of the formula

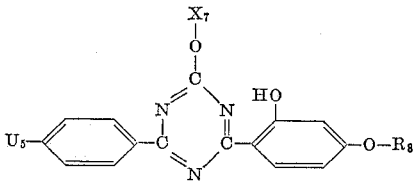

in which
$U_5$ represents a member selected from the group consisting of hydrogen or chlorine atom,
$X_7$ represents a member selected from the group consisting of an alkyl group containing up to 18 carbon atoms, an allyl group, a hydroxyalkyl group containing 1 to 4 carbon atoms, an alkoxyalkyl group containing up to 10 carbon atoms, and a benzyl group,
$R_8$ represents a member selected from the group consisting of a hydrogen atom, an alkyl group containing up to 18 carbon atoms, an allyl group, an alkyl group which contains up to 18 carbon atoms and is substituted by a hydroxyl or nitrile group; an aliphatic acyl group containing up to 18 carbon atoms; an aryl-substituted carbonamido group containing up to 18 carbon atoms, an alkyl substituted carbon amido group containing up to 18 carbon atoms, an alkylcarbonamido group containing up to 4 carbon atoms; a carbalkoxyalkyl group containing up to 10 carbon atoms, and a benzyl group.

6. A hydroxyphenyl-1,3,5-triazine of the formula

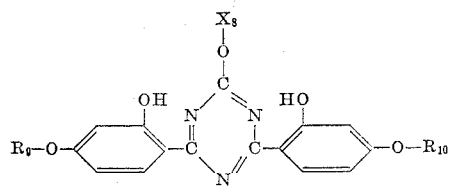

in which
$X_8$ represents a cyclic system which contains one to two 6-membered carbon rings and at least one of the following substituents: alkyl, alkoxy, hydroxyl groups, halogen atoms, halogenoalkyl, carbalkoxy, nitro, amino groups, substituted amino groups, and carbonamide groups;
$R_9$ and $R_{10}$ each represents a member selected from the group consisting of a hydrogen atom, an alkyl, alkenyl, aralkyl and a carbalkoxyalkyl group.

7. A hydroxyphenyl-1,3,5-triazine of the formula

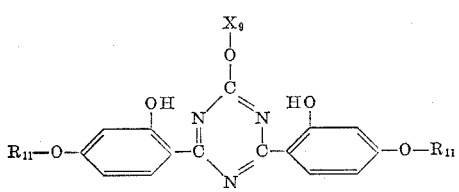

in which
$X_9$ represents a member selected from the group consisting of
(a) a phenyl group which contains 1 to 3 of substituents being selected from the group consisting of alkyl groups containing 1 to 12 carbon atoms; phenylalkyl groups containing 1 to 4 carbon atoms in the alkyl group; alkoxy groups containing 1 to 8 carbon atoms in the alkyl group; cyclohexyl, phenyl, hydroxyl groups; carbalkoxy groups containing 1 to 8 carbon atoms in the alkoxy group; a carbonamido group; an alkylated amino group and a nitro group,
(b) a phenyl group which contains 1 to 5 halogen atoms, and
(c) a naphthyl group which may be partially hydrogenated,
$R_{11}$ represents a member selected from the group consisting of a hydrogen atom, an alkyl group containing up to 18 carbon atoms; an alkenyl group containing up to 4 carbon atoms, a benzyl group, a carbalkoxyalkyl group containing up to 6 carbon atoms.

8. A hydroxyphenyl-1,3,5-triazine of the formula

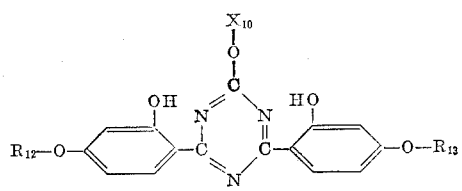

in which
$X_{10}$ represents an alkyl group containing up to 6 carbon atoms and possibly oxygen bridges,
$R_{12}$ and $R_{13}$ each represents a member selected from the group consisting of a hydrogen atom, an alkyl, alkenyl, carboxyalkyl group, an aralkyl group, an aliphatic acyl group, a hydroxyalkyl group and a carbonamido group.

9. A hydroxyphenyl-1,3,5-triazine of the formula

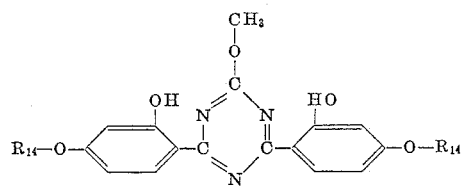

in which $R_{14}$ represents a substituent containing at most 8 carbon atoms, and being selected from the group consisting of an alkyl group, an allyl group, a carbalkoxyalkyl group containing up to 6 carbon atoms, a benzyl, acetyl and a hydroxyalkyl group and a carbonamido group.

10. A hydroxyphenyl-1,3,5-triazine of the formula

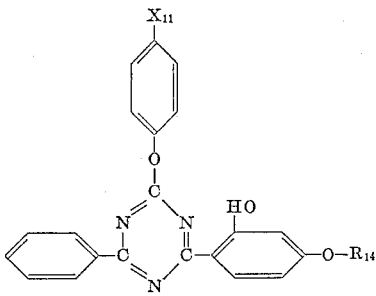

in which $X_{11}$ represents a branched alkyl group containing 1 to 8 carbon atoms and $R_{14}$ an alkyl group containing 1 to 4 carbon atoms.

11. A hydroxyphenyl-1,3,5-triazine of the formula

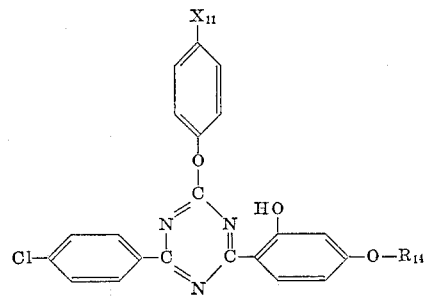

in which $X_{11}$ represents a branched alkyl group containing 1 to 8 carbon atoms and $R_{14}$ an alkyl group containing 1 to 4 carbon atoms.

12. A hydroxyphenyl-1,3,5-triazine of the formula

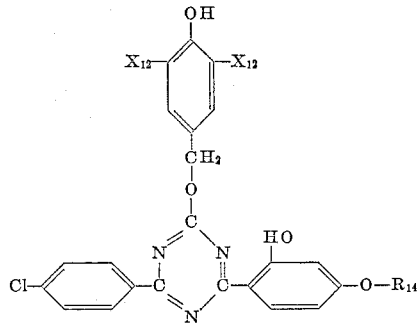

in which $X_{12}$ may represent a hydrogen atom, but at least one radical $X_{12}$ is a branched alkyl group containing up to 8 carbon atoms, and $R_{14}$ represents an alkyl group containing 1 to 4 carbon atoms.

13. A hydroxyphenyl-1,3,5-triazine of the formula

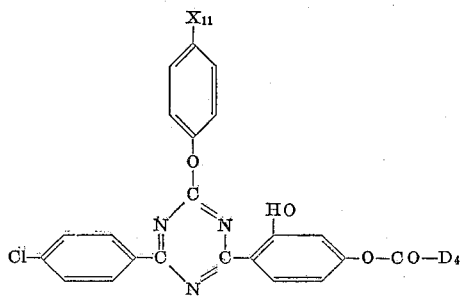

in which $X_{11}$ and $D_4$ each represents an alkyl group containing 1 to 8 carbon atoms.

14. A hydroxyphenyl-1,3,5-triazine of the formula

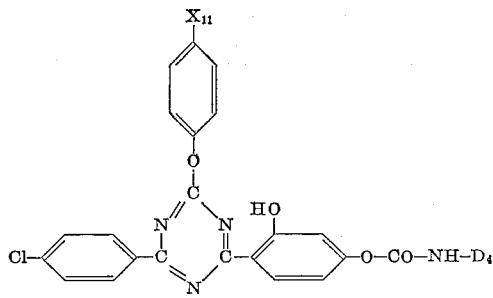

in which $X_{11}$ and $D_4$ each represents an alkyl group containing 1 to 8 carbon atoms.

15. A hydroxyphenyl-1,3,5-triazine of the formula

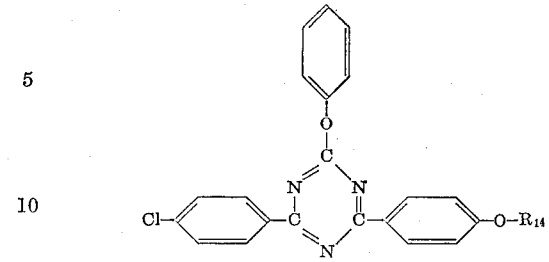

in which $R_{14}$ represents an alkyl group containing 1 to 4 carbon atoms.

16. A hydroxyphenyl-1,3,5-triazine of the formula

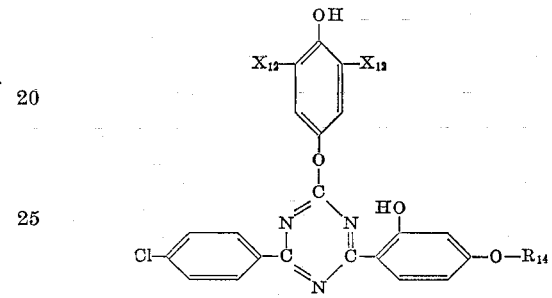

in which $X_{12}$ may represent a hydrogen atom, but at least one radical $X_{12}$ represents a branched alkyl group containing up to 8 carbon atoms, and $R_{14}$ represents an alkyl group containing 1 to 4 carbon atoms.

References Cited by the Examiner

Fieser et al.: "Advanced Organic Chemistry," Reinhold Pub. Co., New York (1961), pp. 649-53.

JOHN D. RANDOLPH, *Primary Examiner.*
WALTER A. MODANCE, *Examiner.*
JOHN M. FORD, *Assistant Examiner.*

Notice of Adverse Decision in Interference

In Interference No. 97,118 involving Patent No. 3,293,247, M. Duennenberger, H. R. Biland, C. Luethi and M. Schellenbaum, HYDROXYPHENYL-1,3,5-TRIAZINES, final judgment adverse to the patentees was rendered Feb. 11, 1972, as to claims 1, 2, 3, 5, 7, 8 and 9.

[*Official Gazette July 4, 1972.*]

Disclaimer 3,293,247.—*Max Duennenberger*, Frenkendorf, *Hans Rudolf Biland*, Basel, *Christian Luethi*, Muenchenstein, and *Max Schellenbaum*, Riehen, Switzerland. HYDROXYPHENYL - 1,3,5 - TRIAZINES. Patent dated Dec. 20, 1966. Disclaimer filed Apr. 11, 1972, by the inventors, and the assignee, *Ciba-Geigy AG*, assenting.

Hereby enters this disclaimer to claims 1, 2, 3, 5, 7, 8 and 9 of said patent.

[*Official Gazette December 26, 1972.*]